United States Patent [19]

Masuda et al.

[11] Patent Number: 5,165,010
[45] Date of Patent: Nov. 17, 1992

[54] INFORMATION PROCESSING SYSTEM

[75] Inventors: Noboru Masuda, Kokubunji; Moritoshi Yasunaga, Kawaguchi; Minoru Yamada, Hanno; Akira Masaki, Musashino; Mitsuo Asai, Kokubunji; Yuzo Hirai, Tsukuba; Masayoshi Yagyu, Kokubunji; Takehisa Hayashi, Kodaira; Toshio Doi; Kenichi Ishibashi, both of Kokubunji, all of Japan

[73] Assignee: Hitachi, Ltd., Tokyo, Japan

[21] Appl. No.: 461,080

[22] Filed: Jan. 4, 1990

[30] Foreign Application Priority Data

| Jan. 6, 1989 | [JP] | Japan | 64-000297 |
| Jan. 6, 1989 | [JP] | Japan | 64-000299 |
| Jan. 6, 1989 | [JP] | Japan | 64-000300 |
| Mar. 10, 1989 | [JP] | Japan | 1-056458 |
| Oct. 11, 1989 | [JP] | Japan | 1-263103 |

[51] Int. Cl.$^5$ ............................................. G06F 15/18
[52] U.S. Cl. ................................................... 395/27
[58] Field of Search ............... 364/513, 807, 200, 900; 340/172.5; 395/24, 27

[56] References Cited

U.S. PATENT DOCUMENTS

| 4,004,282 | 1/1977 | Weber | 340/172.5 |
| 4,893,255 | 1/1990 | Tomlinson et al. | 364/513 |
| 4,943,931 | 7/1990 | Allen | 364/513 |
| 4,947,482 | 8/1990 | Brown | 364/807 |
| 4,974,169 | 11/1990 | Engle | 364/513 |

FOREIGN PATENT DOCUMENTS

| 56-2662 | 1/1981 | Japan . |
| 264787 | 3/1990 | Japan . |
| 264788 | 3/1990 | Japan . |
| 2666888 | 3/1990 | Japan . |

OTHER PUBLICATIONS

Houselander et al., "Time-Multiplexed Analogue Circuit for Implementing Artificial Neural Networks", *Electronics Letters*, vol. 24, No. 23, Nov. 10, 1988, pp. 1413-1414.

Hansen et al., "A Time-Multiplexed Switched-Capacitor Circuit for Neural Network Applications", *IEEE Internal Symp. on Circuits & Systems*, 1989, vol. 3, pp. 2177-2180.

Eberhardt et al., "Design of Parallel Hardware Neural Network Systems from Custom Analog VLSI 'Building Block' Chips", *IJCNN Int'l Joint Conf on Neural Networks* 1989 vol. II pp. 183-190.

Lippman, "An Introduction to Computing with Neural Nets", *IEEE ASSP Magazine*, Apr. 1987, pp. 4-21.

Holler et al., "An Electrically Trainable Artificial Neural Network (ETANN) with 10240 'Floating Gate' Synapses", *Prer. Int'l Annual Conf. on Neural Networks* 1989 p.II. 191-6.

Bailey et al., "Way VLSI Implementation of Associative VLENS Require Connection Multiplexing ", *IEEE Int'l Conf. on Neural Networks 1988*, vol. II, pp. 173-178.

Shwartz, "A Neural Chips Survey", *Alexpert*, Dec. 1990, pp. 34-39.

Graf et al., "A CMOS Associative Member Chip Based on Neural Networks", 1987 *IEEE Int'l Solid-State Circuits Conference*, pp. 304-305.

*Primary Examiner*—Allen R. MacDonald
*Attorney, Agent, or Firm*—Antonelli, Terry, Stout & Kraus

[57] ABSTRACT

An information processing system includes a plurality of functional blocks (neurons) and a data bus for transmitting in common the outputs of the individual functional blocks (neurons). Data transaction among the functional blocks (neurons) is performed through the data bus on the time-division basis. For preventing the outputs from conflicting or competition, addresses are assigned to the individual blocks (neurons), respectively, so that only the functional blocks (neuron) having the own address designated by the address signal supplied through an address bus outputs data signal onto the data bus, while the other functional blocks (neurons) receive the information on the data bus as the signal originating in the functional block whose address is designated at that time point. The addresses are sequentially changed. During a round of the address signals, data are transmitted from given functional blocks (neurons) to other given functional blocks (neurons).

18 Claims, 39 Drawing Sheets

107'
ADDRESS DECODER

107
ADDRESS DECODER

F I G. 6A
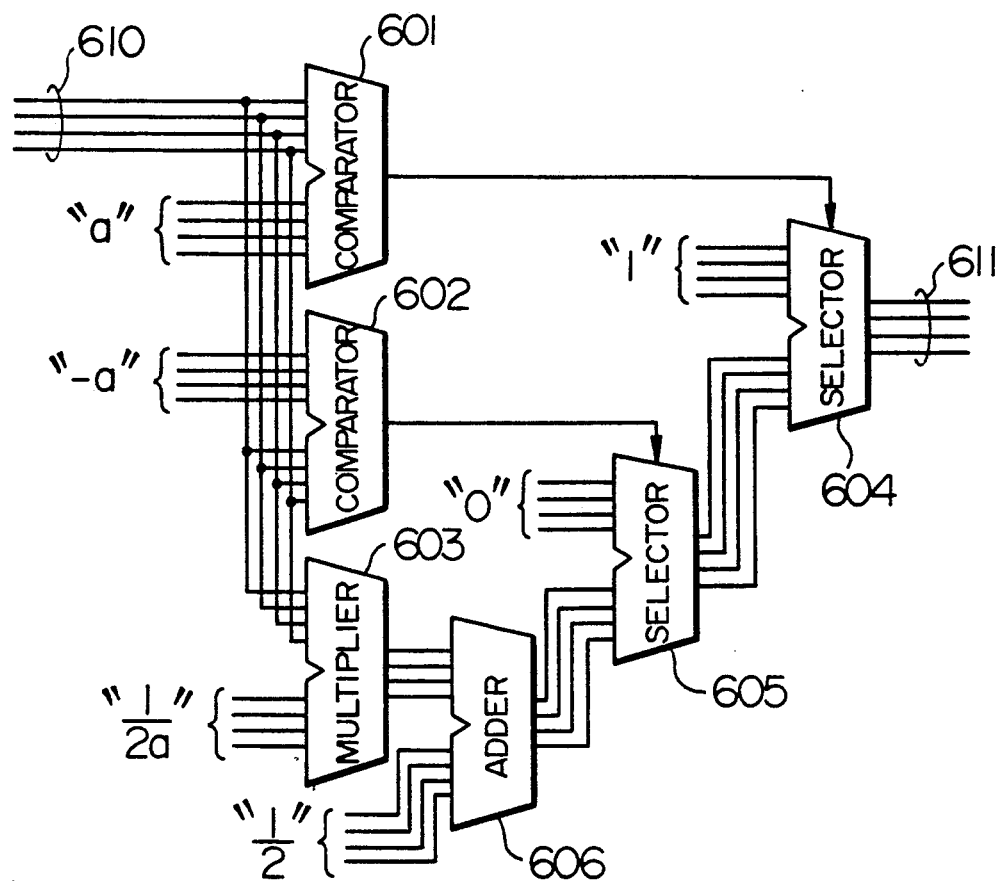
F I G. 6B
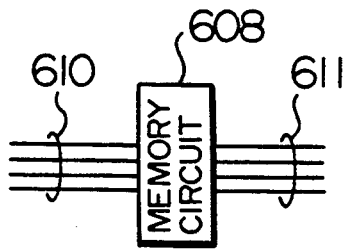

F I G. 20
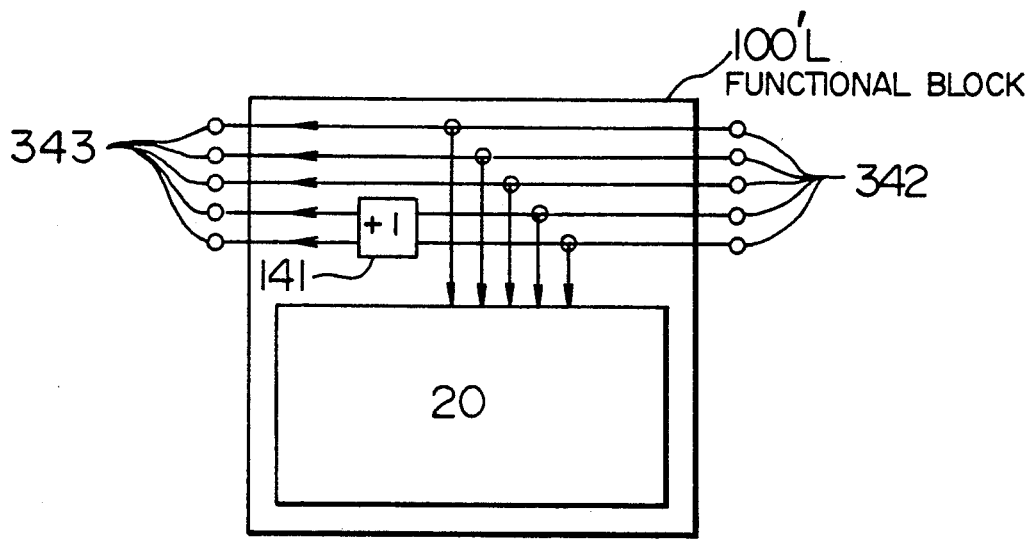
F I G. 21
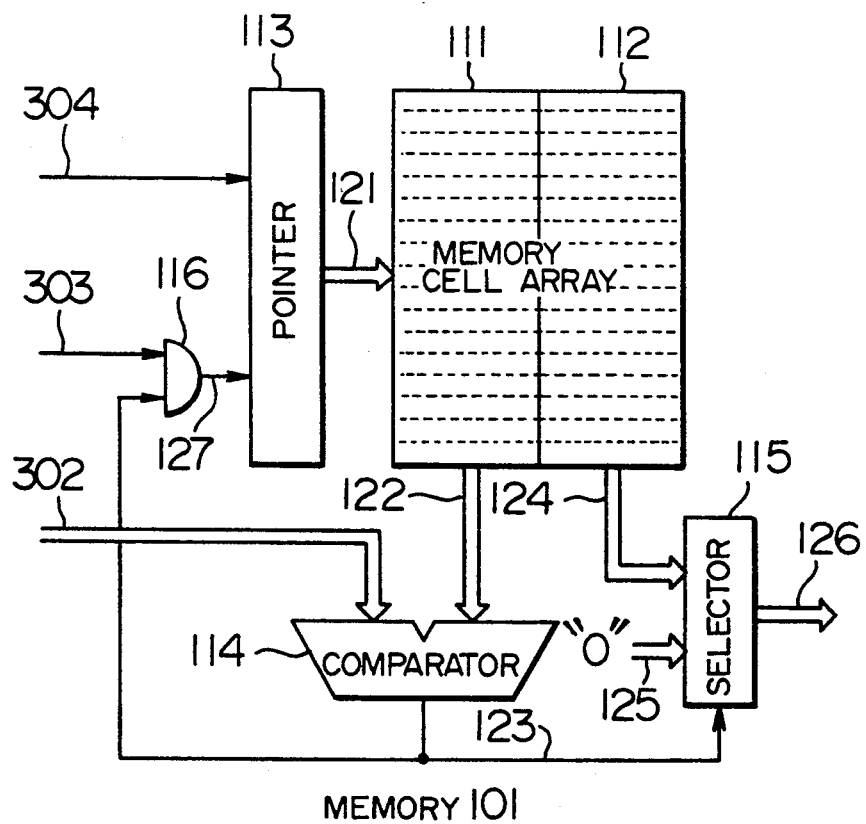

11 ••• MAJORITY CIRCUIT
231 ••• DATA INPUT TERMINAL
232 ••• DATA OUTPUT TERMINAL
233 ••• CLOCK SIGNAL INPUT TERMINAL
234 ••• ADDRESS SIGNAL INPUT TERMINAL
210 ••• ADDRESS DECODER
212 ••• TRI-STATE OUTPUT BUFFER

F I G. 25
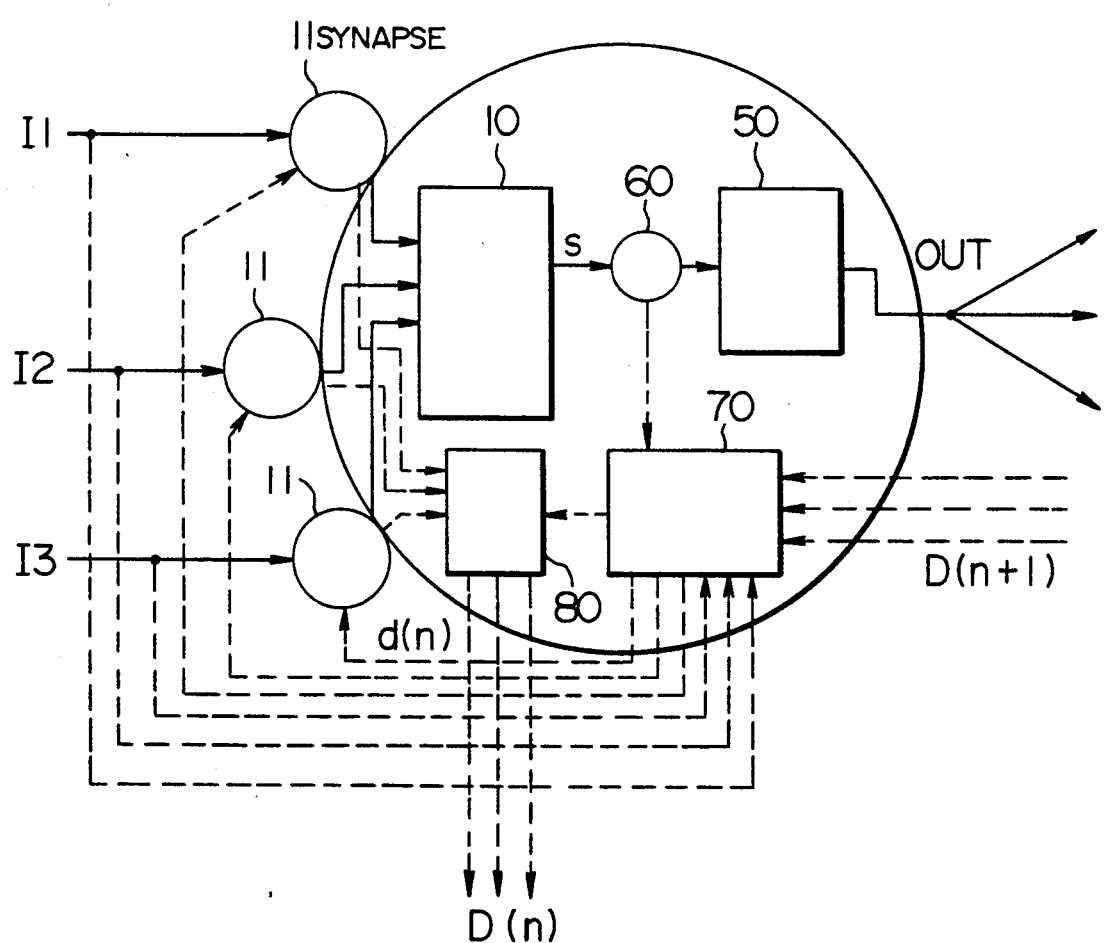

F I G. 30
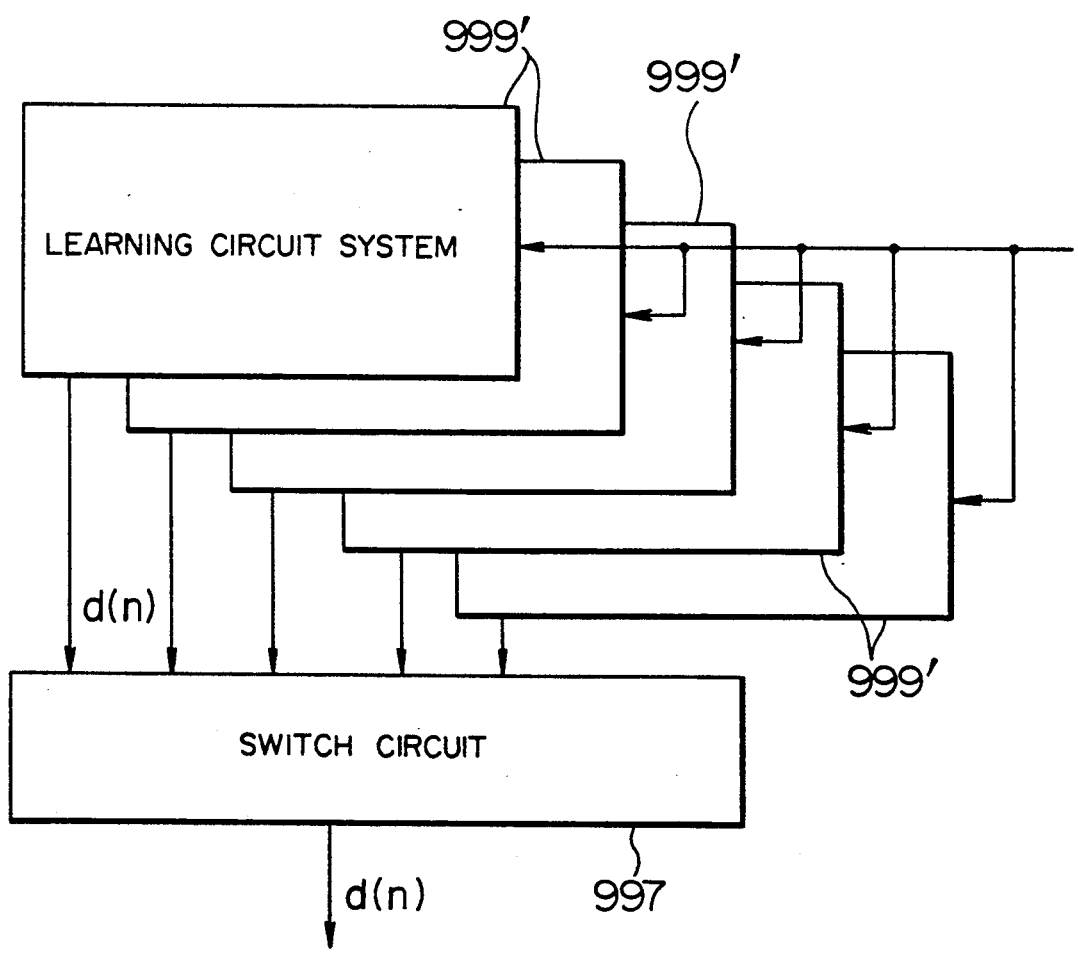

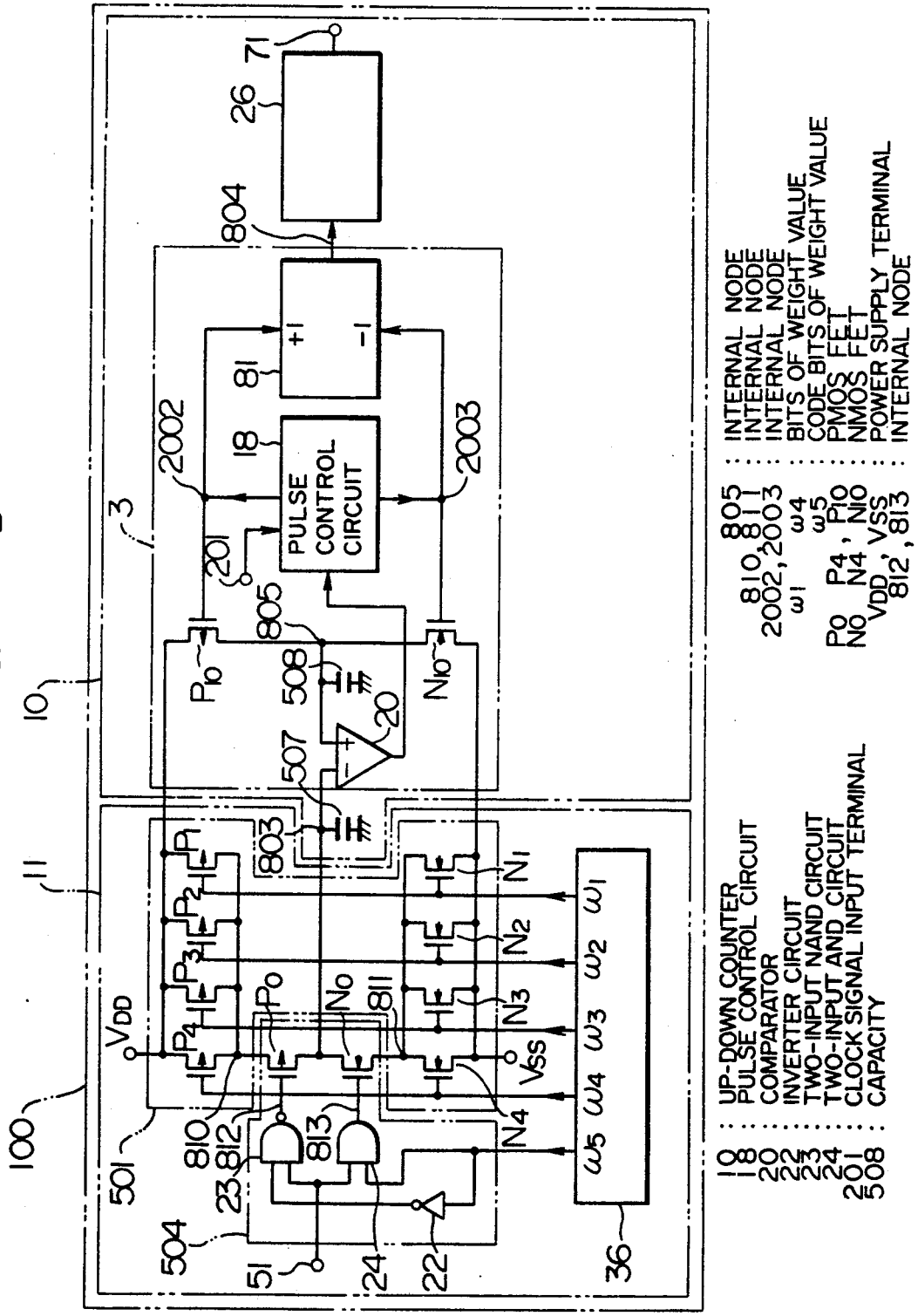

150, 151 : CLOCK SIGNAL INPUT TERMINAL
507a, 507b : CAPACITY
P20, P21 : PMOS FET
N20, N21 : MMOS FET

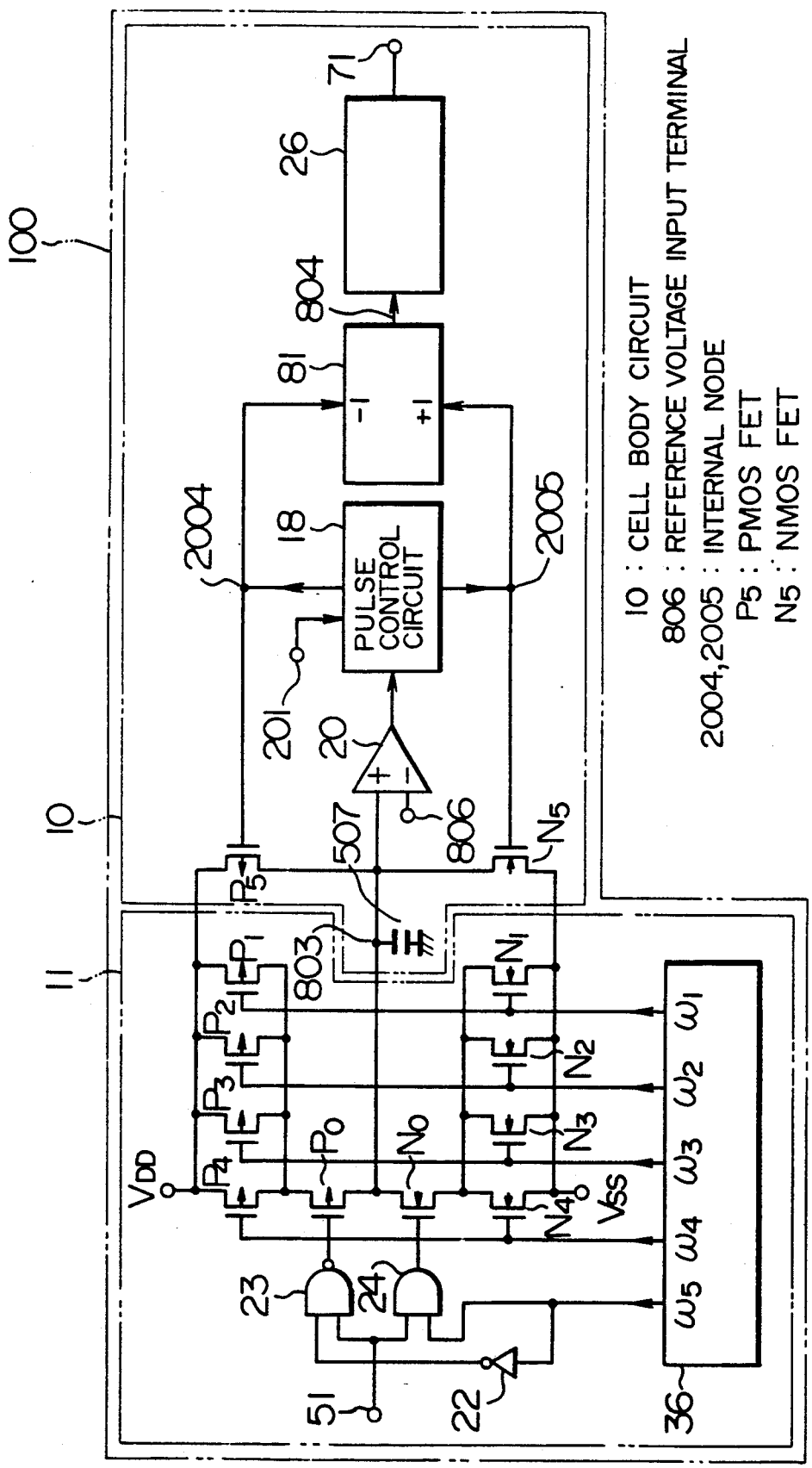

Ic : CELL BODY CIRCUIT
807 : STAIRCASE WAVE OUTPUT NODE
808 : PULSE OUTPUT NODE $f^{-1}(t/T) \times \text{CONSTANT}$
$= -\ln(1/(t/T)-1) \times \text{CONSTANT}$ $T_1$ : PULSE PERIOD

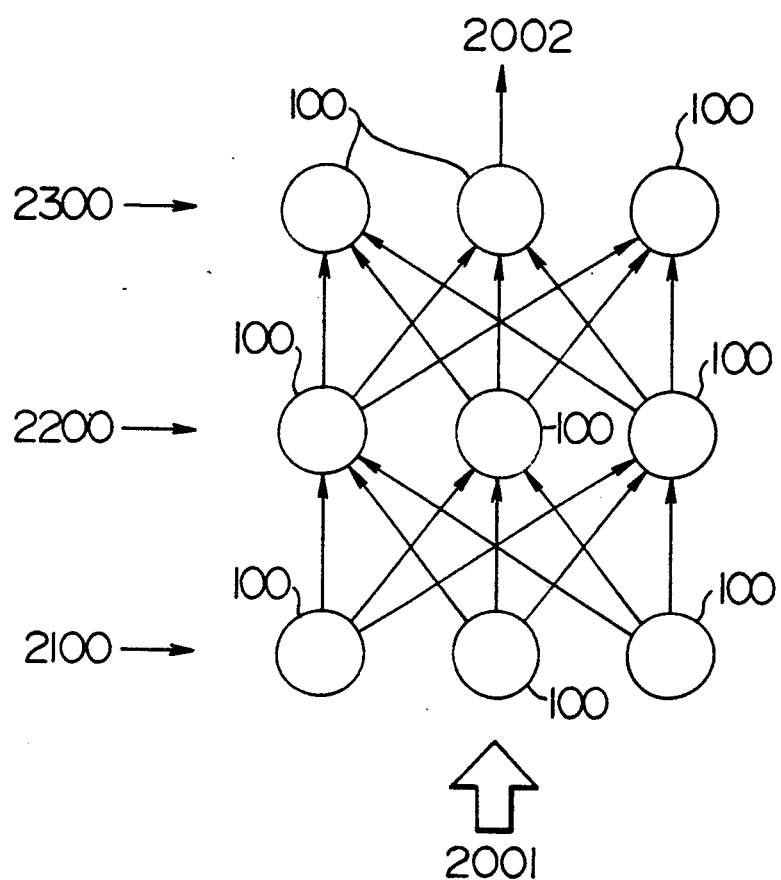

INFORMATION PROCESSING SYSTEM

BACKGROUND OF THE INVENTION

The present invention generally relates to an information processing system or apparatus such as an electronic computer or the like. More particularly, the invention is concerned with an information processing system or apparatus and a neural computer such as an analogue computer, neural network and the like which are capable of performing information processings with a high degree of parallel operation.

A so-called analogue computer includes a plurality of functional blocks such as address, integrators and others, wherein each of the functional blocks receives signals outputted from the other functional block or blocks directly or by way of a scaler circuit having a multiplication function, a sign inverter and others. The functional block then performs arithmetic operations such as addition, integration and others on the signal as received to thereby determine its own output value which is then transmitted to the other functional block or blocks. Usually, it is determined by an operator in accordance with problems as imposed which of the functional block's output is to be inputted to which of the functional blocks and what numerical value is to be set in the scaler circuit.

In the network known as a neural net or network, there are provided, as shown in FIG. 1 of the accompanying drawings, a plurality of cell bodies and functional circuits 10 referred to as dendrites, wherein each of the functional circuits receives signals outputted from the other functional circuit through the medium of a scaler 11. Each of the functional blocks each composed of the functional circuit 10 and the scaler circuit 11 arithmetically determines a total sum of the values represented by the signals as its own internal value and outputs a signal corresponding to the internal value to the other functional blocks. Selection of the coefficients (hereinafter referred to as the weight values) for the individual scalers are automatically determined through a process usually referred to as the learning. An example of this type neural network is disclosed in a Japanese periodical "NIKKEI ELECTRONICS", No. 427 (Aug. 10, 1987), pp. 115-124.

An attempt for implementing the neural network in the form of a semiconductor integrated circuit is disclosed in a Japanese periodical "NIKKEI MICRODEVICE", July 1988, pp. 44-89. One of such semiconductor integrated circuits for the neural network is also discussed in "A CMOS ASSOCIATIVE MEMORY CHIP BASED ON NEURAL NETWORKS": 1987 ISSCC DIGEST OF TECHNICAL PAPERS, pp. 304-305. In "NIKKEI MICRODEVICE", July, 1988, pp. 72 to 78, there is proposed a neural network by using digital circuits. The digital circuits are easy to be integrated and can ensure a high accuracy for operations by virtue of high insusceptibility to noise and manufacturing tolerance. Disadvantageous however is the digital circuit in that a greater number of parts or elements are required when compared with the analogue circuit Under the circumstance, in the case of the abovementioned approach, the numerical values which are usually expressed by pulse codes are expressed in terms of pulse numbers for simplification of the circuit configuration.

SUMMARY OF THE INVENTION

When complicated information processing is to be executed by using the analogue computer and the neural network, it becomes necessary to increase the number of the functional blocks such as adders, integrators and others, which in turn means that the amount of wiring conductors for interconnecting the functional blocks and the number of the scalers and others have to be correspondingly increased. Representing by N the number of the functional blocks, the number of the circuit points for interconnection of the functional blocks amounts to $N \times (n-1)$. In other words, there is required an amount of hardware for the wiring conductors, scalers, etc. which is approximately in proportion to the second power of the number of the functional blocks. Accordingly, when the number of the functional blocks exceeds a certain value, the amount of hardware increases intolerably, making it practically impossible to implement the system. In particular, when system is to be integrated by using the digital circuits which ensure high operation accuracy and noise resistance and are suited for the integration, the abovementioned problem becomes more serious because a greater number of elements are required for constituting the scalers and others. Besides, an approach for expressing the numerical values in the pulse numbers in an effort to reduce the amount of hardware involves intolerably a lot of time for the processing. By way of example, even the numerical value of third order of magnitude requires for the expression thereof about one thousand times as long as the time required for the expression by the pulse code.

A first object of the present invention is to provide an information processing system or apparatus for a neural network and an analogue computer in which the amount of hardware is prevented from increasing rapidly notwithstanding the increase in the number of the functional blocks.

A second object of the present invention is to provide a large scale neural network implemented by using digital circuits.

A third object of the present invention is to provide an information processing system or apparatus capable of structuring a large scale neural network without lowering the yield rate regardless of increasing the number of neurons.

A fourth object of the present invention is to provide an information processing system or apparatus capable of implementing a high-speed large scale neural network while suppressing degradation in the operating speed due to an increase in the number of neurons.

A fifth object of the present invention is to provide an information processing system or apparatus capable of realizing a large scale neural network by using a relatively small number of different photomasks.

A sixth object of the present invention is to provide a neural network for an analogue computer for digital communication in which the weight values as well as the output values of the neuron circuits can be expressed in a multiplicity of bits and which allows data processings of large scale without the need for increasing the area for implementing the neural network.

A seventh object of the present invention is to provide an information processing system or apparatus which allows a learning process to be executed normally even when a fault occurs in a learning circuit system and which allows a neural network to be realized with an excellently high integration density.

In view of the above and other objects which will be apparent as the description proceeds, there is provided according to a first general aspect of the present invention an information processing system (apparatus) which includes a plurality of functional blocks (neurons) and a bus for transmitting in common the outputs of the individual functional blocks (neurons), wherein data transaction among the functional blocks (neurons) is performed through the data bus on a time-division basis. For preventing the outputs from conflicting or competing, addresses are assigned to the individual blocks (neurons), respectively, so that only the functional block (neuron) having its address designated by the address signal supplied through an address bus can output data signal onto the data bus, while the other functional blocks (neurons) receives the information on the data bus as the signal originating in the functional block whose address is designated at that time point. The addresses are sequentially changed. In this way, in the course of a round of the address signal, data can be transmitted from given functional blocks (neurons) to other functional blocks (neurons). With this arrangement, the functional block (neuron) for receiving the signals can use the scaler (synapse) and others in common to a large number of counterpart or member blocks, whereby the amount of hardware for the circuit becomes essentially in proportion to the number of the functional blocks. The result of which is that an increase in the number of functional blocks (neurons) is no more attended with rapid or abrupt increase in the amount of hardware.

It is taught according to another aspect of the invention to provide a semiconductor memory for storing the weight values only in a predetermined number sequentially in the order starting from the maximum absolute value of the weight By storing the weight values in the semiconductor memory, exchange of the weight values can be facilitated. Further, by storing only a predetermined number of the weight values starting from the greatest value, the amount of hardware can be correspondingly reduced. Besides, by storing the weight values in the order in which they are accessed, it is possible to read out previously the weight value next to be accessed, whereby the operation speed can be enhanced.

According to a second general aspect of the present invention, the bus for mutually connecting the functional blocks is implemented in a hierarchical structure. By virtue of this feature, it is possible to prevent the load applied to one bus from becoming heavier even when the number of neurons is increased, whereby a large scale neural network can be realized. In this conjunction, it is noted that when the neural network is implemented in the form of a WSI (wafer scale integrated circuit), the hierarchical structurization of the buses is attended with a problem that occurrence of faults such as breakage, short-circuits and the like in the bus of higher hierarchical level exerts adverse influence over a wide range and lowers the yield rate This problem can be solved by increasing the width of the wiring conductors for the bus of higher hierarchical level as well as the space between the bus conductors to thereby reduce the fault ratio.

By pipelining the signal transmission over the bus, it becomes possible to send signals from several neurons to the other neurons within a time within which a signal is sent from one neuron to the other neurons, whereby the operation speed can be increased.

In a preferred embodiment of the present invention, parts of the buses are shifted in position for connection to adjacent blocks. With this arrangement, the integrated circuits of the exact same configuration disposed in an array can be supplied with signals different from one to another integrated circuit. In other words, it is possible to realize a WSI (wafer scale integrated circuit) by arraying the functional blocks (neurons) formed by using a same mask.

In an improved embodiment of the present invention, a learning circuit is provided separately from and in common to the individual neurons (functional blocks), and realized in a structure in which fault can be removed.

In another preferred embodiment of the invention, the inter-neuron data transmission is performed by using analogue signal, wherein determination of products and a sum thereof (multiplication and addition operation) is carried out through analogue calculation or alternatively the multiplication is carried out by an analogue calculation with the addition being performed by digital calculation With this arrangement, the neuron circuit can be realized with a smaller number of constituent elements. Because of the inter-neuron data transfer by the digital signal, there arises no problem that the signal undergoes attenuation due to the resistance of the wiring conductors, as in the case of the data transfer by the analogue signal, even when a great distance intervenes between the individual neurons (functional blocks) in a large scale neural network.

BRIEF DESCRIPTION OF THE DRAWINGS

FIGS. 6A and 6B are diagrams showing, respectively, examples of a function transformation circuit required when the information processing apparatus according to the invention is to be used as a neural network;

FIG. 20 shows another example of the structure of a functional block;

FIG. 21 shows a structure of a weight value memory circuit (101) incorporated in the functional block or neuron (100) shown in FIGS. 3 and 7;

FIG. 25 is a schematic diagram for illustrating learning algorithm based on a back propagation method;

FIG. 30 is a diagram showing an exemplary structure for remedying a fault of the learning circuit;

FIG. 36B is a circuit diagram showing a modification of the embodiment shown in FIG. 36A;

FIGS. 41, 42, 43, 44, 45A, 45B and 46 are views illustrating other exemplary embodiments of the present invention, respectively.

DESCRIPTION OF THE PREFERRED EMBODIMENTS

Figure 1:
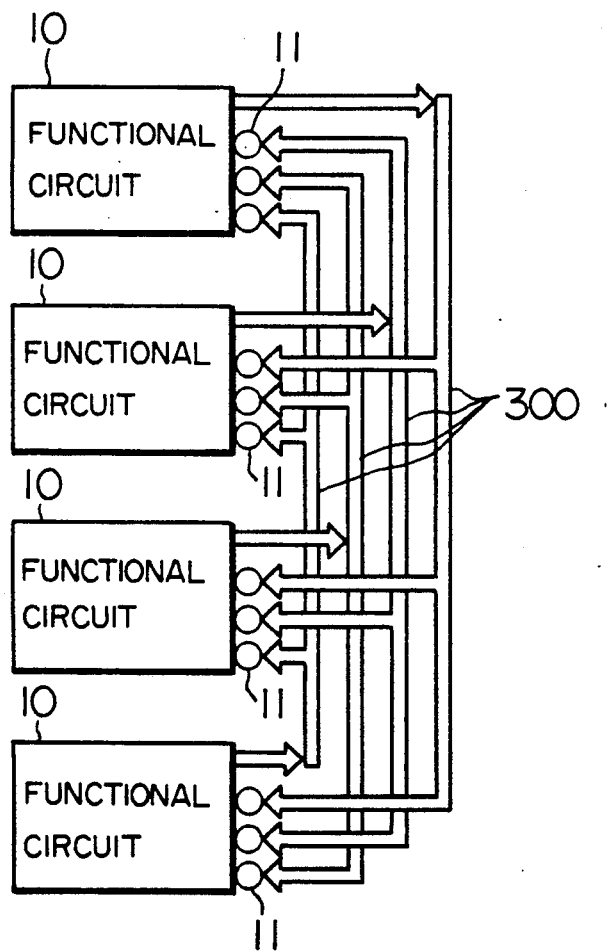
FIG. 1 is a schematic circuit diagram showing a structure of the prior art information processing system.
Figure 2:
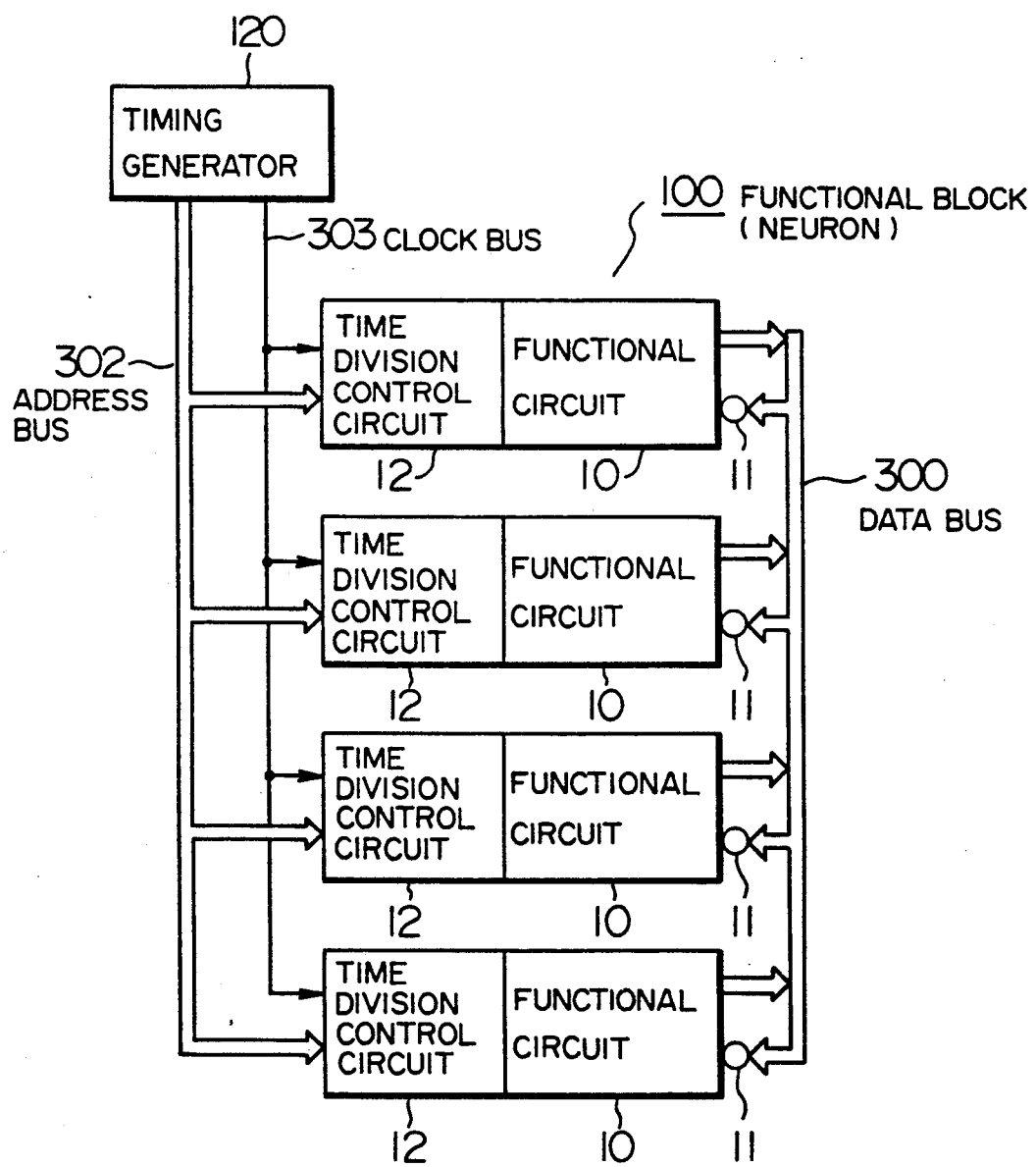
FIG. 2 is a schematic block diagram showing a general arrangement of an information processing system (apparatus) according to an exemplary embodiment of the present invention.
Figure 3:
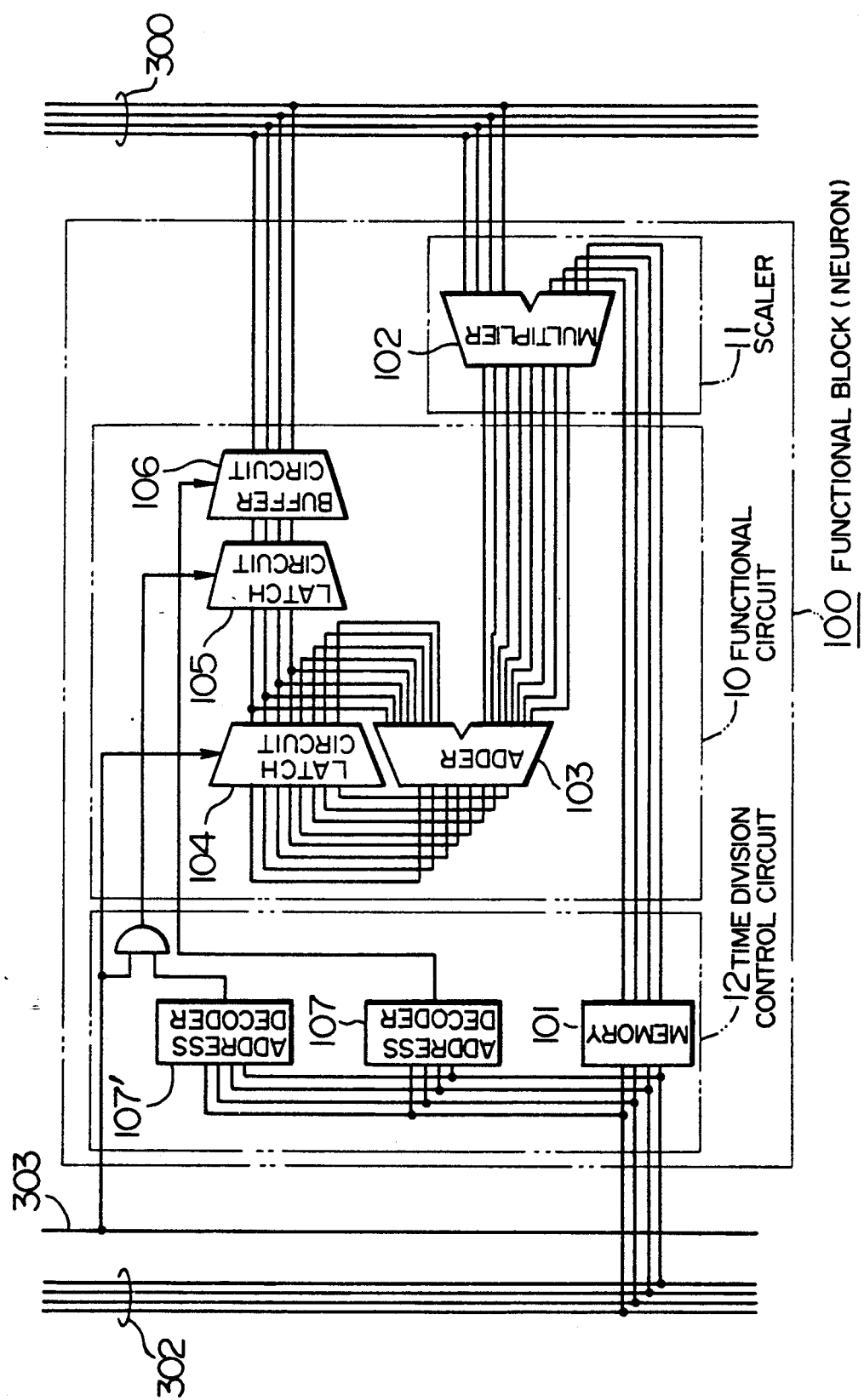
FIG. 3 is a block diagram showing in detail a structure of one functional block (100) which is constituted by a functional circuit, a scaler circuit and a time division control circuit.

FIG. 2 is a schematic block diagram showing a general arrangement of an information processing system according to an exemplary embodiment of the present invention. In this figure, a reference numeral 10 denotes a functional unit, a numeral 11 denotes a scaler circuit, a numeral 12 denotes a time division control circuit, a numeral 300 denotes a data input/output bus, a numeral 302 denotes an address bus, a numeral 303 denotes a clock bus, and a reference numeral 120 denotes a timing generation circuit. FIG. 3 is a block diagram showing in further detail the structure of one functional block (also referred to as a neuron) 100 which is constituted by the functional circuit 10, the scalar circuit 11 and the time division control circuit 12. As can be seen in FIG. 3, the functional circuit 10 is composed of an adder 103, latch circuit 104 and 105 and a buffer circuit 106 having tri-state outputs. The scaler circuit 11 is constituted by a multiplier 102. The time-division control circuit 12 is composed of address decoders 107 and 107' and a memory circuit 101.

The address decoder 107' serves to detect that the address signal sent via the address bus 302 has made a round, while the address decoder 107 serves to make a decision as to whether or not the address signal is destined to the functional block under consideration. More specifically, assuming that the number of the functional block is represented by N, then the addresses "1", "2", "3", ..., "N", by way of example, are assigned to 100 blocks each constituted by the functional circuit 10, the scaler 11 and the time division circuit 12, wherein the address signals are repeated in the sequence of "0", "1", "2", "3", ..., "N", "0", "1", "2", "3" and so forth, wherein the address "0" is assigned to none of the functional blocks and made use of for detecting that the address signals enumerated above has made one round. When the address signal is "0", there is generated an output signal which indicates that the address decoders 107' incorporated in all the time division control circuits 12 are selected. When the address signal assumes one of the other values than "0", a signal is outputted which indicates that only the address decoder 107 incorporated in the time division control circuit assigned with that one address is selected, whereby the buffer circuit 106 paired with the address decoder 107 and incorporated in the functional circuit is activated to output a signal onto the data bus. The outputs of the buffer circuits 106 of the other functional blocks remain in the state of high resistance.

Figure 4A:
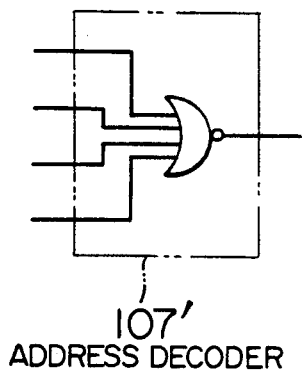
FIGS. 4A and 4B are diagrams showing circuit configurations of address decoders, respectively, which can be employed in the system shown in FIG. 2.
Figure 4B:
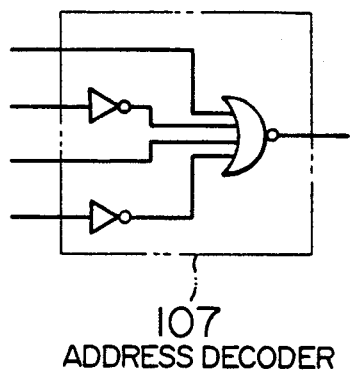
Figure 5:
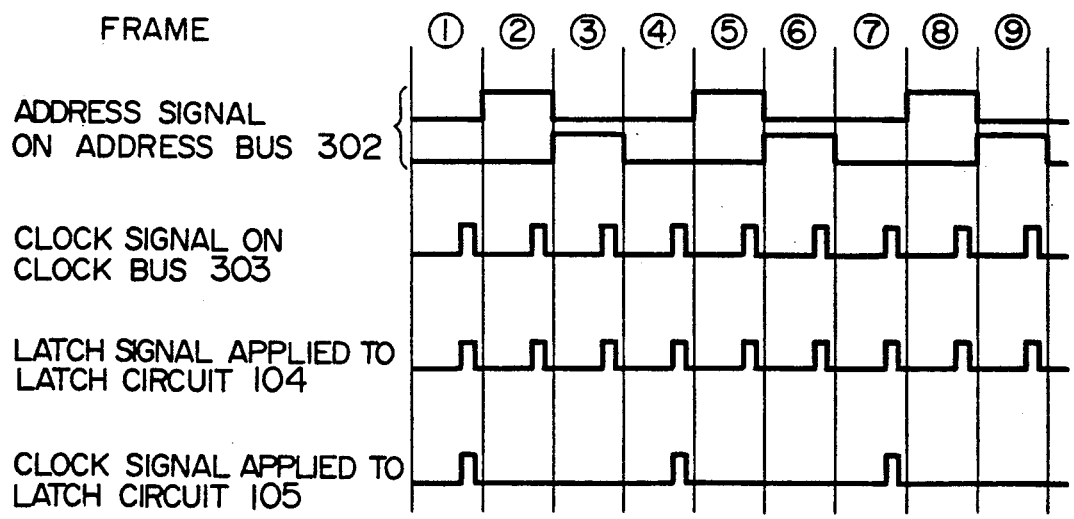
FIG. 5 is a timing diagram for illustrating operation of an exemplary embodiment of the invention.

The memory circuit 101 serves to store therein coefficients (weight values) for coupling between the functional block paired with the memory circuit 101 and other functional blocks and outputs the coupling coefficient (weight value) when the output of a functional block designated by the address signal at a given time point is inputted to the functional block paired with the memory circuit. At that time point, the output from the functional block designated by the address signal is present on the data bus 300. Accordingly, the multiplier 102 outputs a product of the signal from the abovementioned functional block and the coupling coefficient (weight value), whereon the product signal is applied to the adder 103. When the clock signal is applied at this time point via the clock bus 303, the results of the addition accumulated in the latch circuit 104 up to that time point is added with the output of the multiplier 102, the sum thus obtained being then stored in the latch circuit 104 as the updated accumulated value. Consequently, when the address signal has turned a round, the sum of the outputs from all the functional blocks weighted with the coupling coefficients, respectively, is obtained at the output of the latch circuit 104. The output of the latch circuit 104 at that time point is then stored in the latch circuit 105 to be retained therein as an internal value of the associated functional block during a period until the address signal turns a round subsequently. Parenthetically, it is to be mentioned that by resetting the content of the latch circuit 104 every time the addresses have turned a round, the functional block under consideration operates, so to say, as an adder of an analogue computer, while it operates as an integrator by accumulating the contents of the latch circuit 104 instead of resetting. FIG. 4A and 4B show, by way of example only, circuit configurations of the address decoders, respectively. More specifically, the circuit shown in FIG. 4A is used as the address decoder 107' mentioned above, the output of which assumes a high level only when all the inputs are "0", i.e. when the address signal indicates the address "0", i.e. when the address signal indicates the address "0" and otherwise assumes a low level. On the other hand, the circuit shown in FIG. 4B is employed as the address decoder 107, the output of which assumes the high level only when the address signal indicates its own address (i.e. the address allocated to that decoder 107) and otherwise assumes the low level. The address of concern can be established in an arbitrary manner by placing an inverted bit(s) at a given bit position(s) of the address signal.

In the case of the information processing system according to the illustrated embodiment of the invention, the number (N−1) of the scaler circuits which have heretofore been required to be incorporated in each of the functional blocks in a number corresponding to that of the other functional blocks in the prior art system can be reduced to one for each of the functional blocks. Besides, according to the illustrated embodiment, the number of the address which have heretofore been required to be incorporated in each of the functional blocks in a number (N−1) corresponding to that of the other functional blocks can be decreased down to one for each of the functional blocks. As a result, a numerical value expressed by a number of pulses can be expressed in the form of a pulse code. This in turn means that increasing in the processing time which has heretofore given rise to a problem in the time division processing is canceled out to great advantage.

Next, description will be made of an application of the system elucidated above to an analogue computer. In this conjunction, let's suppose, by way of example, that the following simultaneous differential equations are to be solved.

$$\frac{d}{dt} X = aX + bY \qquad (1)$$

$$\frac{d}{dt} Y = cX + dY \qquad (2)$$

In this case, there are employed two functional blocks 100 each composed of the functional circuit 10, the scaler circuit 11 and the time division circuit 12, wherein one of the functional blocks 100 is assigned with the address "1" with the other allocated with the address "2". Since both the functional blocks 100 are operated as the integrators, respectively, the latch circuit 104 incorporated in these functional blocks 100 are not reset in the course of calculation. Further, the output of the functional block assigned with the address "1" is defined to be X while that of the functional block having the address "2" is defined to be Y. On these conditions, the inputs to the functional blocks or the integrators are represented by the differentials of the outputs, respectively. Accordingly, the following expressions are valid:

$$\frac{d}{dt} X, \frac{d}{dt} Y$$

Accordingly, arrangement may be made such that the signal applied to the functional circuit 10 through the scaler circuit 11 can be given by the right-hand side of the expression (1) or (2) mentioned above. More specifically, when the pace or rate (indent) of the time for the integrating calculation is represented by $\tau$, the memory circuit 101 assigned with the address "1" is placed with "0" at the zero-th address, $\tau a$ at the first address and $\tau b$ at the second address, while the memory circuit assigned with the address "2" is placed with "0" at the zero-th address, $\tau c$ at the first address and $\tau d$ at the second address. Subsequently, the latch circuits 104 are placed with the initial values of X and Y, respectively. Now, the preparation for the integration has been completed. Operation for the calculation is effectuated by generating by means of the timing generation circuit 102 the address signals repeating "0", "1", "2", "0", "1", "2", "0", "1" and so forth every frame onto the address bus 302 and the clock signal containing one pulse for each frame onto the clock bus 303. On the conditions, the address signal is "0" in the first frame. Accordingly, the outputs of both the memory circuits 101 one of which is shown in FIG. 3 are "0". Consequently, the outputs of both the multipliers 102 are also "0". The output of the adder 103 is equal to the output of the associated latch circuit 104, i.e. the initial value of X or Y. At that time, application of the clock signal to the latch circuit 104 does not alter the state of the latch circuit 104 in which the initial value of X or Y is held, i.e. the initial value of X or Y remains unchanged. On the other hand, the latch circuit 105 fetches the output of the latch circuit 104, i.e. the initial value of X or Y in response to the clock signal contained in the instant frame. Subsequently, in the second frame, the address signal becomes "1", resulting in that the buffer circuit 106 of the functional block assigned with the block address of "1" is activated, while the content of the latch circuit 105 of the block address "1", i.e. the initial value of X is outputted onto the data bus. Further, since the address signal is "1", the memory circuit 101 of the block address "1" outputs "τa", and the memory circuit 101 of the block address "2" outputs "τc". Consequently, the outputs of the multipliers 102 are "τaX" and "τcX", respectively. Accordingly, the outputs of the address 103 are "X+τaX" and "Y+τcX", respectively, which are then fetched by the latch circuits 104, respectively, in response to the clock signal within the instant frame. Since no clock signal is applied to the latch circuits 105, they continue to remain in the state where the original values of X and Y are held as they are. Next, in the third frame, the address signal becomes "2", and the initial value of Y is outputted onto the data bus, as the result of which the memory circuits 101 output "τb" and "τd", respectively. Consequently, the adder 301 adds "τbY" or "τdY" to the output of the associated latch circuit 104 to thereby output "X+τ (aX+bY)" or "Y+τ (cX+dY)". As can be understood from the expressions (1) and (2), the above value represents the value of X or Y after lapse of the minute time τ from the initial state. Within the instant frame (third frame), these values are fetched by the latch circuits 104 to be subsequently fetched by the latch circuits 105 as updated values of X and Y, respectively, within the fourth frame. Thereafter, the similar calculation is repeated. In this way, the simultaneous differential equations (1) and (2) can be solved at a pace of the time τ. By diminishing the temporal pace or duration τ, the time involved in the calculation is naturally increased. However, the accuracy of calculation can be improved correspondingly. Further, when a need arises for the adder in the sense used in conjunction with the analogue computer, a new value is written in the latch circuit 105 with the value of the latch circuit 104 being reset to zero within the frame for which the address signal is "0". Then, the functional block 10 can be operated as the adder. Thus, it will be appreciated that one and the same circuit can be employed as the integrator or alternatively as the adder by controlling correspondingly the generation of the reset signal mentioned above. Besides, it goes without saying that the multiplier 102 and the adder 103 can be so operated as to be capable of handling the negative numbers in terms of corresponding complementary numbers. It should further be added that the latch circuit 105 is not necessarily required when the time pace τ for the integration is selected to be sufficiently small.

The circuits themselves of the analogue computer described above are realized by the digital circuits. Accordingly, although the instability such as drift or phenomena inherent to the analogue circuits can be avoided, consideration must be paid to the instability ascribable to the principle of the analogue computer such as the positive feedback and others. In the analogue computers known heretofore, the circuits themselves are realized by analogue circuits. For this reason, the cost of the analogue computer increases abruptly when the accuracy on the third or higher order of magnitude is to be realized. In reality, it has been unrealistic or impractical to realize the accuracy on the third or higher order of magnitude. However, in the case of the illustrated embodiment of the invention, the accuracy can readily be enhanced merely by increasing the number of the bits, since the circuits themselves are digital circuits. Besides, integration of the circuits is facilitated because of the digital nature. Heretofore, wiring of the functional blocks to one another has been carried out manually by using patch boxes or the like because of difficulty encountered in the integration of connector parts. Under the circumstance, the number of the functional blocks capable of being interconnected can not exceed one hundred at the most. In contrast, according to the instant embodiment of the invention, the wiring of the functional blocks to one another can be realized merely by writing the wiring information in the memory circuits 101 which can be easily integrated. Besides, the wiring information can be saved in a storage medium such as a magnetic disc or the like. Of course, the wiring information can also be automatically generated to be automatically written in the memories or storage equipment. It should further be added that in the case of the computer according to the instant embodiment, a plurality of the functional blocks operate simultaneously, which is advantageous in respect to the time involved in the calculation for solving simultaneous equations containing a large number of variables.

Next, description will be directed to the use of the system as a so-called neutral net. In that case, the functional block 100 shown in FIG. 3 corresponds to a single unit referred to as a neuron, so to say, while the scaler 11 corresponds to a synapse for receiving signals from the other neurons with the combination of the adder 103 and the latch circuit 104 corresponding to a so-called dendron (of the cell body). Weighting of the individual synapses is realized by storing the weight coefficients in the memory circuits 101. The negative weight coefficient provides a suppressing effect, while the positive weight coefficient provides an exciting effect. As the absolute value of the coefficient increases, the weight becomes more significant. Thus, by rewriting the contents of the memories 101, operation referred to as the learning is rendered possible, which will be described later on. In the case of the analogue computer, the numerical value represented by the output of the latch circuit 104 is utilized as the output value of the associated function block as it is (or by discarding the less significant bits). However, in the case of the neural net, the output value of the neuron 100 is given as the result of numerical transformation of the output of the latch circuit in accordance with the sigmoid function expressed by $$F(X) = \frac{1}{1 + e^{-kX}} \quad (3)$$

or in accordance with a function approximating the sigmoid function by polygonal lines as follows:

$$F(X) = \begin{bmatrix} 1 & : a \leq X \\ \frac{X}{2a} + \frac{1}{2} & : -a < X < a \\ 0 & : X \leq -a \end{bmatrix} \quad (4)$$

The circuit for performing the numerical transformation is provided between the latch circuits 104 and 105 or between the latch circuit 105 and the buffer circuit 106. Alternatively, the numerical translation can be realized by a control apparatus (not shown) for controlling the whole system. The circuit for the numerical transformation in accordance with the polygonal function given by the expression (4) can be implemented in such a circuit configuration as shown in FIG. 6A, by way of example. In this figure, a reference numeral 610 denotes input terminal and 611 denotes output terminal. Connected to one inputs of comparators 601 and 602, a multiplier 603, selectors 604 and 605 and an adder 603 are the signals representative of numerical values "a", "−a", "½a", "1", "0" and "½", respectively. When the numerical value represented by the input signal applied to the input terminal 610 is greater than "a", the comparator 601 controls the selector 604 so that the signal representative of "1" is outputted from the output terminal 611. When the numerical value represented by the input signal is not greater than "−a", the comparator 602 controls the selector 605 so that a signal representative of the numerical value "0" is outputted through the output terminal 611. When the numerical value represented by the input signal lies between "a" and "−a", the signal passed through the multiplier 603 and the adder 606 is outputted to the output terminal 611. In this way, the numerical transformation in accordance with the function given by the expression (4) can be realized by using the circuit shown in FIG. 6A. The numerical transformation in accordance with the sigmoid function given by the expression (3) or other complicated functions can easily be realized by using a memory circuit 603, as shown schematically in FIG. 6B. In this case, output values are previously calculated for the input values, respectively, and stored in the memory circuit 608 at addresses designated by the input signals, wherein the data stored in the memory circuit 608 are read out as the output values 611 to be utilized by addressing the memory with the input signals 610. With this arrangement, the numerical transformation can be realized no matter how complex the functions to be resorted to are.

Figure 7:
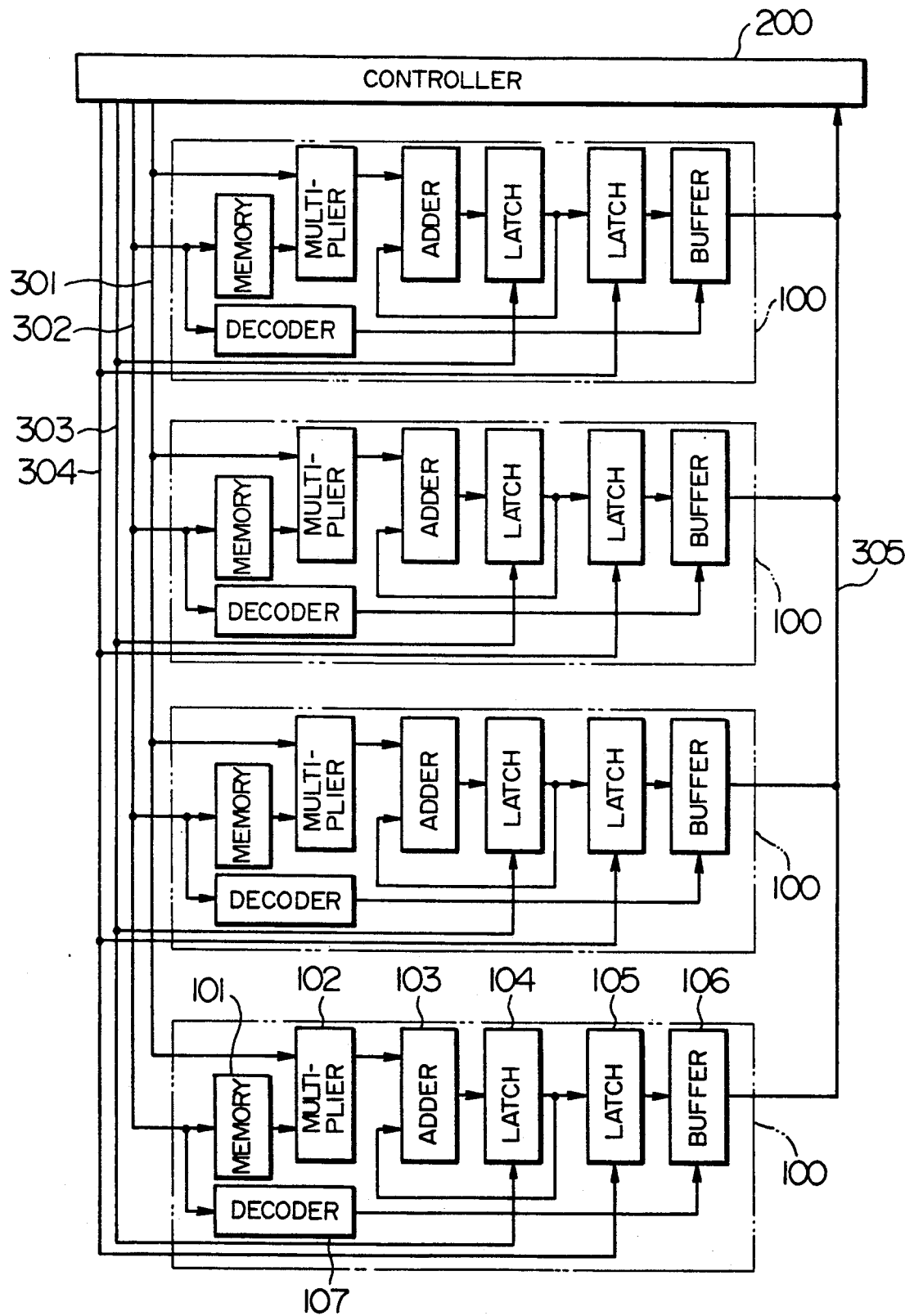
FIG. 7 is a diagram showing a neural network implemented by applying the information processing system according to an embodiment of the intention.

Now, description will be made in detail of a neural network implemented according to an embodiment of the present invention by reference to FIG. 7. In this figure, the neuron is generally denoted by a reference numeral 100. For simplification of the description, only four neurons connected to one another are shown in FIG. 7. As described hereinbefore in conjunction with FIG. 3, each of the neurons includes a memory 101 for storing the weight value, a multiplier 102 for multiplying an input signal thereto with the weight value, an adder 103 and a latch circuit 104 for determining a total sum of the products produced by the multiplier 102, a latch circuit 105 for storing the abovementioned sum, a buffer circuit 106 having tri-state output, and a decoder 107 for deciding whether or not the associated neuron 100 is selected. Each of the neurons 100 is connected to a control apparatus 200 via a bus. In the case of the instant embodiment, the timing generator 120 shown in FIG. 2 and the function transformation circuit shown in FIG. 6A or 6B are incorporated in the control apparatus or controller 200. Further, reference numerals 301, 302, 303 and 304 denote buses for sending the input signal, address signal, clock signal and the cycle signal to each of the neuron 100 from the controller 200. A numeral 305 denotes a bus for sending the output signal from each of the neurons 100 to the controller 200. Although it is shown in FIG. 7 that data bus 300 described hereinbefore is divided into the input bus 301 for the input signal and the output bus 305 for the output signal, it should be appreciated that the common data bus 300 described hereinbefore in conjunction with FIGS. 2 and 3 may be used in place of them. Further, the cycle signal 304 may be generated on the basis of the clock signal 303 and the address signal 302 within each functional block (neuron) 100, as in the case of the embodiments illustrated in FIGS. 2 and 3. According to the instant embodiment, the latch circuit 104 is so implemented as to fetch the data in response to the edge of the clock signal applied through the clock bus 303. Each of the neurons 100 is assigned with an address inherent thereto (also referred to as the neuron address or block address). Upon occurrence of coincidence between the neuron address and the address signal supplied from the control apparatus 200, the decoder 107 outputs a signal indicating the coincidence in the address.

Figure 8:
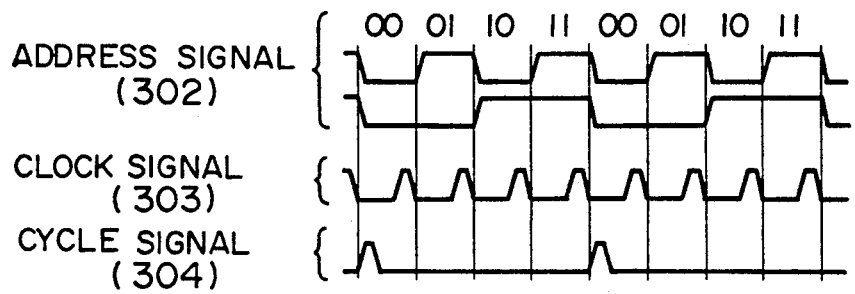
FIG. 8 is a timing chart for illustrating operation of the neural network shown in FIG. 7.

Next, description will be directed to operation of the neuron network shown in FIG. 7 by reference to a timing chart illustrated in FIG. 8. Referring to FIG. 8, the controller 200 sends out the address signal which represents repeatedly a sequence of the addresses of the individual neurons, the clock signals for allowing the latch circuits 104 to fetch the data every time the relevant addresses are designated, and the cycle signal which causes the latch circuit 105 to fetch the data every time the sequence of the addresses has made a round, respectively. The address signal sent simultaneously to the individual neurons 100 from the control apparatus 200 via the address bus 302 are applied to the decoder circuits 107, whereon only the buffer circuit 106 of the neuron designated by the address signal outputs the signal onto the output bus 305. The buffer circuits 106 of the other neurons remain in the state of high resistance (impedence). In this manner, the content of the latch circuit 105 of the neuron 100 designated by the address signal is sent to the control apparatus 200. The control apparatus 200 sends out the signal of concern to each of the neurons 100 via the input bus 301 as it is or after transformation in accordance with the sigmoid function or an approximating polygon function. In each of the neurons 100, the weight value for the counterpart neuron designated by the address signal at that time point is read out from the memory 101, whereon the product of the weight value and the input signal supplied from the control apparatus 200 via the input bus 301 is determined by the multiplier 102. Subsequently, a sum of the product outputted from the multiplier 102 and the numerical value accumulated in the latch circuit 104 until then is determined by the adder 103. The sum signal thus produced is then applied to the latch circuit 104. The latter fetches the sum data in response to the application of the clock signal supplied via the clock bus 303. Thus, during a period in which the addresses make a round, the total sum of the signals from all the neurons and the weight value is determined in the latch circuit 104. Upon application of the cycle signal from the bus 304, the total sum is fetched by the latch circuit 105 and represents the updated output value of the associated neuron 100. In this way, the system shown in FIG. 7 operates as a neuron network.

Figure 9:
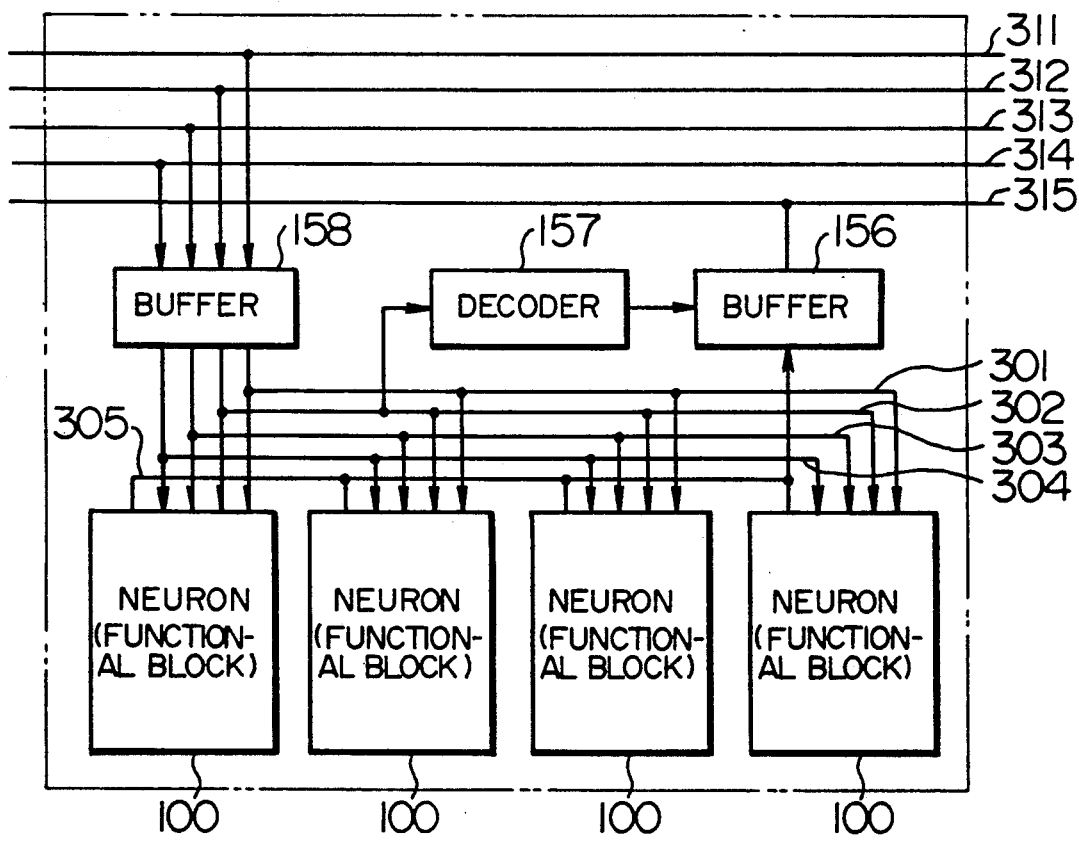
FIG. 9 is a schematic circuit diagram showing an improved portion of the information processing system shown in FIG. 2 or 7 according to another embodiment of the invention in which buses are implemented in a hierarchical structure.

By the way, when equation containing many independent variables are to be solved or in case complicated information processing is to be performed, there are required a large number of the functional blocks (neurons). In such case, the connection of the neural network shown in FIGS. 2 and 7 is disadvantageous in that the data bus 300 (301, 305), the address bus 302 and the clock buses 303, 305 are imposed with excessive loads, making it difficult more or less to drive the system. FIG. 9 is a schematic circuit diagram showing a portion of an improved information processing system according to another embodiment in which buses are implemented in a hierarchical structure to evade the problem mentioned above. In this figure, one of functional block groups or neuron groups is shown. By interconnecting a large number of the circuits each of the configuration shown in FIG. 9 in such a manner as described hereinafter by reference to FIGS. 10 to 13, there can be realized a large scale neural network. Now referring to FIG. 9, reference numerals 100 denote the neurons, respectively, and 301 to 305 denote the buses of first hierarchical level (the lowmost level). This portion may be implemented similarly to the neurons (functional blocks) and the buses 301 to 305 shown in FIGS. 3 and 7. However, the bit number of the address bus 302 and the capacity of the memory 101 for storing the weight values have to be increased over those described hereinbefore in conjunction with FIGS. 3 and 7 in order to be able to realize the large scale neural network. Further, in FIG. 9, reference numerals 311, 312, 313, 314 and 315 denote buses of a second hierarchical level for transmitting the input signal, address signal, clock signal, cycle signal and the output signals, respectively. The buses 311 to 314 of those of the second hierarchical level send out the signals to the buses 301 to 304 of the first hierarchical level, respectively, through a buffer circuit 153, while the output bus 315 of the second hierarchical level receives the signal from the output bus 305 of the first hierarchical level by way of a tristate buffer circuit 156. A decoder 157 serves for deciding as to whether or not there exists the neuron (functional block) 100 designated by the address signal in the neuron group (functional block group) 700 under consideration. When the answer of this decision is affirmative, the data on the output bus 305 of the first hierarchical level is sent out onto the output bus 315 of the second hierarchical level. On the other hand, when the above decision results in the negative answer, the output of the tri-state buffer 156 is sent to the state of high resistance. By preparing a large number of the neuron groups (functional block groups) 700 each of the structure shown in FIG. 9 and connecting them through the buses 311 to 315 of the second hierarchical level to one another, it is possible to interconnect a greater number of the neurons (functional blocks) 100 without increasing excessively the capacities added to the individual buses.

Figure 10:
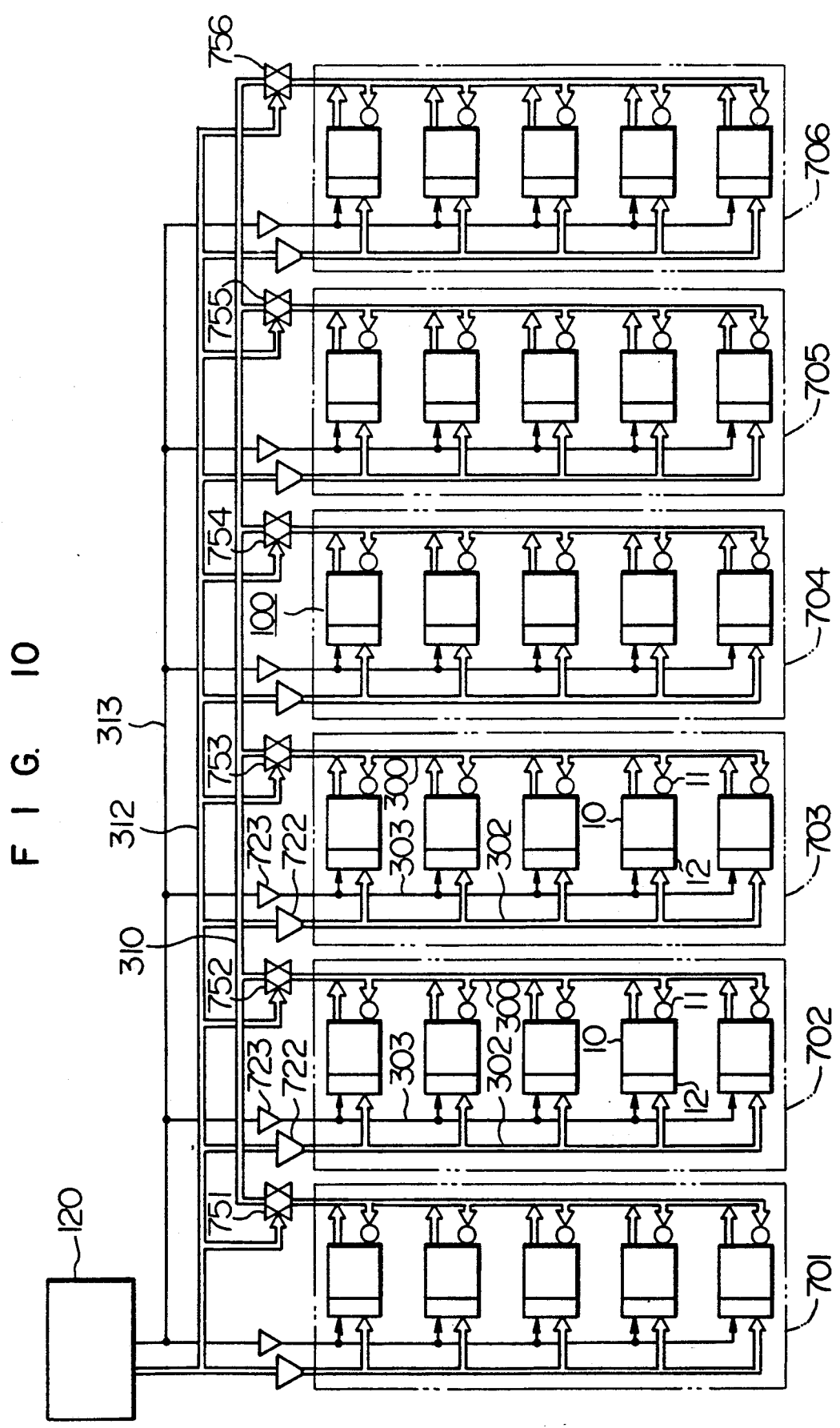
FIG. 10 is a schematic circuit for illustrating a method of interconnecting the buses of hierarchical structure according to an embodiment of the invention.

FIG. 10 is a schematic circuit for illustrating a method of interconnecting the buses of the hierarchical structure. In FIG. 10, reference numeral 701 to 706 denote the functional block groups (neuron groups) each incorporating a plurality of the functional blocks (neurons) 100. The connection within each of the functional blocks as well as the interconnection thereof is made as shown in FIGS. 2 and 7. In FIG. 10, reference numerals 300, 302 and 303 denote a data bus (including an input bus 301 and an output bus 305), an address bus and a clock bus, respectively. Further, reference numerals 310, 312 and 313 denotes a high level data bus (input bus 311 and output bus 315), a high level address bus and a high level clock bus, respectively. Although the description of the embodiment now under consideration is based on the assumption that the cycle signal 304 is generated within each functional block (neuron) 100 on the basis of the clock signal (303) and the address signal (302), as in the case of embodiment shown in FIG. 3, it should be understood that the cycle signal bus can also be implemented in the hierarchical structure as illustrated in FIG. 9. Now turning to FIG. 10, the address signal and the clock are outputted onto the high level address bus 312 and the high level clock bus 313, respectively, from the timing generator 120 and supplied also to the address bus 302 and the clock bus 303 through drive circuit 722 and 723, respectively. (Each of the drive circuits 722 and 723 corresponds to the buffer 158 shown in FIG. 9.) In the case of the system shown in FIG. 10, different addresses are assigned to the individual function blocks (neurons), respectively, so that the functional block (neuron) can be definitely determined by the address allocated thereto. On the other hand, the data signal is coupled to the high level data bus 310 through the medium of bidirectional driver circuits 751 to 756 (each corresponding to the buffer 158 or 156 shown in FIG. 9) which are controlled by the address signal, wherein only the bidirectional drive circuit (one of the circuits 751 to 756) constituting a pair with the functional block group or neuron group (one of the groups 701 to 706) which includes the functional block (neuron) 100 designated by the address signal transkits the signal on the low level data bus 300 onto the high level data bus 310, while the other bidirectional drive circuits transmit the signal from the high level data bus 310 onto the low level data bus 300. Accordingly, also in the case of the embodiment shown in FIG. 10, the output of the functional block (neuron) designated by the address signal is transmitted simultaneously to all the functional blocks (i.e. all the neurons). Incidentally, when the number of the functional blocks (neurons) is to be further increased, this can be accomplished by providing a functional block group (neuron group) corresponding to the whole circuit structure shown in FIG. 10 (except for the timing generator 120) as a structure of hierarchically high level together with higher level data bus, address bus and clock bus. By deepening the hierarchical structure in this manner, it is possible to increase the number of the functional blocks (neurons) while maintaining the upper limit value of the load connected to the data bus and others lower than a predetermined value. The control of the bidirectional drive circuit in the manner described above can be realized, for example, by determining the address signal such that the more significant bits thereof designate the functional block group (neuron group) with the less significant bits designating the individual functional blocks (neurons), wherein only the more significant bits are applied to address decoder such as that shown in FIG. 4 to obtain the control signal.

Figure 11:
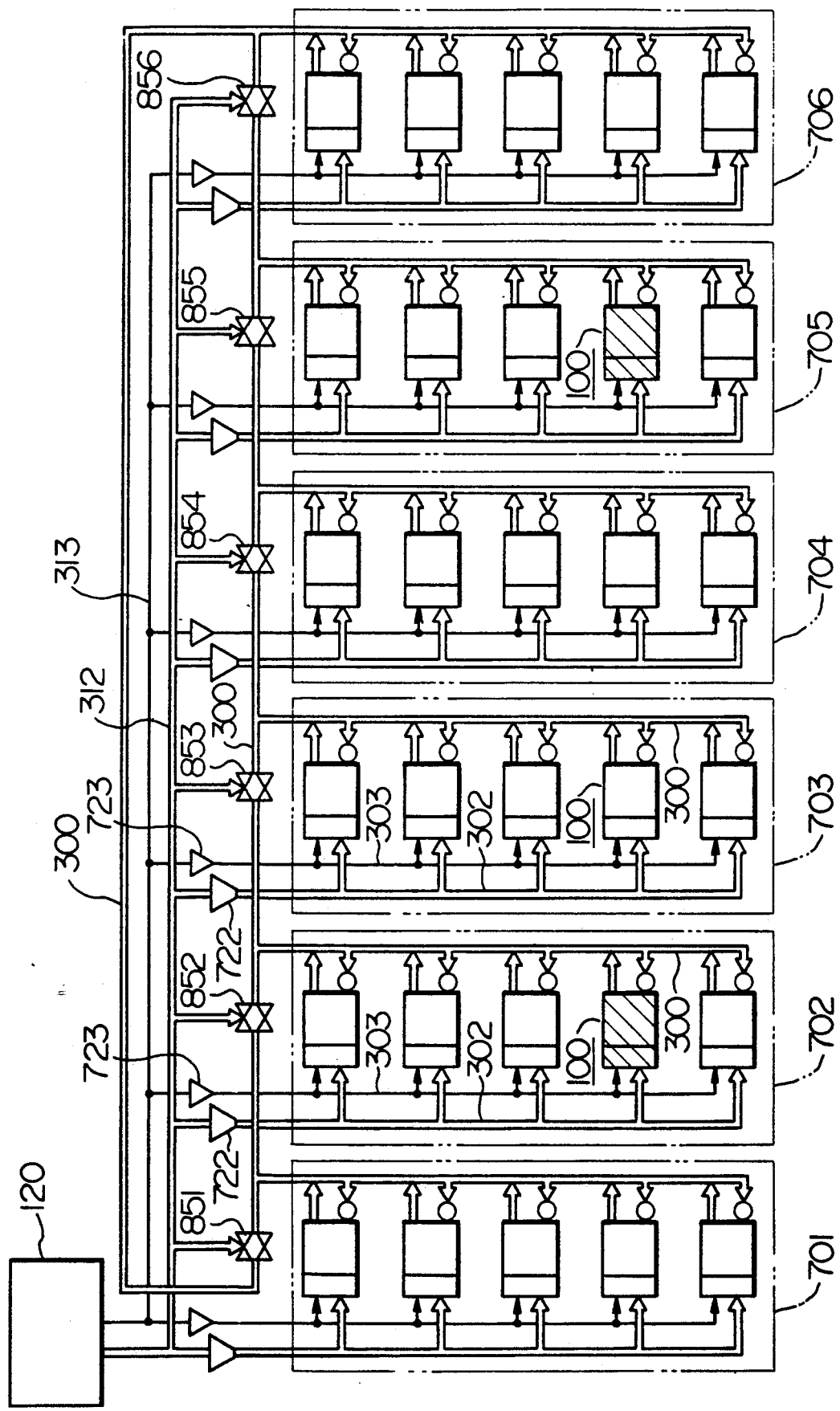
FIG. 11 shows a neuron network of an improved structure according to another embodiment of the invention which is arranged to decrease the processing time.

It is noted that when the number of the functional blocks or neuron is increased, there arises a further problem that the time involved in the processing increases. More specifically, in the system according to the invention, calculation progresses one step every time the address signal makes a round. Needless to say, as the number of the functional blocks or neurons increases, the upper limit value of the address signal increases correspondingly. This is turn means that the period taken for the address signal to make a round is correspondingly extended. This problem can not be evaded when all the functional blocks or neurons of concern are to be connected with all other functional blocks or neuron. In this conjunction, it is however noted that in many of practical applications, limitation of the range of the interconnection to a certain extent is not attended with problems of any significance. By way of example, let's suppose that temperature changes at individual portions or points of an object are to be determined by solving the equations of thermal diffusion. In that case, although the instantaneous change in temperature at the individual points on the object is subjected to influence of the temperature at the point in the vicinity, it is substantially insusceptible to the direct influence of the temperatures at the remote points. In general, the instantaneous change in many physical quantities such as, for example, propagation of the electromagnetic wave scarely undergoes the direct influence of the situations prevailing at remote points but is effected only by the state or situation at points located in the vicinity of the point of concern. Accordingly, when the system according to the present invention is to be operated as an analogue computer, there arises practically no problems so long as each functional block can be connected with the functional block located logically in the neighborhood of the former. FIG. 11 shows a neuron network of an improved structure according to another embodiment of the invention in which the processing time is shortened in consideration of the facts mentioned above.

Now referring to FIG. 11, reference numerals 701 to 706 denote, respectively, the functional block groups or neuron groups of the structure similar to those shown in FIGS. 9 and 10. The address signal and the clock signals are supplied from the timing generator 120 to a high level address bus 312 and a high level clock bus 313, respectively, and hence to an address bus 302 and a clock bus 303 through driver circuits 722 and 723, respectively, as in the case of the systems shown in FIGS. 9 and 10. Difference of the structure shown in FIG. 11 from those shown in FIGS. 9 and 10 can be seen in the connection of the data bus 300. More specifically, each of the data buses 300 is interconnected with only both the adjacent data buses through the bidirectional driver circuits 851 to 856, wherein the bidirectional driver circuit transmits the signal from the functional block group or neuron group including the functional block or neuron designated by the address signal only to the two adjacent functional block groups or neuron groups By way of example, let's suppose that the functional block or neuron 100 indicated by hatching in the functional block group or neuron group 702 of the neuron network shown in FIG. 11 is designated by the address signal. Then, the bidirectional driver circuit 852 transmits the signal from the functional block group (neuron group) 702 to the functional block group (neuron group) 852, while the bidirectional driver circuit 853 transmits the signal from the functional block group (neuron group) 702 to the functional block group (neuron group) 703. On the other hand, the bidirectional driver circuits 851 and 854 transmit no signal in either direction The control mentioned above can be achieved by constituting each of the driver circuits 851 to 856 by a pair of buffer circuits of tri-state outputs connected together on the input side and the output side. In this supposed case, the output of the functional block or neuron designated by the address signal is transmitted to the individual functional blocks or neurons incorporated in the functional block groups (neuron groups) 701, 702 and 703 but not to those of the functional block groups (neuron groups) 704, 705 and 706. Again, assuming that one of the functional blocks or neuron in the functional block group (neuron group) 705 (e.g. the functional block or neuron indicated by batching in the functional block group or neuron group 705 shown in FIG. 11) is allocated with the same address as that mentioned above, the output of that functional block or neuron can be transmitted to the individual functional blocks or neurons included in the functional block groups (neuron groups) 704, 705 and 706 by the same address signal as that mentioned above. Similarly, by assigning a same address to one of the functional blocks or neurons included in the functional block group (neuron group) 701 and to one of the functional blocks or neurons in the functional block group (neuron group) 704, the output of the functional block (neuron) in the functional block group (neuron group) 701 can be transmitted to the functional blocks (neurons) included in the functional block groups (neuron groups) 701, 702 and 706, respectively, while the output of the functional block (neuron) included in the functional block group (neuron group) 704 can be transmitted to the individual functional blocks (neurons) of the functional block groups (neuron groups) 703, 704 and 705, respectively. Similarly, by assigning a same address to one of the functional blocks (neurons) included in the functional block group (neuron group) 703 and one of the functional blocks (neurons) in the functional block group (neuron group) 706, signal transmission can take place among the functional block groups (neuron groups) 705, 706 and 701 as well as in parallel with the signal transmission taking place among the functional block groups (neuron groups) 702, 703 and 704. By virtue of the arrangement described above, the upper limit value of the address signal is determined to be constantly thrice as large as the number of the functional blocks or neurons included in the single functional group (neuron group) regardless of the total number of the functional blocks or neurons in the neural network. Consequently, the time taken for the address signal to make a round can remain constant independent of the total number of the functional blocks or neurons. In the foregoing, it has been assumed that the data is to be transmitted only to the adjacent functional block groups (neuron groups). It should however be understood that data transmission can be made to take place not only to the immediately adjacent functional block groups (neuron groups) but also to those groups next thereto and hence among five functional block groups in total by correspondingly modifying the method of controlling the bidirectional driver circuits 851 to 856. In this case, although the upper limit value of the address signal is five times as large as the number of the functional blocks (neurons) included in the single functional block group (neuron group), the number of the functional blocks or neurons to which data can directly be transmitted from the single functional block or neuron can be increased by a factor of "5/3". When it is desired to increase the number of the functional blocks or neurons included in one functional block group (neuron group), this can be achieved by replacing each of the functional block groups (neuron groups) 701 to 706 by the whole system shown in FIG. 10 (exclusive of the timing generator 120) which is then regarded to be one functional block group (neuron group).

Figure 12:
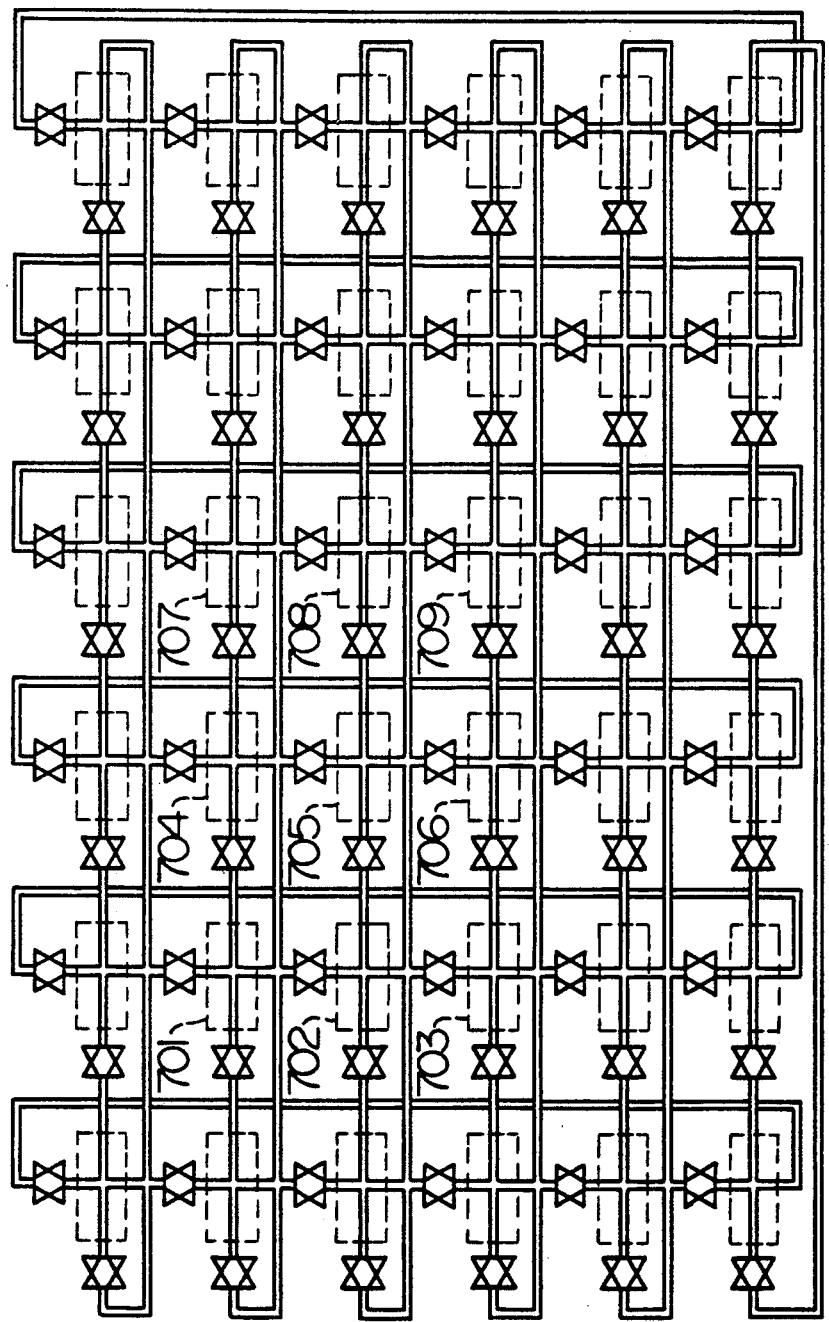
FIG. 12 is a schematic diagram showing an improved structure of the neural network of hierarchical bus structure according to still another embodiment of the invention.

In the structure shown in FIG. 11, the functional blocks (neurons) located one-dimensionally close to one another are interconnected. There can however be conceived such arrangement in which the functional blocks or neurons located two-dimensionally close to one another are interconnected. FIG. 12 is a schematic diagram showing an improved structure of the neural network in which functional blocks (neurons) located two-dimensionally close to one another are interconnected. It should be noted in connection with FIG. 12 that only the frames of the functional block groups (neuron groups) are shown together with the data bus and the bidirectional driver circuits with details of the internal structure of the functional block group (neuron group), the address bus, the clock bus and the timing generator being omitted from illustration, being understood that they are similar to those described hereinbefore by reference to FIGS. 9, 10 and 11. The control of the bidirectional driver circuits in the neuron network shown in FIG. 12 is performed in such a manner that when the address of a functional block or neuron included in a given one of the functional block groups (neuron groups) is designated, data is transmitted not only from the column including that given functional block group (neuron group) to the adjacent columns but also from the row including that given functional block group (neuron group) to the adjacent rows. More specifically, referring to FIG. 12 and assuming, by way of example, that one of the functional blocks or neurons included in the functional block group (neuron groups) 705 shown in FIG. 12 is designated, data is transmitted to the functional blocks (neurons) included in the functional block groups (neuron groups) 701 to 709, respectively. By virtue of this arrangement, it is possible to interconnect the functional blocks or neurons which are two dimensionally located close to one another.

Next, description will be made of a manner in which the information processing system according to the invention is integrated in the form of a wafer scale integration semiconductor circuit (hereinafter also referred to as WSI in abbreviation). With the phrase "the wafer scale integration semiconductor circuit or WSI circuit", it is contemplated to mean a semiconductor integration circuit integrated over a whole surface of the wafer size which can assure a higher degree of integration when compared with chip-like integration circuit obtained by cutting the wafer.

Figure 13:
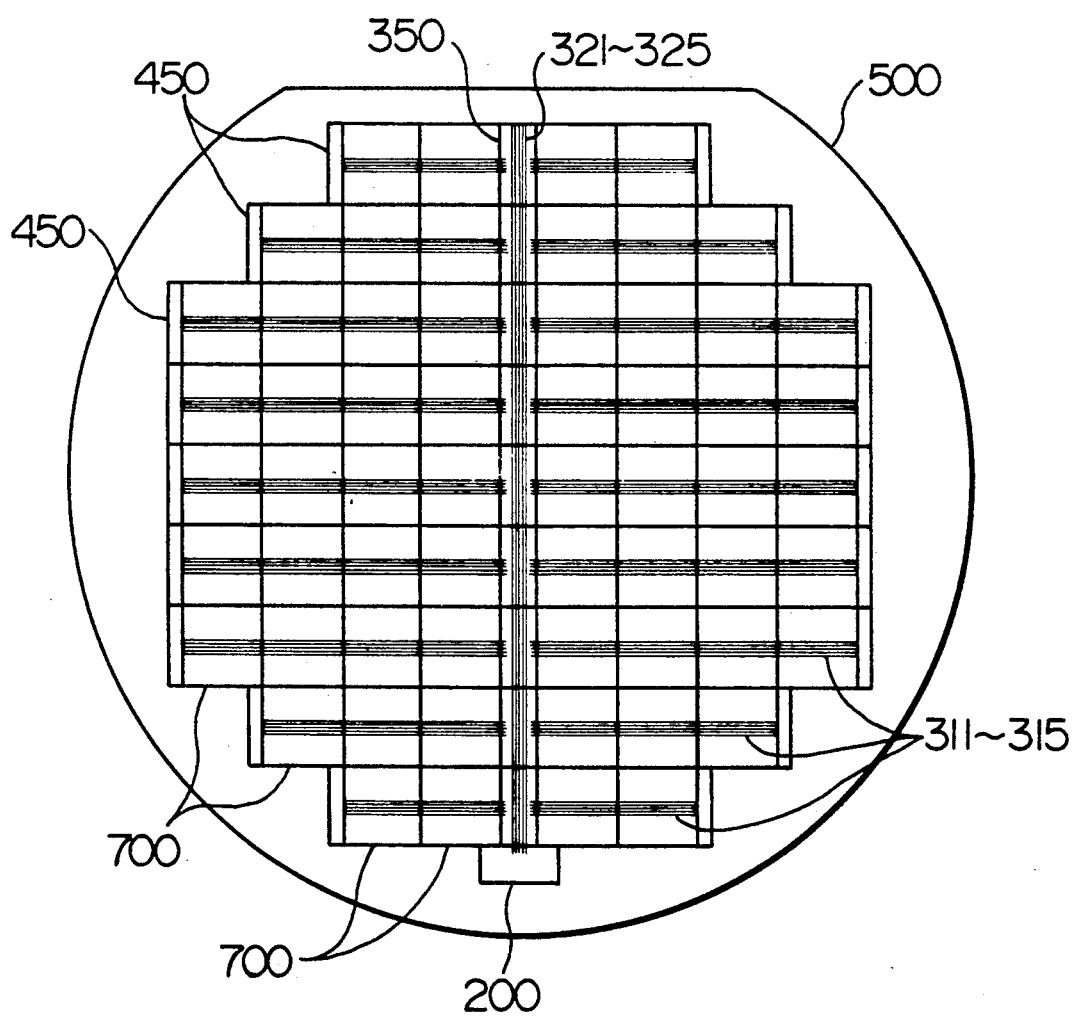
FIG. 13 is a schematic view showing the information processing system according to the invention which is realized in the form of a WSI (wafer scale integration circuit)
Figure 14:
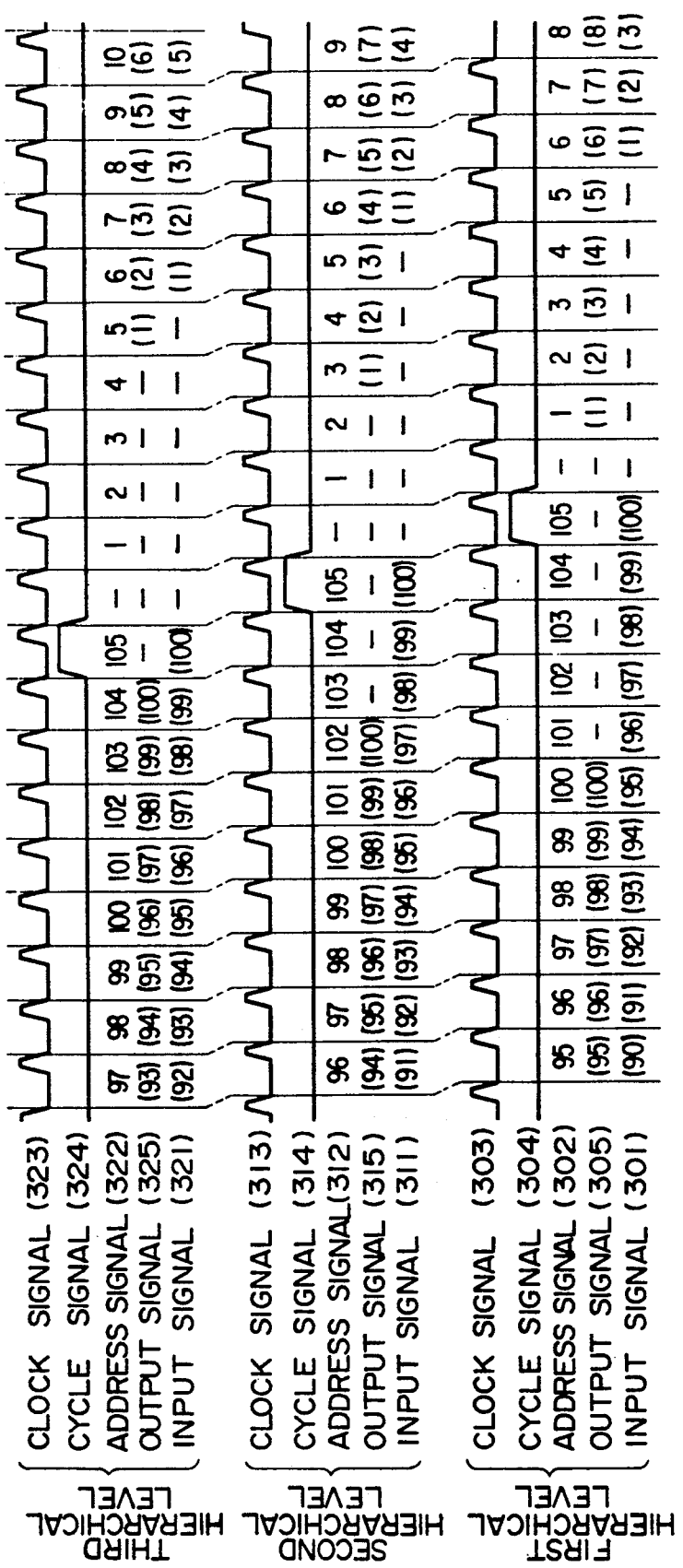
FIG. 14 is a timing chart for illustrating operation of the same.

FIG. 13 is a schematic view showing the information processing apparatus according to the invention which is realized in a single semiconductor substrate 500 in the form of the WSI (refer scale integration circuit) Referring to FIG. 13, reference numerals 700 denote the functional block groups or neuron groups described hereinbefore by reference to FIGS. 9 to 12, wherein sixty functional block groups or neuron groups are shown in FIG. 13 It is assumed, by way of example, that each of the neuron groups (functional block groups) is assumed to include nine neurons (functional blocks) and thus 540 of neurons (functional blocks) in total are integrated in a single wafer. Referring to FIG. 13, reference numerals 311 to 315 denote buses formed horizontally and having the second hierarchical level. A plurality of the buses are provided over the whole surface of the substrate. Reference numerals 321 to 325 denote buses of a third hierarchical level formed in the vertical direction. It will be noted that only one set of the vertical buses is provided at a center region of the substrate. In the case of the instant embodiment, the neuron groups (functional blocks) 700 are interconnected by the buses 311 to 315 of the second hierarchical level in a number ranging from two to four, wherein the buses 311 to 315 of the second hierarchical level are connected to buses 321 to 325 of a third hierarchical level by way of a buffer part 350. The buffer part 350 has a structure similar to the connection between the buses 301 to 305 of the first hierarchical level and the buses 311 to 315 of the second hierarchical level and includes the input buffer, the decoder and the output buffer, as in the case of the structures shown in FIGS. 9 to 12. At one ends of the buses 321 to 325, there is provided the control apparatus 200 which includes the timing generator 120 and the function transformation circuit shown in FIG. 6A or 6B. With this arrangement, it is possible to realize a neural network in which all the neurons (functional blocks) are interconnected while suppressing the maximum bus length to the diameter of substrate at the most. Concerning the power supply source, a power supply bus (not shown) can be so formed as to run in parallel with the buses 311 to 315 of the second hierarchical level so that the power can be supplied form power source parts 450 provided at both ends, thereby a large number of power source points can be assured.

The wiring conductors to be used for the power supply bus (not shown), the buses 311 to 315 of the second hierarchical level, the buses 321 to 325 of the third hierarchical level should be greater in width than the wiring conductors 301 to 305 used internally of the neuron groups (functional block groups) 700 and the buffer 350 should be wired with a greater space. This is because care must be taken so that these buses 311 to 315 and 321 to 325 of great lengths should not present high wiring resistance and that the fault ratio should be lowered since otherwise occurrence of faults such a breakage, short-circuit and others in the buses of high hierarchical level will make inoperative many neurons (functional blocks) connected to these buses For the failure which exerts influence to only a small number of the neurons (functional blocks), it is possible to exclude the neurons susceptible to the influenced of failure by setting the weight values thereof to zero on the side of the normal neurons (functional blocks).

Further, it is also possible to provide a buffer circuit (not shown) on the wafer 500 at the position of the control apparatus 200 in place thereof, wherein the buffer is connected to the control apparatus 200 provided externally of the wafer. When a fault should occur in the control apparatus 200, the whole system is rendered inoperative. Accordingly, by providing the control apparatus 200 externally of the wafer 500 as described above, the control apparatus suffering a fault can easily be replaced or repaired. Besides, the fault ratio can be decreased by multiplexing the buffer circuit for the external connection or for connection of the control apparatus. Alternatively, the buffer circuit may be provided at a center portion where tu yield is expected to be high. Further, a plurality of substrates 500 may be provided and connected to buses of the fourth hierarchical level by way of the buffer circuit mentioned above to thereby interconnect the plurality of wafers 500 for the purpose of implementing a neural network of a larger scale, as will be described later on.

When the number of the hierarchical levels for the buses is increased, the delay time involved in the transmission of the signal (data) produced by a terminal one of the neurons (functional blocks) 100 to another terminal neuron (functional block) 100 by way of the control apparatus 200 will be increased. In this conjunction, it should be mentioned that by inserting a latch circuit in the circuitry including the buffer for connecting the buses of the high and low hierarchical levels for synchronizing the signal transmission, a pipeline processing can be performed to prevent the processing time from being increased. An example of the timing control to this end will be elucidated in detail by reference to FIG.

14 on the assumption that the number of the neurons (functional blocks) is one hundred for simplification of the description. For the clock signal, it is preferred to use a circuit assuring as high a transmission rate as possible so that the clock signal can travel from the bus 323 of the third hierarchical level to the bus 313 of the second hierarchical level and thence to the bus 303 of the first hierarchical level with a shortest possible propagation delay time. All the other signals are transmitted in synchronism with the clock signals of the relevant hierarchical levels. The address signal is supplied in such a manner in which the addresses "1" to "100" required for designating the individual neurons (functional blocks) and the addresses "101" to "105" required for the time division control are repeated with an interval corresponding to one clock being interposed upon return of the maximum address value "105" to the minimum address value "1". For transmission in synchronism with the clock signal, the addresses are shifted by one clock upon propagation from the second hierarchical level to the first hierarchical level. Since the individual neurons (individual functional blocks) are connected with the address bus 302 of the first hierarchical level (refer to FIGS. 3, 7 and 9), the output value of the neuron (functional block) 100 designated by the address on the bus 302 is outputted onto the output bus 305 of the first hierarchical level. At this time, the abovementioned output signal is sent to the output bus 315 of the second hierarchical level and thence to the output bus 325 of the third hierarchical level while being shifted one by one clock in synchronism with the clock signal. The output signal is applied to the input bus 321 via the control circuit 200. In that case, when synchronization with the clock signal is realized within the control circuit 200, the signal is shifted by one clock. The signal is then sent to the input bus 311 of the second hierarchical level and thence to the input bus 301 of the first hierarchical level while being shifted again one by one clock. In this way, after the time lapse corresponding to five clocks from the arrival of the address signal at the address bus 302 of the first hierarchical level, the signal from the neuron (functional block) 100 designated by that address signal can reach all the neurons (functional blocks). Thus, in each of the neurons (functional blocks), the cumulative addition is performed for the signal by regarding that the signal originates in the neuron (functional block) of the address which is smaller by five than the numerical value indicated by the address signal. By virtue of the arrangement described above, the period of the clocks signal can be shortened when compared with the case where no synchronism is realized in the inter-bus transmission.

Figure 15:
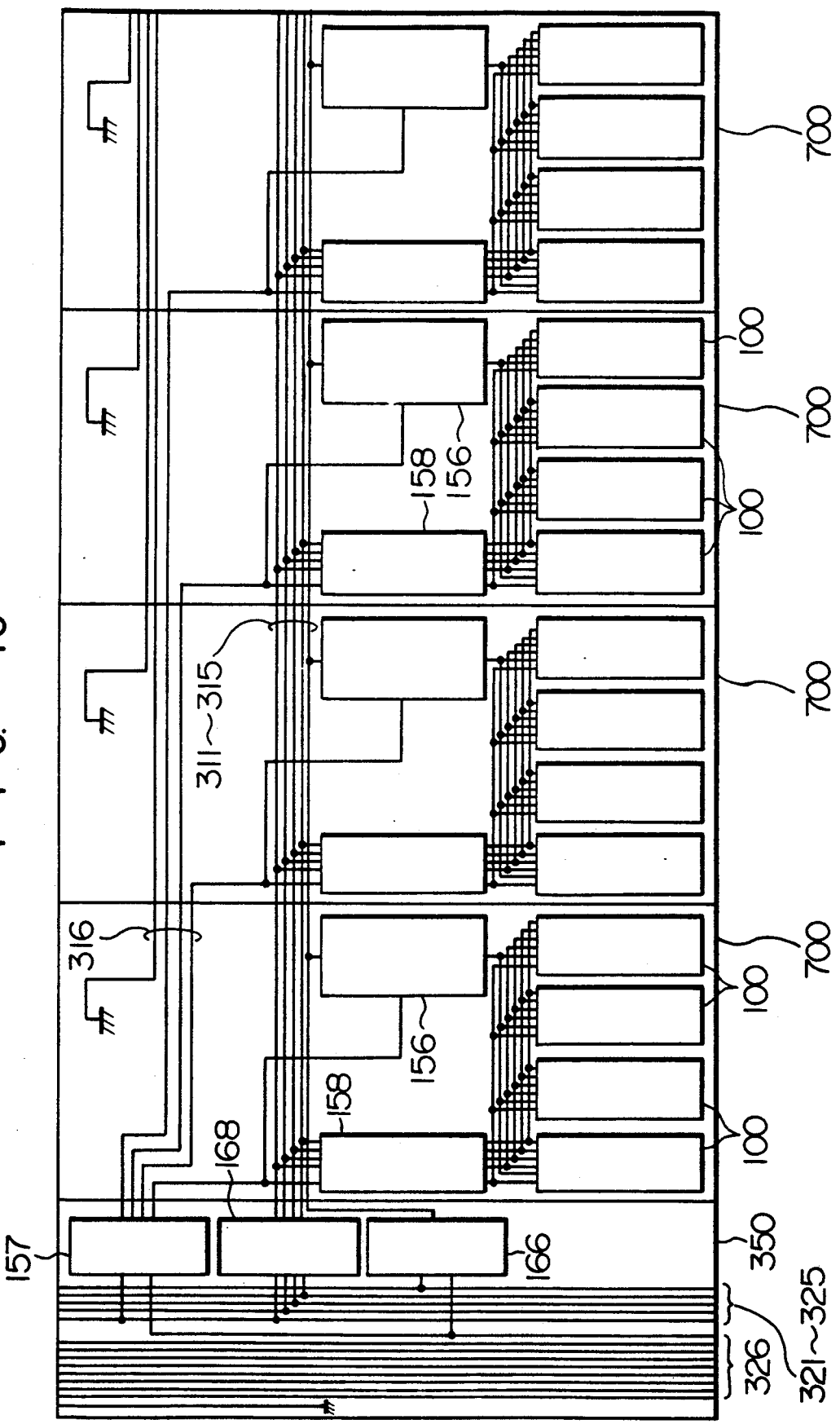
FIG. 15 is a circuit diagram showing in detail a portion of the embodiment shown in FIG. 13.

When the integrated circuit is to be formed over the whole surface of the semiconductor substrate 500 having the diameter of as large as several inches as shown in FIG. 13, resolution power will inevitably be degraded when irradiation for exposure is to be performed all at once in a step of forming a pattern through irradiation of a photoresist layer applied over the substrate 500. Accordingly, it is a general practice to expose the substrate divisionally through several irradiation steps by selecting one neuron group (functional block group) as one unit for the exposure. In this connection, it is noted that when the patterns of the individual neuron groups (functional block groups) should differ from one another even only a bit, there arises the necessity to prepare the masks for all the patterns or the neuron groups. This means that an enormous number of different mask must be prepared which is too expensive and uneconomical. On the other hand, the individual neurons (functional blocks) are assigned with the addresses determined specifically for the neurons, respectively, and each necessitates the function for discriminatively identifying the specific address assigned thereto. In other words, it is necessary to be capable of discriminatively identifying the individually specific addresses without changing or altering at all the internal structures of the individual neuron groups (functional block groups). FIG. 15 is a schematic circuit diagram showing a structure of the neural network which can dispose of successfully the problems mentioned above.

FIG. 15 shows a right half of one row of the neuron groups (functional block groups) shown in FIG. 13. In FIG. 15, reference numeral 700 denotes generally the neuron groups (functional block groups), respectively. Further, a numeral 100 denotes a neuron or a functional block, numerals 311 to 315 denote buses of the second hierarchical level, numeral 156 denotes a tri-state buffer and a numeral 158 denotes a buffer circuit. These constituents are interconnected in the manner illustrated in FIG. 9. A numeral 350 denotes a part for interconnecting the buses 321 to 325 of the third hierarchical level and the buses 311 to 315 of the second hierarchical level, numeral 166 denotes a tri-state buffer and 168 denotes a buffer circuit. It should be noted that the decoder 157 incorporated in each of the neuron groups (functional block groups) in the network shown in FIG. 9 is mounted in the connecting part 350 for interconnecting the buses of the third and second hierarchical levels. The output of the decoder 158 is sent to each of the neuron groups (functional block groups) 700 through a bus 316 of four bits. This bus 316 is so formed as to be shifted by one bit upon every passing through the neuron groups (functional block groups) 700, as can be seen in FIG. 15. The decoder 157 produces the output of high level only for the neuron groups (functional block groups) 700 that includes the neuron (functional block) 100 designated by the address signal. With such implementation, it is possible to select only the aimed one of the neuron groups (functional block groups) 700 notwithstanding that all the neuron groups (functional block groups) 700 are of the utterly same configuration. Each of the neurons 100 within each neuron group (each functional block group) can make decision as to whether the neuron itself is selected or not with the aid of the two less significant bits of the address signal and the signal sent from the decoder 157. Accordingly, the similar procedure can also be applied to the connection part 350 for selecting only one aimed row. In this case, the result of decoding the more significant bits of the address signal is sent to each of the connection parts 350 by way of the bus 326 of nine bits. Since the bus 326 of nine bits is so formed as to be shifted one by one bit for every row, it is possible to select the only one aimed row regardless of the utterly same configuration of the connection parts 350. According to the teaching of the invention described above by reference to FIG. 15, the number of the photomasks required for forming the neuro-WSI shown in FIG. 13 can be decreased to five sets, i.e. one for the neuron groups (functional block groups) 700 of the right-hand side, another for the neuron groups (functional block groups) 700 of the left-hand side, another for the connection parts 350, another for the control circuit 200 or for the circuit for external connection and the other for the power supply pads 450. Parenthetically, it is noted that when the procedure mentioned above is adopted by using the semiconductor substrate 500 of a circular form, blank number addresses may take place. This problem can be coped with by skipping the blank number address when the address signal is sent from the control apparatus 200. In this manner, increasing in the processing time can be avoided, needless to say. Besides, instead of providing the decoders 107 in the neurons or the functional blocks 100 (refer to FIGS. 3 and 7), respectively, they may be provided en block or in a set in each neuron group (each functional block group) 700. In that case, the individual neurons (functional blocks) can be realized in the same circuit configuration, which apparently facilitates the circuit design.

Next, description will be made of an improved information processing apparatus implemented in the WSI form by making use of the fault tolerance of the neural network and an excellent repeatability of the functional blocks (neurons).

Figure 16:
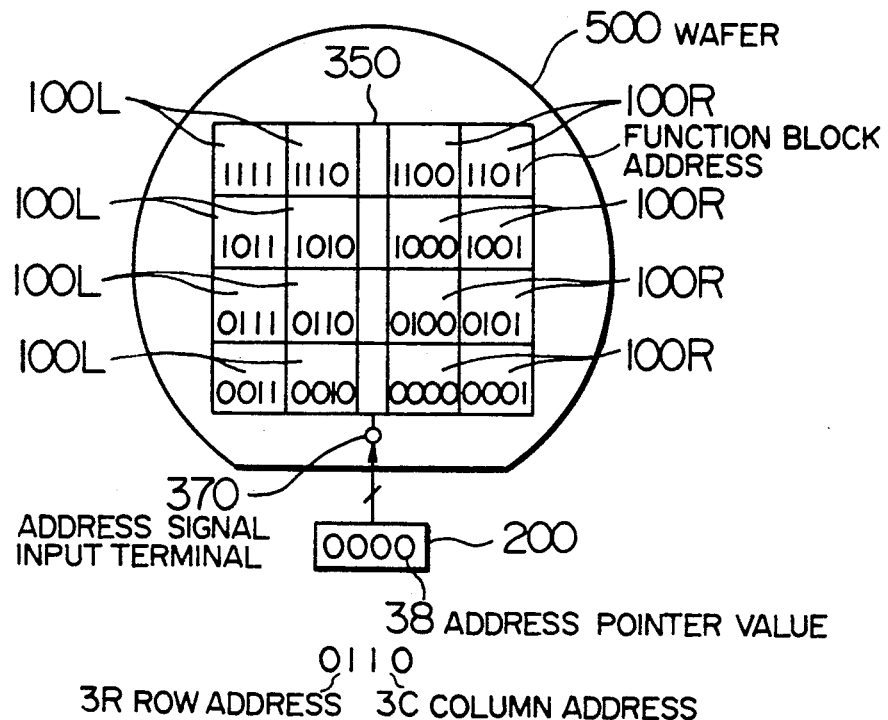
FIG. 16 is a view showing a structure of the information processing system integrated in the form of a WSI according to yet another embodiment of the invention.

FIG. 16 is a view showing an improved structure of the information processing apparatus integrated in the form of WSI according to yet another embodiment of the invention. Although the following description is based on the assumption that sixteen functional blocks (neurons) are integrated, the illustrated structure is never limited to any specific number of the functional blocks or neurons. In practical applications, five hundreds or more functional block (neurons) can be integrated on a single wafer 500. Referring to FIG. 16, 100R and 100L denote the functional blocks (neurons), and numerals entered in the blocks represent the addresses of the individual functional blocks or neurons 100R and 100L. A reference numeral 350 denotes a buffer part having address translation means 90 (refer to FIG. 17)for translating the input address signal to a signal differing therefrom for the output. A numeral 370 denotes an address input terminal to which the address signal is inputted. Further, a numeral 200 denotes a control apparatus including an address pointer, and 38 designates an address pointer value outputted by the address pointer of the control apparatus 200. In FIG. 16, the addresses of the individual functional blocks (neurons) 100R and 100L at the time when the address pointer value 38 is "0000" are indicated by the numerals within the associated blocks, respectively. Concerning the details of the address signal translation means 90 and the individual functional blocks (neurons) 100R and 100L, description will be made by reference to FIGS. 17 and 18, respectively.

Referring to FIG. 16, the number of the functional blocks (neurons) 100R and 100L is sixteen in total. Accordingly, for allocating the inherent or specific addresses to these neurons or functional blocks, four bits are sufficient for each functional block address. In the case of the example shown in FIG. 16, the two more significant bits of the four are used as the row address 3R with the two less significant bits being used as the column address 3L. Parenthetically, the bit number m for the actual address signal can be determined as follows:

$$2^{m-1} < N < 2^m \quad (5)$$

where N represents the number of the functional blocks or neurons.

Figure 17:
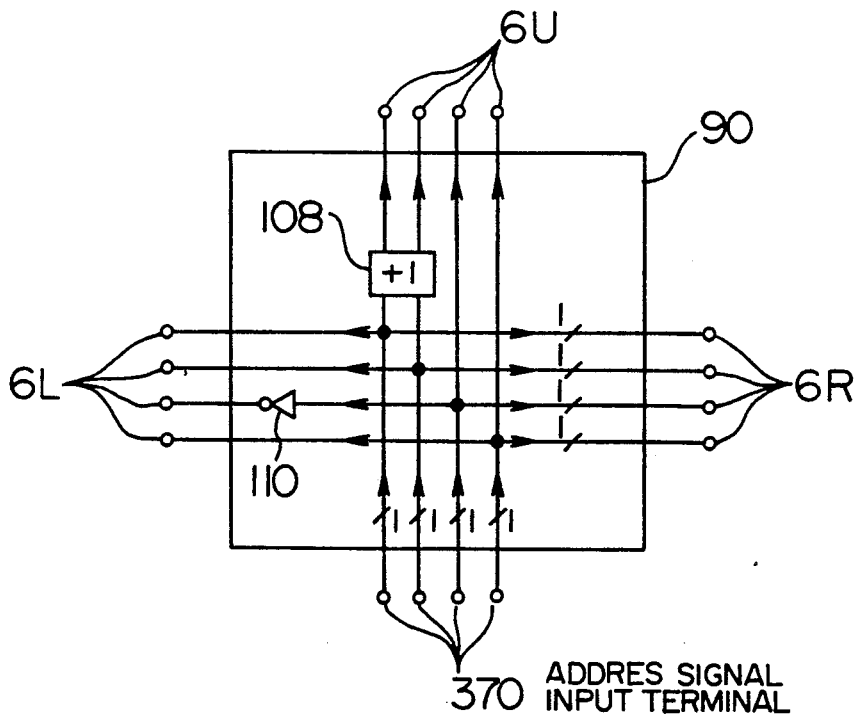
FIG. 17 shows an address signal translation block of the system shown in FIG. 16.

FIG. 17 shows the address translation means 90 incorporated in the buffer part 350. Although the buffer part 350 necessarily includes the buses for transmitting the clock signal and the data signal and the buffers, as described hereinbefore, they are omitted from the illustration in FIG. 16 for simplification with only the address signal translation means 90 being shown. This address translation means 90 corresponds to a part constituted by the address bus 326 and the decoder 157 shown in FIG. 15. In FIG. 17, a reference numeral 370 denotes an input terminal for the address signal, 6R denotes a right-hand output terminal for the address signal, 6L denotes a left-hand output terminal for the address signal, 6U denotes an upper output terminal for the address signal, 108 denotes a one-incrementor, and 110 denotes an inverter circuit for outputting the input logic signal after having inverted it. In the case of the instant embodiment of the address signal translation means or bock 90, the row address 3R constituted by the two more significant bit of the address signal inputted through the address signal input terminal 370 is added with "1" by the one-incrementor 108 to be then outputted to the upper output terminal 6U for the address signal. The one-incrementor 108 has two bit inputs and two bit outputs and realizes the translations or conversions of "00" to "01", "01" to "10", "10" to "11" and "11" to "00", respectively. The other bits are outputted with the input values as they were. The address signal inputted through the address signal input terminal 370 is outputted intact from the right-hand output terminal 6R for the address signal 6R. Outputted from the left-hand output terminal 6L for the address signal is a signal which corresponds to the bit of the second least significance of the column address 3C of the address signal inputted through the address signal input terminal 370 and which has undergone the logical inversion in the inverter circuit 110.

Figure 18A:
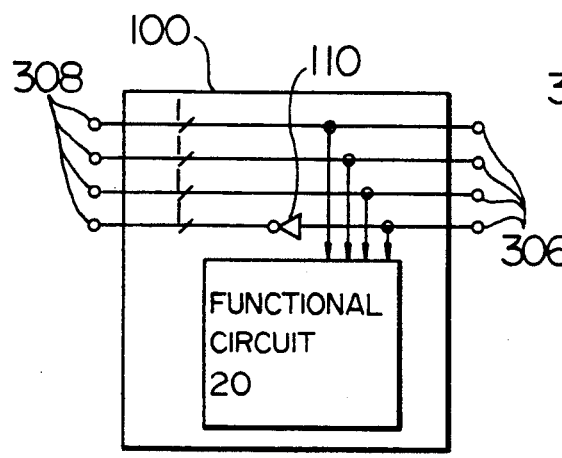
FIGS. 18A and 18B show functional blocks in the system shown in FIG. 16.
Figure 18B:
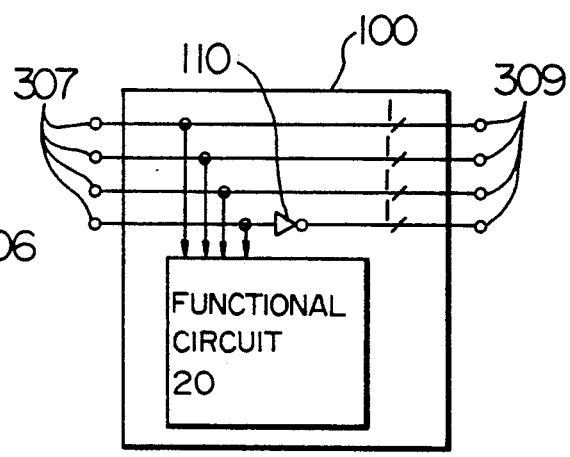

FIGS. 18A and 18B show the functional blocks (neurons) 100L and 100R, respectively. A reference numeral 20 designates a functional circuit which is designed in dependence on the contemplated or intended application of the WSI. In the case of the WSI for the neuron computer, by way of example, the functional circuit 20 is so designed as to calculate neuron models and thus equivalent to the functional block or neuron 100 described in the foregoing. In FIG. 18A and 18B, arrangement concerning the address bus in the functional block 100 is shown with the other details being represented by the functional circuit 20. In the figures, reference numerals 306 and 307 denote address signal input terminals, respectively, and 308 and 309 denote address signal output terminals, respectively. The functional block 100L receives the address signal inputted through the right-hand address signal input terminal 306 and outputs through the left-hand address signal output terminal 308 a signal which corresponds to the least significant bit of the column address 3C of the inputted address signal and which has been logically inverted by the inverter circuit 110. The functional circuit 20 receives the address signal via the address signal input terminal 306. Similarly, the functional block 100R also receives the address signal inputted via the left-hand address signal input terminal 307 and outputs via the right-hand address signal output terminal 309 a signal corresponding to the least significant bit of the column address 3C of the input address signal which has undergone logical inversion through the inverter circuit 110. The functional circuit 20 is inputted with the address signal via the address signal input terminal 307.

The four buffer parts 350 having the address signal translating function, the eight functional block 100R and the eight functional blocks 100L illustrated in FIG. 16 are connected in such a manner as mentioned below. In the horizontal direction (i.e. in the rowwise direction), the right-hand address signal output terminal 6R of the address signal translation block 90 incorporated in the buffer part 350 and the address signal input terminal 307 of the functional blocks 100R are connected to each other. The address signal output terminal 309 of this functional block 100R is connected to the address signal input terminal 307 of another functional block 100R. The left-hand address signal output terminal 6L of the address signal translation block 90 is connected to the address signal input terminal 306 of the functional block 100L. The address signal output terminal 308 of this functional block 100L is connected to the address signal input terminal 306 of another functional block 100L. In the vertical (columnwise) direction, the address signal input terminal 370 of the address signal translation block 90 is connected to the upper address signal output terminal 6U of the lower address signal translation block 90. Connected to the address signal input terminal 370 of the address signal translation block 90 located lowermost is the output of the address pointer provided in the control circuit 200. The functional block addresses of the individual functional blocks 100R and 100L connected in the manner described above are shown in FIG. 16 on the assumption that the address pointer value 38 outputted by the address pointer incorporated in the control circuit 200 is "0000".

Figure 19:
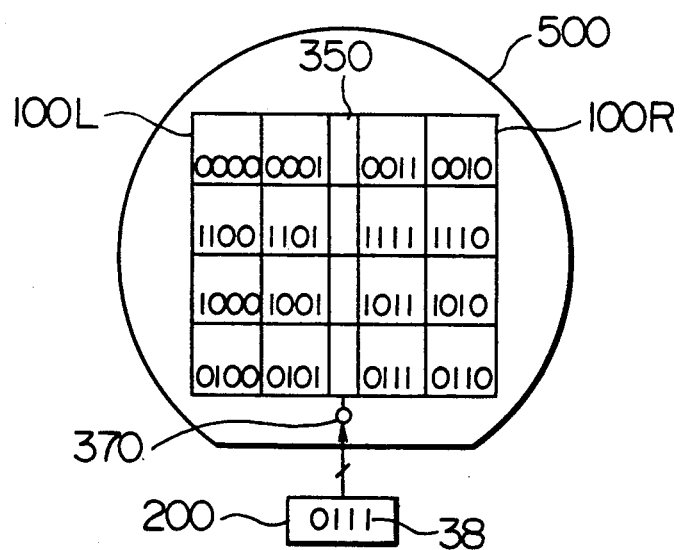
FIG. 19 is a view for illustrating operation of the system shown in FIG. 16.

FIG. 19 shows the functional block addresses of the individual functional blocks 100R and 100L at the time point when the address pointer value 38 is "0111". As will thus be seen, as the address pointer of the control apparatus 200 indicates various values, the separate input addresses inputted to the individual functional blocks 100R and 100L vary correspondingly in dependence on the address pointer values. Accordingly, when the functional block to which a predetermined address (e.g. "0000") is inputted is to be the selected functional block, it is possible to select rather arbitrarily the functional block by varying correspondingly the address pointer value 38. In the case of the example shown in FIG. 16, the functional block 100R located on the bottom row at the second column as counted from the right corresponds to the selected functional block. Further, in the case of the example illustration in FIG. 19, the functional block 100L located on the topmost row at the first column as counted from the left is the selected functional block.

FIG. 20 shows a functional block 100'L corresponding to the functional block 100L shown in FIG. 18B in the case where more than three bits are required for the column address. In this functional block 100'L, the column address 3C of the address signal inputted via an address signal input terminal 342 is added with "1" by means of a one-incrementor 141, wherein the address signal resulting from the above translation or conversion is outputted to an address signal output terminal 343. The functional block 100'L can be realized by using the one-incrementor 141 in place of the inverter circuit 110 shown in FIG. 18.

In the description of the embodiment made hereinabove, the address signal translation or conversion is effectuated by addition of "1". However, the address signal translation may equally be effected by subtraction of "1".

By structurizing the functional blocks in such arrangement that the address signals follow paths of a tree-like configuration, as in the case of the structure shown in FIG. 16, breakage of wired conductors for the address signals in the functional blocks 100L and/or 100R or other fault will give rise to only a reduced number of the functional blocks which are rendered inoperative. By way of example, in the case of the structure shown in FIG. 16, occurrence of fault in any one of the functional blocks 100L brings about no more than two functional blocks which become inoperative at the most.

On the contrary, in the case of a structure in which the sixteen functional blocks are connected in series, occurrence of a fault in one of the functional blocks makes inoperative all the functional blocks connected downstream of the block suffering the fault.

In FIGS. 16 to 20, the data bus and the clock bus for the communication among the functional blocks are omitted from illustration only for the sake of simplification. Further, although it has been assumed in the foregoing description that the number of the functional blocks provided repeatedly is sixteen, it will readily be understood that the invention is never limited to any specific number of the functional blocks. In order words, the structures described above can be applied to any desired number of the functional blocks by simple modifications which may readily occur to those skilled in the art without departing from the spirit and scope of the present invention.

According to the prior art technique, realization of a large number of the functional blocks on a WSI with the specific or inherent addresses being assigned to the individual functional blocks, respectively, necessitates preparation of semiconductor reticle masks for wiring conductor layers separately for each of the functional blocks. When exposure or irradiation with one semiconductor reticle mask must be performed for each of the functional blocks, there will be required a great number of semiconductor reticle masks. In contrast, according to the teaching of the present invention incarnated in the illustrated exemplary embodiments in which each of the functional blocks 100R and 100L is so arranged as to perform a predetermined translation on the input address to thereby output the address signal differing from the input address, each of the functional block is inputted with the address signal inherent thereto so that any given one of the functional blocks can be selected by the address assigned thereto, whereby the address decoders of the individual functional blocks can be implemented in the utterly same structure. Accordingly, it is only necessary to prepare only three sheets of semiconductor reticle masks for the functional block 100L, the functional block 100R and the buffer part 350 including the address signal translation block 90, respectively. Thus, the cost involved in manufacturing the semiconductor reticle masks can remarkably be reduced.

Further, in the case of the illustrated embodiments described above, there is adopted a dispersed control system in which the address decoding is carried out in each of the functional blocks. By virtue of this feature, the number of the signal lines can also be decreased considerably because of no necessity of providing a large number of the select signal lines for determining or selecting the functional block from one control circuit as with the case of a concentrated control system.

As will be appreciated from the foregoing description, there has been provided according to an embodiment of the present invention a wafer-scale semiconductor integrated circuit of a structure realized by using the functional blocks in a repetitive pattern in which a first address signal is inputted to a first functional block to undergo a predetermined translation, e.g. by addition or subtraction of "1" to or from at least one bit, and a second address signal differing from the first address signal is generated to be outputted to a second functional block. In other words, in a WSI incorporating a plurality of functional blocks having a same function and implemented in a repetitive manner, the address signal generated externally of the wafer or by a circuit on the wafer is inputted to one part of the functional blocks, wherein each functional blocks translates the address signal inputted thereto to an address signal differing therefrom, which is the outputted to another functional block. By virtue of this arrangement, the individual functional blocks are inputted with the address signals differing from one another, respectively. When the address signal inputted to the one part of the functional blocks is modified or altered, the address signals inputted to the other functional blocks are also corresponding modified or altered. Accordingly, assuming that when a predetermined signal is inputted to one of the functional blocks, that one functional block is selected, it is possible to select any given functional block by modifying the address signal inputted to a part of the functional blocks. To say in another way, it is possible to discriminatively identify the functional blocks implemented in a repetitive pattern by controlling the address signal input. The embodiment of the invention under consideration can be applied not only to the neuron computer WSI but also to the WSIs in general.

It is noted that the number of the neurons (functional blocks) to be interconnected increases, the number of the weight values to be stored in each of the memories of the individual neurons (individual functional blocks) described hereinbefore is also increased, making it necessary to use the memory of a greater capacity to this end. FIG. 21 shows an improved structure of the weight value memory to be reduced.

This memory circuit 101 is so structurized as to store only a predetermined number of the weight values orderly starting from the maximum absolute value in pairs with the counterparts' member's address, wherein the order weight values are regarded to be 0 (zero), to thereby reduce the storage capacity. Referring to FIG. 21, reference numerals 111 and 112 denote memory cell arrays, a numeral 113 denotes a pointer, a numeral 114 denotes a comparator and a reference numeral 115 denotes a selector. Of the memory cell array 111 and 112, the array 111 is destined for storing the counterparts' or members' addresses, and the array 112 is for storing the weight values, wherein the members' addresses and the respective weight values are stored in pairs in the memory cell arrays on a row basis. At the time, the order of the storage rowwise is so selected that the addresses are arrayed in the ascending order. Further, the address signals supplied from the control apparatus 200 to the individual neurons or functional blocks 100 through the bus 302 and others are sent in the ascending order. The pointer 113 is set to indicate initially the first row of the memory cell arrays 111, 112. Then, the contents stored in the first row is read out, wherein the address information thereof is applied to one input terminal 122 of the comparator 114 while the weight value information is applied to one input terminal 124 of the selector 115. At this time point, the address information applied to the comparator is of the smallest value of the address information stored in the memory address cell array 111. On the other hand, the address signal incoming from the control apparatus 200 through the buffer via the address bus 302 is applied to the other input terminal of the comparator 114. Since the address signals are supplied in the ascending order of the address value, the address signal continues to be of a small value till the first occurrence of coincidence with the signal 122 applied to the comparator 114, which value is thus absent in the memory cell array 111. Consequently, the output 123 of the comparator 114 assumes a low level, as the result of which there makes appearance at the output terminal 126 of the selector 115 a numerical value of "0" which is applied to the other input terminal 125 of the selector 115. This output signal of the selector 115 represents the weight value for the counterpart member designated by the address signal 302 at that time point. In this case, the counterpart member's address is not stored in the memory cell array 111. In other words, the corresponding weight is of the small absolute value which is regarded to be 0 (zero), as mentioned above. So long as the output 123 of the comparator 114 is at low level, the output 127 of the AND circuit 116 is also constantly at a low level with the pointer 113 remaining in the state to indicate the same row. However, the coincidence occurs between the address information applied to the terminal 122 of the comparator 114 and the address signal sent via the address bus 302, the output 123 of the comparator 114 assumes a high level, which results in that the weight value information applied to the terminal 124 of the selector 115 makes appearance at the output terminal 126 of that selector 115. This weight information represents the weight value for the counterpart designated by the address signal at that time point. In synchronism with the clock signal supplied via the bus 303, the pointer 113 is changed over to indicate the next or second row. Also in that case, the selector 115 continues to output "0" until coincidence occurs between the address information stored at the second row in the memory cell array 111 and the address signal supplied via the bus 302, whereon the similar operation to that described above is repeated. When the cycle signal is supplied via the bus 304, the pointer 113 regains the position to indicate first row again. As will now be appreciated, the circuit shown in FIG. 21 operates to read out accurately the weights of the large absolute values which are stored in the memory cell array 112 while regarding the values of the other weights to be "0". Since the memory shown in FIG. 21 is necessarily read out in the ascending order, decision can instantaneously be made in response to the address signal as to the relevant information in present or not. Thus, the memory read-out operation can be performed without involving any appreciable increase in the access time.

Figure 22:
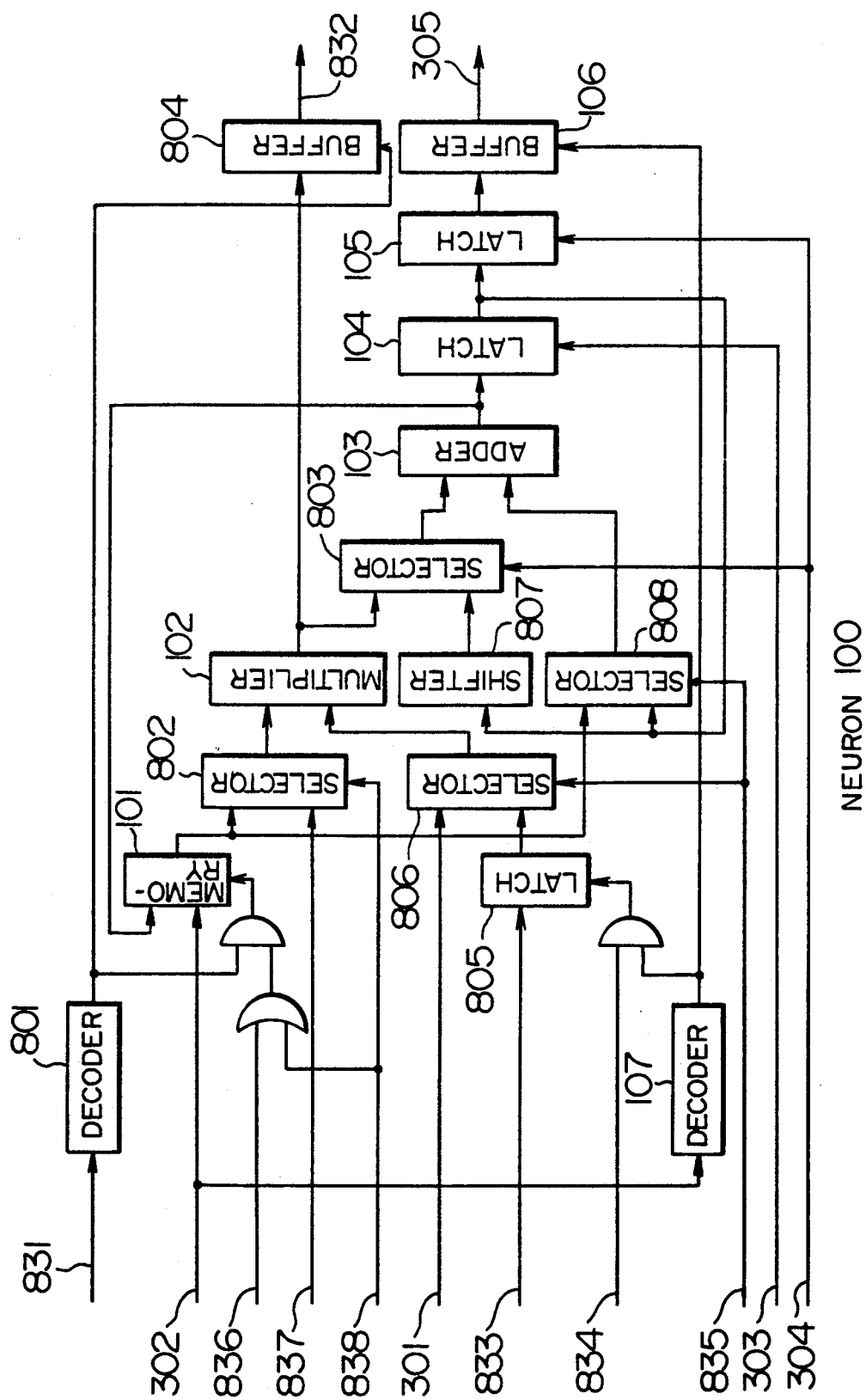
FIG. 22 is a block diagram showing in further detail a structure of the functional block or neuron (100) shown in FIGS. 3 and 7.

FIG. 22 is a block diagram showing in further detail a structure of the neuron 100 (functional block) in accordance with a further embodiment of the invention. Referring to FIG. 22, the memory 101 for storing the weight values, the multiplier 102, the adder 103, the latch circuits 104 and 105, the tri-state buffer 106, the decoder 107 and the buses 301 to 305 of the first hierarchical level operate in the manner described already by reference to FIGS. 3 and 7. A shifter 807 and a selector 803 are provided for ensuring stabilized operation. Further, a decoder 801, a selector 802, a tri-state buffer 804, a latch circuit 805, selectors 806 and 808 and buses 831 to 838 are provided to enable the neural network to make a self-learning.

The shifter circuit 807 is so configured that the output value of the latch circuit 104 is shifted by a factor of ½ or ¼ or ⅛ or so. The selector 803 is so implemented as to transmit ordinarily the output of the multiplier 102 to the adder 103 and to transmit the output of the shifter circuit 807 to the adder 103 in response to the application of the cycle signal (bus 304). Further, such arrangement is adopted that when the selector 803 transmits the output of the shifter circuit 807, the adder 103 performs subtracting operation. The selector 808 applies the output of the latch circuit 104 to the adder 103 except for the period of the self-learning mode. Thus, the adder 103 cooperates with the latch circuit 104 to perform ordinarily the cumulative addition described hereinbefore. However, when the cycle signal is applied, the output of the latch circuit 104 is fetched by the latch circuit and multiplied with ½ or ¾ or ⅞ or so to be subsequently applied to the input of the latch circuit 104 and fetched by the latch circuit 104 in synchronism with the clock signal (supplied via the bus 303), whereupon a new cumulative addition is started. In this case, a weight mean of the value calculated in the preceding cycle and the value to be calculated in the instant cycle is arithmetically determined. Although a time is taken until convergence of the result, oscillation is difficult to take place.

The self-learning operation is carried out in a manner described below on the assumption that algorithm for the self-learning is based on a back propagation (the mathematical foundation of which is described in detail, for example, in a Japanese periodical "Nikkei Electronics", published Aug. 10, 1987, pp. 115 et seq.). In the first place, the cumulative adding operation is repeated to determine the output values of the neurons and store them in the respective latch circuits 105. Next, the addresses of the neurons belonging to the output layer are sent out sequentially from the control apparatus 200 via the address bus 302 to read the contents of the latch circuits 105 into the control apparatus for determining the difference from an expected output value (the value of this difference is hereinafter referred to as the $\delta$-value), the difference value or $\delta$-value is written in the latch circuit 805 of the relevant neuron via the bus 823. For the neurons which do not belong to the output layer, the signal on the address bus 302 is fixed to the address of the neuron for which the $\delta$-value is to be determined, whereon the $\delta$-value of concern is determined through cumulative addition of the products of the weight values of the individual neurons for the neuron of concern and the $\delta$-value of the former. The weight value is read out from the memory 101 incorporated in each neuron with the $\delta$-value being read out from the latch circuit 805, respectively, whereon both values are applied to the multiplier 102 of each neuron via the selectors 802 and 806, respectively. In this way, the products are first determined. Subsequently, the addresses of the individual neurons are sent out from the control apparatus 200 via the bus 831, and the products mentioned above are read into the control apparatus 200 via the bus 832 to be cumulatively added for determining the $\delta$-value which is then written in the latch circuit 805 of the neuron of concern. When the $\delta$-values have thus been determined for all the neurons, the product of the $\delta$-value stored in the latch circuit 805 and an appropriate coefficient supplied via the bus 837 is determined by means of the multiplier 102 to be subsequently applied to one input terminal of the adder 103. By updating a round the addresses applied via the address bus 302, the result obtained through addition of the weight value stored in the memory 101 and the value applied to the one input of the adder 103 is set as the updated or new weight value. By repeating the procedure described above, the self-learning can be realized.

Of course, it is also possible to perform the learning on another computer, wherein the weight value obtained thereby is written directly in the memory 101, so that only the ordinary operation is performed on the neural network.

As a factor contributing to increase the manufacturing cost of the WSI, there can be mentioned a problem of low yield rate. The measures for solving the problem in the WSI for the neuro-computer will be discussed below. By preparing a plurality of neurons and connecting them to one another, there can be implemented a variety of neural networks. By setting appropriate weight values ($w_{i,j}$), it is possible to execute various information processings. When the neural network of this type is implemented on a WSI, there may appear such situation in which some of the neuron circuits do not operate normally due to crystal defect or presence of foreign materials. These faulty neurons can be disconnected by setting to zero the weight values of the neurons to which the outputs of the faulty neurons are inputted. Thus, the neural system as a whole can operate normally even when the fault or defect is present. Besides, since the neural network is inherently redundant and has a high fault tolerance, it is suited for implementation on WSI.

Figure 23:
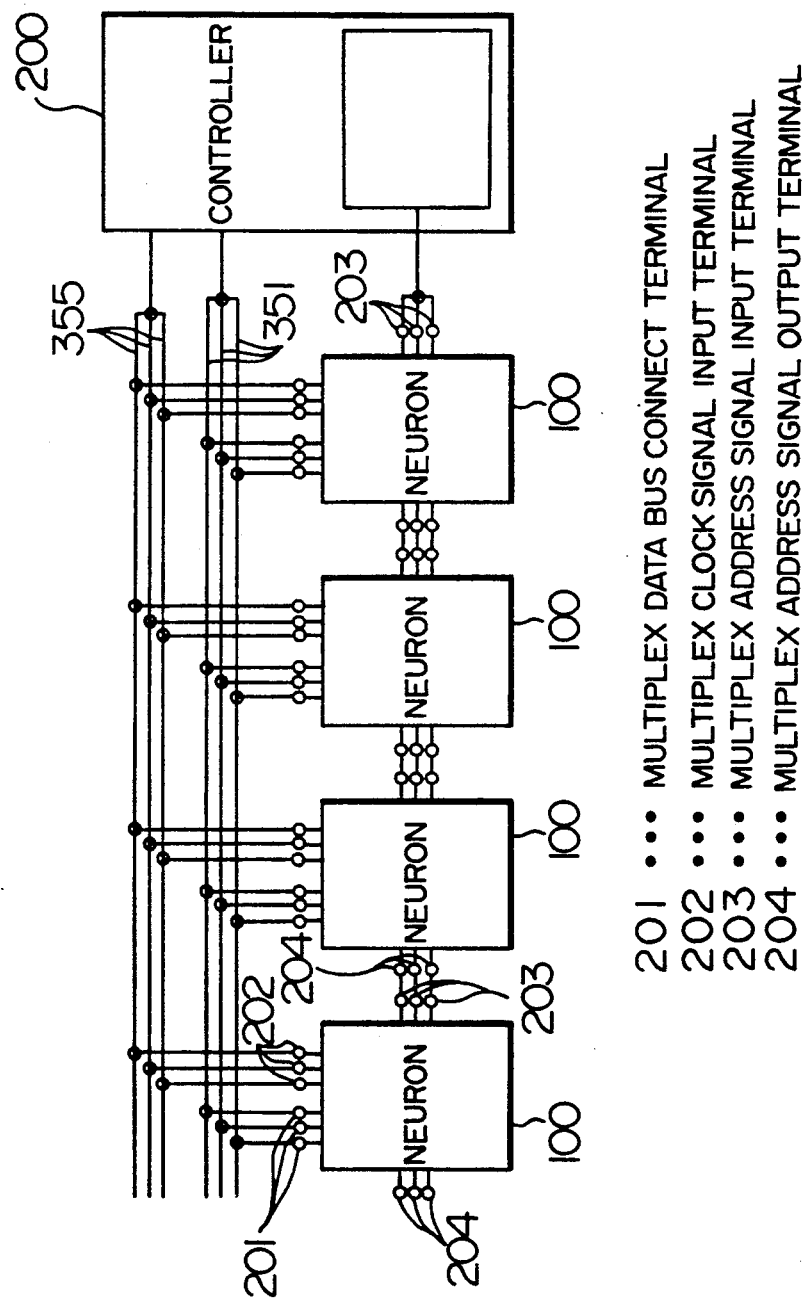
FIG. 23 shows in a schematic circuit diagram an improved structure of the information processing system of a multiplexed bus structure according to a further embodiment of the invention.

It is however, noted that when the individual neurons are interconnected on the WSI by the bases, occurrence of fault in the bus and the address decoder makes it impossible to perform communications between the neurons. In other words, the yield rate of the WSI is degraded as a whole, involving high expensiveness thereof. In an extreme case, no product could be manufactured with a quality to be satisfied. FIG. 23 shows in a schematic circuit diagram an improve structure of the neural network which can enhance the yield of WSI according to a further embodiment of the present invention.

In FIG. 23, reference numeral 203 denotes multiplex clock signal lines, 351 denotes multiplex data buses, 100 denotes neurons (functional blocks), respectively, 203 denotes multiplex address signal input terminals and 204 denotes multiplex address signal output terminals. The multiplex clock signal lines 355 are realized by multiplexing the clock signal line 303 in the embodiment described previously. Similarly, the multiplex data buses 351 are realized by multiplexing the data bus 300 of the previously described embodiment. For the address buses, the decentralized or distributed control address system described hereinbefore by reference to FIGS. 15 to 20 is adopted. The multiplex address buses are realized by multiplexing the address signal line interconnecting the individual neurons (functional blocks). Numeral 201 denotes multiplex-data bus connection terminals and 202 denote multiplex clock signal input terminals. The multiplex address signal input terminals 204 of a given one of the neurons are connected to the multiplex address signal input terminals 203 of the adjacent neuron (functional block) 100. The multiplex address signal input terminals 203 of the neuron (functional block) 100 located at the input end of the network are connected to the address pointer incorporated in the control apparatus 200. Of course, the address pointer can be provided internally of the wafer. The multiplex data bus connection terminals 201 of each neuron (functional block) 100 are connected to the multiplex data buses 351. The multiplex clock signal input terminals 202 of each neuron (functional block) 100 are connected to the multiplex clock signal lines 355. Parenthetically, such arrangement may equally be adopted that the buffer part 350 including the address signal translation block is provided at the center of the neurons (functional blocks) 100, as described hereinbefore in conjunction with FIGS. 13 and 16. The structure illustrated in FIG. 23 is only for the purpose of facilitating the description.

Figure 24A:
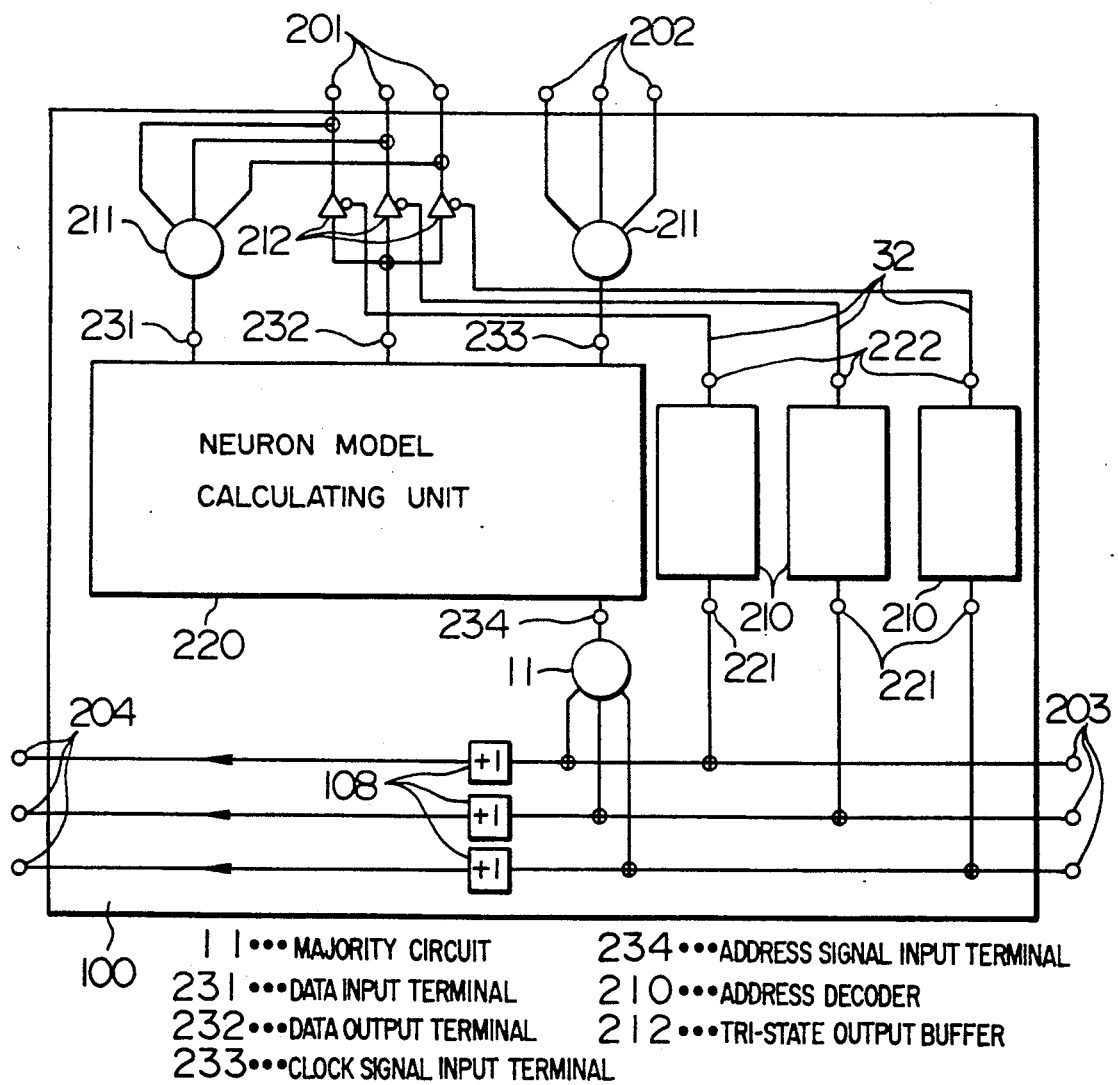
FIG. 24A is a schematic circuit diagram showing an exemplary structure of the functional block or neuron suited for the multiplexed bus structure according to a further embodiment of the invention.
Figure 24B:
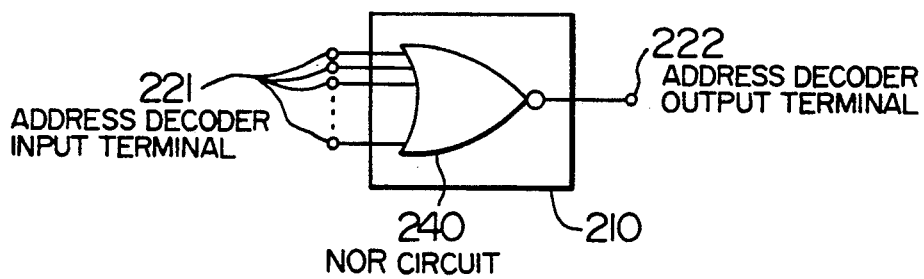
FIG. 24B is a schematic circuit diagram of an address decoder shown in FIG. 24A.

FIG. 24A is a schematic circuit diagram showing an exemplary structure of the neuron (functional block) 100 suited for the multiplex bus structure according to a further embodiment of the invention. Referring to FIG. 24A, a reference numeral 211 denotes a majority circuit, numeral 231 denotes a data input terminal, numeral 232 denotes a data output terminal, numeral 233 denotes a clock signal input terminal, numeral 234 denotes address decoders, respectively, and numeral 212 denotes tri-state output buffers, respectively. Each of the tri-state output buffers has a signal input terminal for input signal, a signal output terminal for outputting an output signal and a control signal input terminal to which a control signal is applied, wherein the tri-state output buffer outputs the input signal to the output signal terminal or presents a high impedance state at the output terminal in dependence on the control signal. Further, numeral 221 denotes address decoder input terminals, and 222 denotes an address decoder output terminal. The signals supplied via the multiplex data buses 351, the multiplex clock signal lines 355 and the multiplex address signal input terminals 303 shown in FIG. 23 undergo logically majority decision on a bit-by-bit basis in the associated majority circuits 211, respectively, the results of which majority decision are supplied to a data input terminal 231, a clock signal input terminal 233 and to an address signal input terminal 234, respectively, of a neuron model calculation unit 220. On the other hand, the output of the neuron model calculation unit 220 is produced at the data output terminal 232 and outputted to the multiplex data bus connection terminals 201 through three tri-state output buffers 212. Further, three signals inputted through the multiplex address signal input terminals 203 are supplied to three one incrementors 108, respectively, to undergo address translation, the results of which are outputted through the multiplex address signal output terminals 204. In this conjunction, when the neurons are connected in the general arrangement shown in FIG. 23, it is sufficient to increment by 1 (one) only the column address. By way of example, when the output of the neuron (functional block) 100 is outputted onto the data bus 351 for the address signals all of "0", the address decoder 210 may be implemented in the form of a NOR circuit, as shown in FIG. 24B. Further, the control signal input terminals of the three tri-state output buffers 212 are connected in such a manner as shown in FIG. 24A. When the output value of the address decoder 210 is "true", the associated tri-state output buffer 212 outputs the input signal, and otherwise presents the high-impedance state at the output terminal.

The neuron model calculation unit 220 is implemented in the same structure as that of the functional block (neuron) 100 as described hereinbefore by reference to FIGS. 3 and 7. More specifically, the neuron model calculation unit has a terminal 231 corresponding to the input bus 301, a terminal 232 corresponding to the output bus 305, a terminal 233 corresponding to the clock bus 303 and the cycle bus 304 and a terminal 234 corresponding to the address bus 302, respectively.

The individual neurons 100 shown in FIG. 23 are selected one by one in correspondence with the address pointer values 38, respectively, as indicated by the address pointer to send out the output value onto the multiplex data buses 351. In the neuron 100 not selected, the signals of the multiplex data buses 351 are subjected to the majority logic on the bit basis by the majority circuit 211 shown in FIG. 24, the result of the majority logic being outputted to the neuron model calculation unit 220. Similarly, the majority logic operation is performed in response to each of the clock signals supplied in multiplex via the multiplex clock signal line 355 shown in FIG. 23, whereon the results are outputted to the neuron model calculation unit 220. The address signal outputted by the control apparatus 200 shown in FIG. 23 undergoes the address translation in each of the neurons 100 to be outputted to the succeeding neuron 100. In the case of the illustrated embodiment, the address translation is effectuated by the one-incrementor 108. The signals before undergoing the address translation is subjected to the majority logic operation in the majority circuit 211 on the bit basis, the results of which are outputted to the neuron model calculation unit 220. The output value of the neuron model calculation unit 220 produced at the data output terminal 232 is decided to be outputted or not onto the multiplex data buses 351 by the three tri-state output buffers 212 controlled by the address decoder 210. In the case of the structure as illustrated, the output of this neuron 100 is sent out onto the multiplex data bus 351 to be sent to the other neuron 100, when the address signals inputted are all "0".

In case the WSI is to be manufactured with the aid of an electron beam drawing system without using the semiconductor reticlemask, the number of the functional blocks (neurons) to be designed can be decreased, which in turn means that the number of the design steps can be correspondingly decreased.

In the following, multiplexing of the bus structure has been described. Of course, multiplexing of the learning circuit system is possible as well, as will be described below in conjunction with a back propagation method which is one of the learning procedures.

FIG. 25 is a schematic diagram for illustrating the learning algorithm based on the back propagation method, in which one of the neurons (functional blocks) is shown. Reference symbols I1, I2 and I3 designate the output signals of the individual neurons (functional blocks) of the preceding layer or stage, and a reference symbol OUT designates the output signal of the neuron (functional block) of concern, which signal is inputted to the synapses 11 of the neurons (functional blocks) of the succeeding layer or stage. In FIG. 25, solid lines indicate signal flows in the ordinary operation with broken lines indicating signal flows in the back propagation learning mode. The individual synapses 11 are imparted with the inherent weight values W, respectively, and each equivalent to a step where the input signal is multiplied with the weight value W to thereby output the product thereof. A reference numeral 10 represents a step for calculating the total sum of the input values multiplied with the weight values W. This step 10 corresponds to the functional circuit shown in FIG. 3. Further, the reference numeral 50 represents a step for outputting a value resulting from the conversion or translation of the input value in accordance with a function f. Parenthetically, as the function used in the step 50, there is known the sigmoid function and others. A reference numeral 60 designates a switch which serves to change over the ordinary operation mode and the learning mode to each other. A reference numeral 70 represents a step for calculating a change d(n) of the synapse weight value in the learning mode. Reference symbol D(n+1) designates learn signals from the succeeding stage. More specifically, relation between d(n) and D(n+1) is given by the following expression (6):

$$d(n) = a \times f'(s) \times I \times \text{total sum of } D(n+1) \quad (6)$$

where s represents the output of the step 10, f' represents a differential value of the function f at the step 50 mentioned above, I represents the input signals (I1-I3) to the synapses, and d represents a constant. In FIG. 25, a reference numeral 80 represents a step for calculating the learn signal D(n) to be supplied to the preceding stage, which can be calculated in accordance with $$D(n) = W \times d(n) \quad (7)$$

By repeating the ordinary operation and the learning operation explained above, the weight values W of the synapses can be altered or changed in dependence on d(n), whereby the whole network can be structurized as to realize the desired input/output correspondence.

As can be seen from the above description, the pattern associative type network structure and the back propagation learning algorithm provide great advantage in that not only the simulation on the computer system but also implementation as a semiconductor integrated circuit can be much facilitated. More specifically, in FIG. 25, it is easily possible to realize the part 11 in the form of a multiplier circuit with a memory circuit, the part 10 as an adder circuit, the part 50 as a memory circuit, the part 60 as a switch circuit, the part 70 in the form of a combination of a multiplier circuit, an adder circuit and a memory circuit, and the part 80 as a multiplier circuit.

On the other hand, difficulty may arise when some fault takes place in the learning circuit system. In that case, the neuron of the succeeding stage sets the weight value of the synapse to "0" by learning. However, because the faulty neuron transmits the erroneous learning signal to the neuron of the preceding stage, great difficulty is encountered in executing the correct learning. Accordingly, automatic remedy of the fault is impossible in the case of the fault mode mentioned above. Such being the circumstances, implementation in a semiconductor chip of the ordinary size of about 1 cm² encounters difficulty in attaining the yield approximating to 100%. Besides even when implemented in a wafer scale integrated circuit, improvement of the yield rate remains substantially equal to zero per cent, because the whole area occupied by the learning circuit system become very large.

In view of the state of the art outlined above, there are provided according to still other embodiments of the present invention such improved structures in which the learning circuit system is separated from the individual neurons (functional blocks) and at the same time made common to the neurons, wherein the separated learning circuit system is constructed by an apparatus capable of remedying faults.

Figure 26:
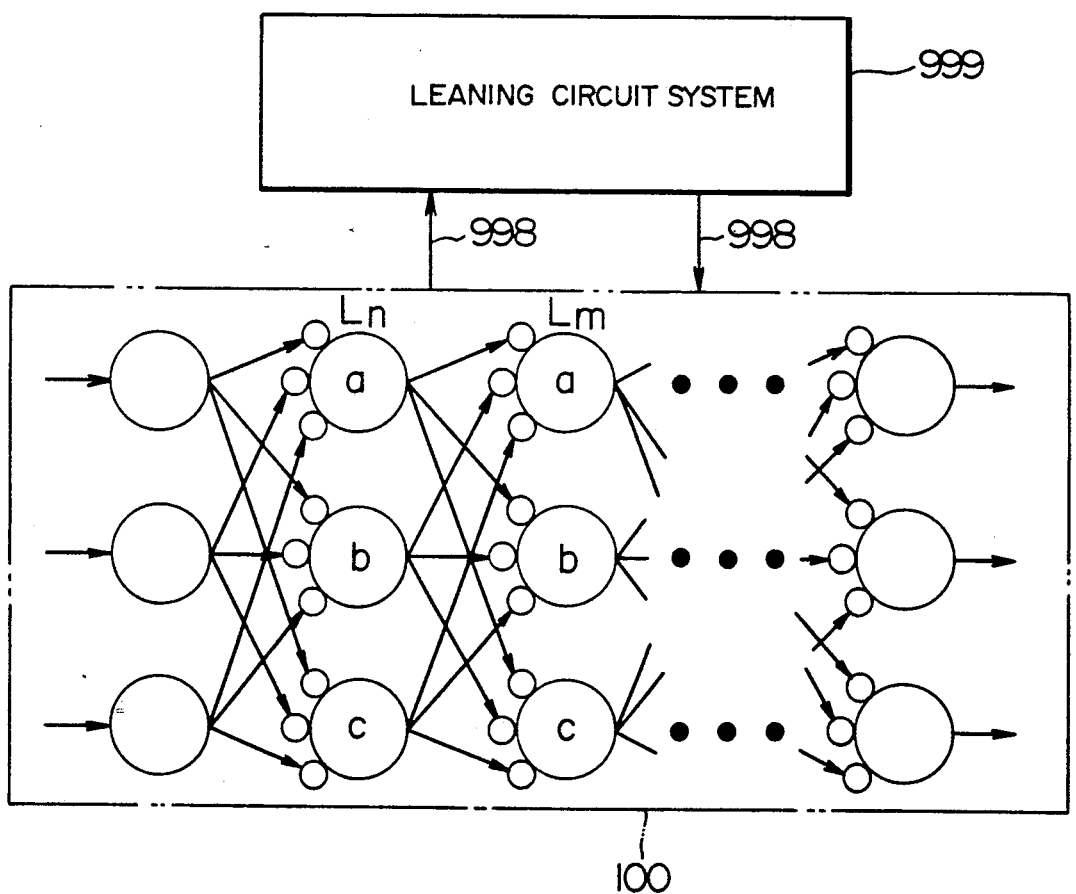
FIG. 26 is a schematic diagram for illustrating the concept underlying a separately provided learning circuit of the information processing system according to another embodiment of the invention.

FIG. 26 is a schematic diagram for illustrating the concept underlying the learning circuit according to the present invention. In FIG. 26, a reference numeral 99 denotes a learning circuit system which is provided separately from the individual neurons 100 and in common to them, and numerals 998 represent signal systems for the learning. A neural network shown as enclosed within a phantom-line block has the same structure as those described hereinbefore except that each of the neurons 100 has no learning circuit. The neural network enclosed by the broken line block executes normally the learning notwithstanding of occurrence of fault so long as the learning circuit system 999 is normal to thereby exclude the faulty neuron. Since the fault of the learning circuit according to the instant embodiment is previously remedied, no erroneously learned signal is transmitted to the neural network. The learning is executed, for example, in the manner mentioned below. Namely, the synapse weight values of the neurons of a layer Lm are fetched by the learning circuit system 999 and rewritten into the original synapses after alternation of the weight value. This processing is executed for the neurons of the layer Lm one by one, whereon the similar processing is executed for the neurons of a layer Ln.

Since all of the neurons (functional blocks) 100 are realized in the same circuit configuration, as described hereinbefore, it is possible to provide the learning circuit in common to the neurons. The learning circuit system 999 according to the instant embodiment of the invention is constituted only by the circuits 11, 10, 60, 70 and 80 and by a control circuit for allocating these circuits in common to the individual neurons or functional blocks. Accordingly, the learning circuit system can be implemented with a high integration density.

Figure 27:
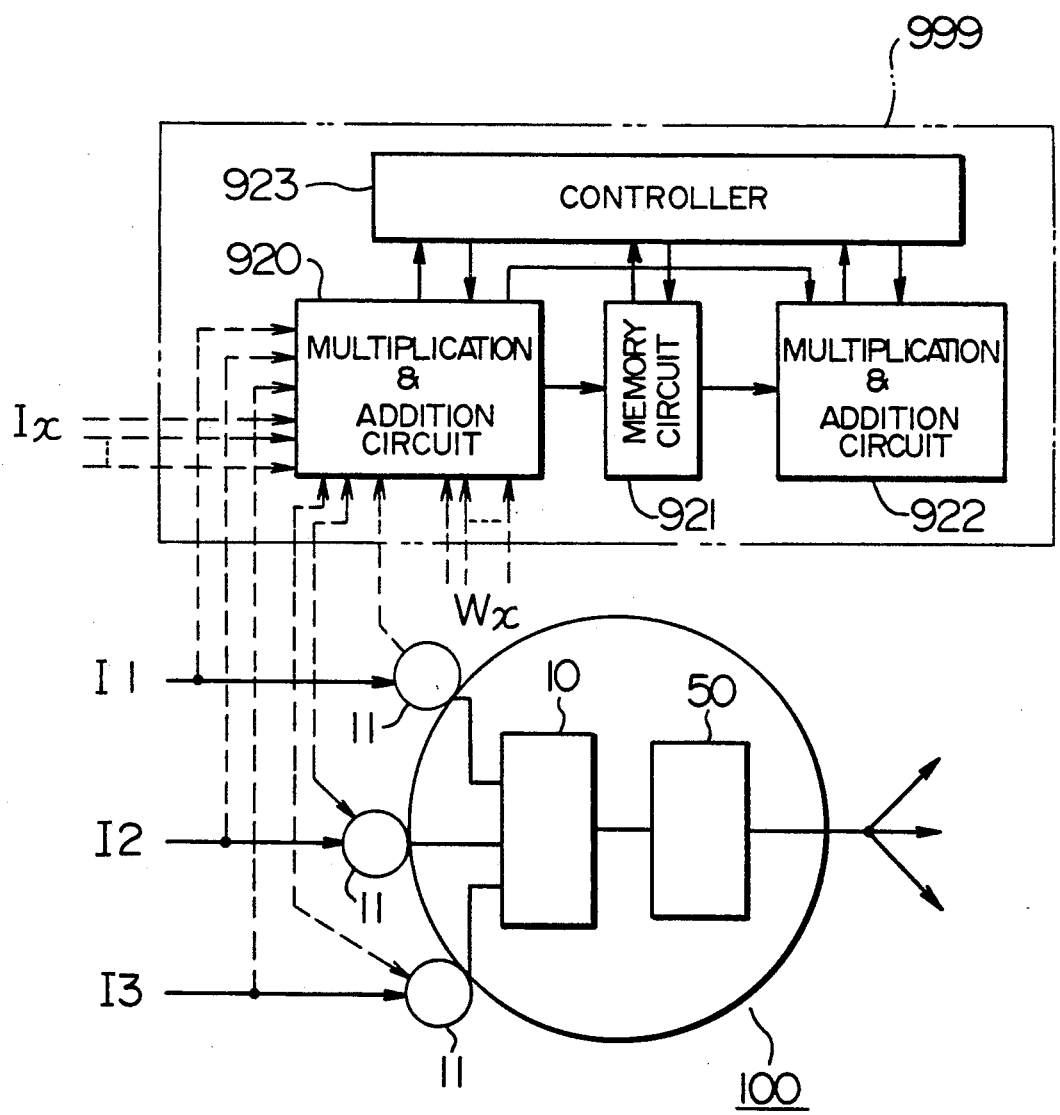
FIG. 27 is a diagram for illustrating in more detail an exemplary structure of the learning circuit system shown in FIG. 26.

FIG. 27 is a diagram for illustrating an exemplary structure including the learning circuit system provided in common and a neuron 100 from which the learning circuit has been removed. Parenthetically, details of the functional blocks corresponding to the structure shown in this figure will be explained later on by reference to FIGS. 28 and 29. Further, an exemplary embodiment of the fault remedy system for the learning circuit will be described hereinafter. In FIG. 27, reference numeral 999 denotes the learning circuit provided in common to the neurons (functional blocks), and 100 denotes a neuron from which the learning circuit has been removed. The synapse (combination of a multiplier circuit and a memory circuit 50 are equivalent to those shown in FIG. 25. A numeral 920 denotes a multiplication and addition circuit for multiplying the input signals I1 to In to the individual system synapses with the weight values W thereof and determining the total sum of the products resulting from the multiplication. This circuit 920 is equivalent to the circuit 11 and 10 described hereinbefore. A reference numeral 921 denotes a memory circuit for outputting a differential value of the function f described hereinbefore by reference to FIG. 25. A numeral 922 denotes a multiplication and addition circuit for determining D(n) and d(n), as described hereinbefore by reference to FIG. 25. Circuit 921 and 922 are same as those designated by 70 and 80, respectively, in FIG. 25. The circuits 920, 921 and 922 are used in common to the individual neurons (functional blocks). A numeral 923 denotes a control circuit for controlling sequential allocation of the learning circuit to the individual neurons in a consolidated manner. The circuits 920, 921 and 922 are each of such a small scale as can be included in a single neuron shown in FIG. 25. The learning circuit 999 also requires as small an area as on the order of 0.5 cm$^2$ even in case the control circuit 923 is included. Accordingly, the yield rate of the learning circuit 999 is on the order of 60%. Since no fault is present in the network whose yield rate is thus 100%, the yield of the semiconductor integrated circuit device as a whole is equal to the yield of 60% of the learning circuit 999 provided separately from and is common to the neuron. By applying the instant embodiment to a wafer scale integrated circuit device, it is possible to increase the yield rate of the wafer scale integrated circuit up to about 60% without need for the fault remedying structure. In other words, only by providing the learning circuit separately and in common, as described above, the yield can surprisingly be increased very significantly. In FIG. 27, reference symbols Ix and Wx represent wiring lines coupled to the weight values and the output values of the other neurons, respectively.

Figure 28:
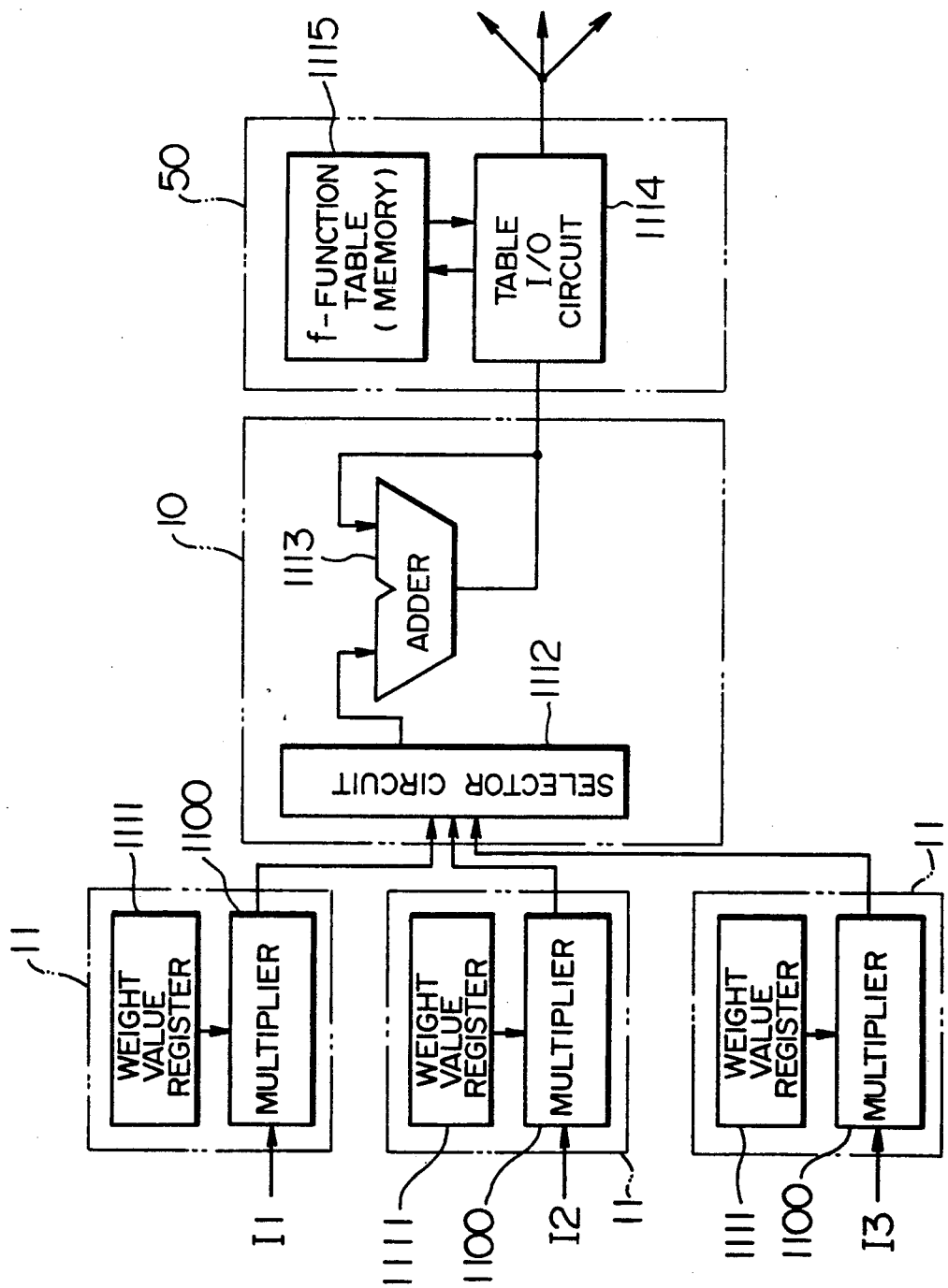
FIG. 28 is a circuit diagram for illustrating details of the neuron (100) shown in FIG. 27.

FIG. 28 is a circuit diagram for illustrating details of the circuits 11, 10 and 50 shown in FIG. 27. Referring to FIG. 28, from the input signals I1 to I3 to the synapses 11 and the weight values W stored in the associated weight value registers 1111, products given by I×W are calculated by the multipliers 1100, respectively. The results of the multiplication are successively selected by a selector circuit 1112 to be added sequentially by an adder 1113. The result of the addition is inputted to a table I/O (input/output) circuit 1114, wherein a function value f corresponding to the result of the addition is selected from a f-function table (memory) 1115 and sent out as the output of the so-called cell.

Figure 29:
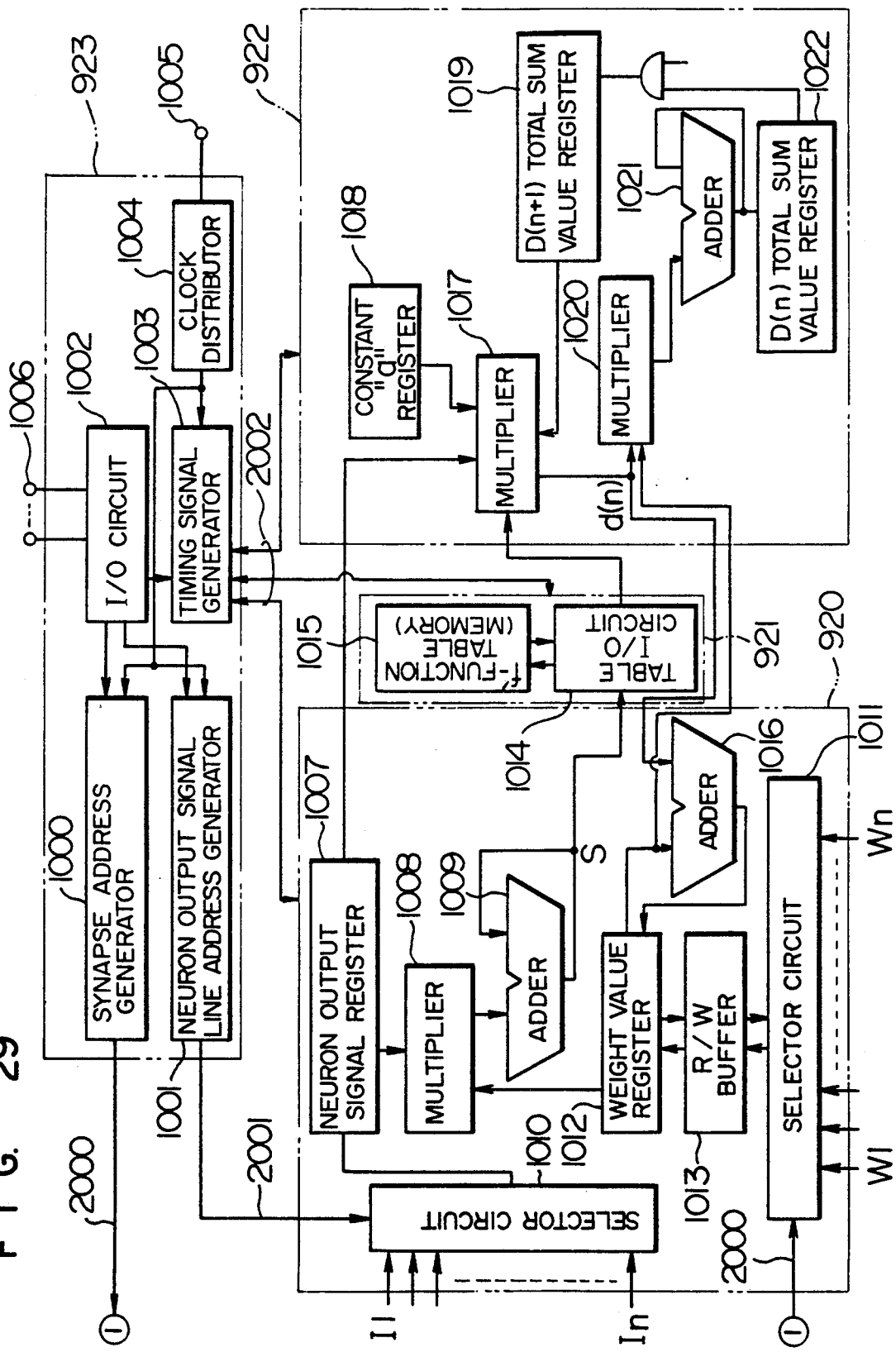
FIG. 29 is a circuit diagram for illustrating details of the learning circuit system (999) shown in FIG. 27.

FIG. 29 is a circuit diagram for illustrating details of the circuits 920 to 923 shown in FIG. 27. Coupled to selector circuits 1010 and 1011 are the output signal I1 to In of the individual neurons and the weight values W1 to Wn of the individual synapses, respectively. Select signals 2000 and 2001 are outputted from address generating circuits 1000 and 1001 incorporated in the control circuit 923, respectively. The output signal of the neuron and the weight value selected by the selector circuit 1010 and 1011 are held by register circuits 1007 and 1012, wherein the product thereof given by I×W is determined by a multiplier 1008. A numeral 1013 denotes a buffer circuit for writing in an reading out the synapse weight value. The results of the multiplications by the multiplier 1008 are successively added by an adder 1009. The result of this addition corresponds to s appearing in the expression (1). The result of addition s is inputted to a table I/O (input/output) circuit 1014, whereon a function f' corresponding to the addition result s is selected from a f'-function table 1015. A multiplier 1017 is destined to execute the multiplication given by the expression (6) mentioned hereinbefore. The result d(n) of this multiplication is inputted to an adder 1016 to be added with the weight value W not updated and held in the weight value register 1012. The result of this addition represents the updated synapse weight value, i.e. a new synapse weight value after the learning. The updated value W is written into the individual synapse weight value registers (denoted by 111 in FIG. 28) incorporated in the network by way of the weight value register 1012, the read/write (R/W) buffer 1013 and the selector circuit 1011. A multiplier 1020 serves to determine the product of the value W held in the weight value register 1012 and d(n) in accordance with the expression (7) mentioned hereinbefore. The adder 1021 and the register 1022 cooperate to add sequentially the results of multiplication performed by the multiplier 1020 to thereby determine a total sum of D(n) and holds this determined value until the learning for the neurons belonging to the succeeding layer is executed, whereupon the value of D(n) is transferred to the register 1019. In the foregoing, description has been made of the structures and operation of the circuits 920, 921 and 922.

A reference numeral 923 denotes a control circuit for controlling the learning process (weight value updating process) described above. The control is performed in synchronism with the clock signal inputted through a terminal 1005. Although it is shown in the figure that the clock signal is supplied externally of the control circuit 923, it goes without saying that the control circuit 923 may incorporate therein a clock signal oscillator instead of being externally supplied with the clock signal. A numeral 1004 denotes a distributor circuit for supplying the clock signal to individual circuit blocks constituting the parts of the control circuit 923. By making use of this clock signal, a timing signal generating circuit 1003 generates a timing signal. In accordance with this timing signal, a series of the learning processes, i.e. data transfer to the register, successive or sequential additions and multiplications are executed. Although it is shown in the figure that the timing signal 2000 is coupled only to the circuits 920, 921 and 922, it will be understood that in reality the timing signal is supplied to the individual circuit blocks. A reference numeral 1002 denotes an I/O interface circuit for connection with the external circuits. An external control signal and other inputted through an input/output pin 1006 is decoded by the I/O circuit 1002 which is turn sends control signals to a synapse address generating circuit 1000, a neuron output signal line address generating circuit 1001 and the timing signal generating circuit 1003. In accordance with the select signals sent from the synapse address generating circuit 1000 and the neuron output signal line address generating circuit 1001, the selection of the values I and W described previously is executed.

Figure 31:
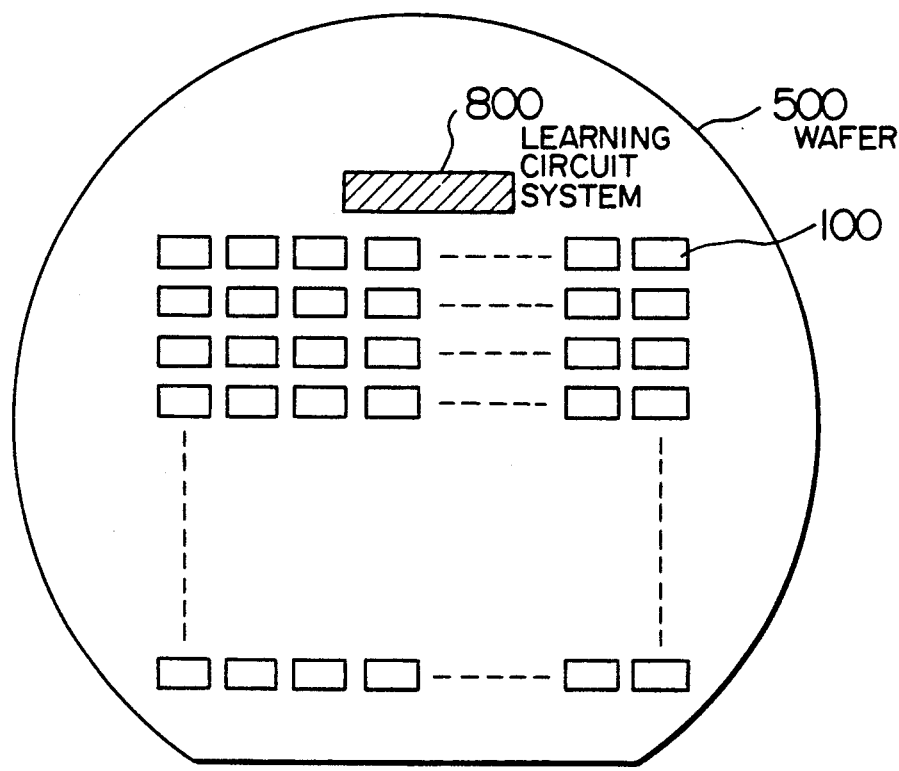
FIGS. 31 to 34 are schematic diagrams showing other improved exemplary embodiments for remedying fault, respectively.

FIG. 30 is a diagram showing an exemplary structure for remedying fault of the learning circuit. In the figure, reference numeral 999' denotes a learning circuit provided separately and in common such as, for example, the one shown in FIG. 9. In the case of the instant embodiment, there are provided the learning circuits 999' in quintuplet. A numeral 997 denotes a switch circuit for selecting one of the outputs d(n) of the quintuple learning circuits 999'. After completion of the device manufacturing process, each of the leaning circuit 999' is inspected or checked as to fault or defeat, whereby the output of the learning circuit 999' decided to be of no fault is selected by the switch circuit 997. When the yield rate of one learning circuit 999' is 60%, as described previously, the probability of at least one of the quintuple learning circuits being faultless (i.e. the yield rate of the learning circuit) is 99%. It is possible to increase the yield by further increasing the number of the learning circuits manufactured in multiplex. Incidentally, the size of one learning circuit 999' is no larger than about 0.5 cm$^2$. Accordingly, the area required by the five learning circuits as a while amount to no more than about 2.5 cm$^2$ and at the most 3 cm$^2$ inclusive of the switch circuit 997. The area is only about 5% of the device forming region of a 5-inch wafer. FIG. 31 is a schematic diagram showing a relation between the neural network and a learning circuit formed on a wafer according to an embodiment of the invention. In this figure, reference numeral denotes a learning circuit system constituted by the learning circuits 999' provided in multiplicity and the switching circuit 997 described above by reference to FIG. 30. Numeral 100 denotes the neuron incorporating no learning circuit, as shown in a lower half portion of FIG. 27.

Figure 32:
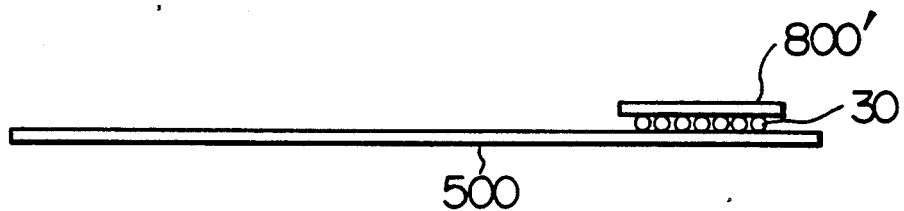
Figure 33:
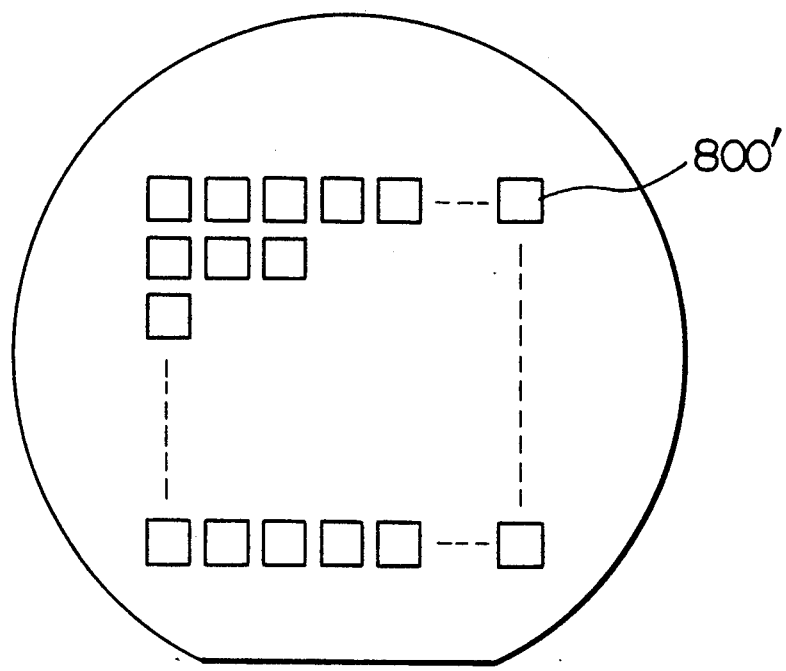
Figure 34:
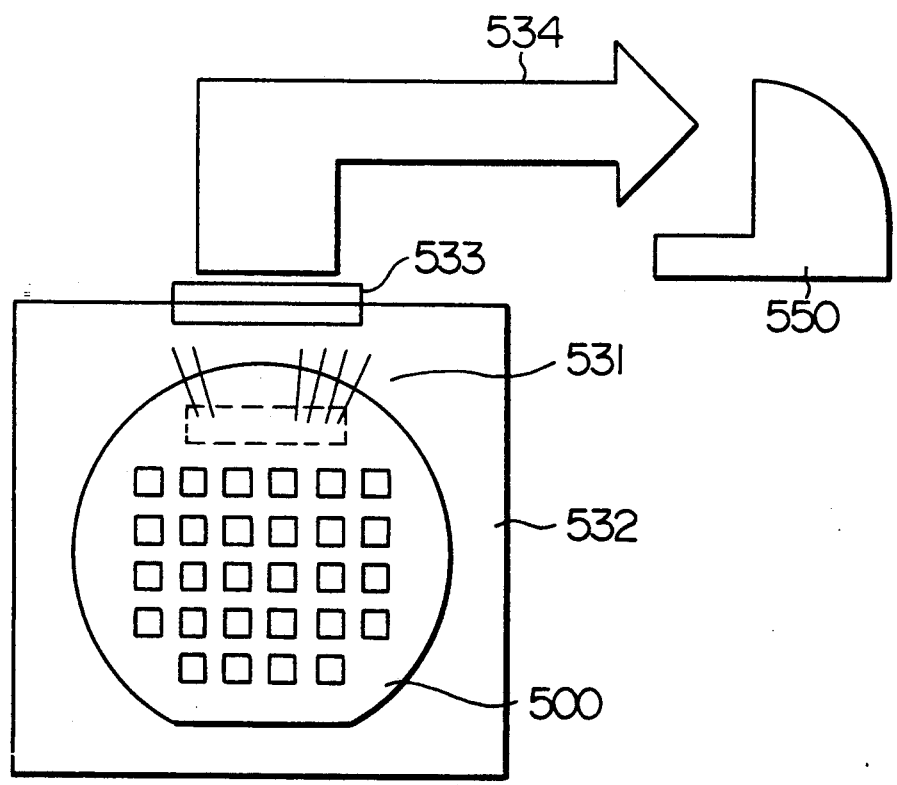

In the above, the measures for remedying or coping with fault or detect of the learning circuit is described in conjunction with the structure in which the learning circuit or circuits are formed simultaneously with formation of the neurons on one and the same wafer. Further, it is also possible to remedy the fault of the leaning circuit by resorting to so-called hybrid means. FIG. 32 is a schematic diagram for illustrating, by way of example, a further means for coping with the fault of the learning circuit. In this figure, a reference numeral 500 denotes a wafer section in which a network of the neurons having no learning circuit is formed, and 800' denotes a semiconductor integrated circuit chip in section, which chip has a learning circuit 999' formed therein. It should be noted that this learning circuit is not provided in multiplicity. The chip 800' mounted on the wafer 500 is a faultless chip selected from a plurality of the chips 800' formed on a wafer, as shown in FIG. 33 and cut therefrom. The electrical connection of the wafer 500 and the chip 800' shown in FIG. 32 is realized by resorting to a flip-chip connecting method in which solder is employed as indicated by 30. The size of the chip 800' is 1 cm². FIG. 34 is a schematic diagram showing still another exemplary embodiment for realizing a learning circuit 999 in a faultless structure. In the case of this embodiment, the circuit 999 is realized with the aid of a computer 550 which has already been ascertained to operate normally. A wafer 500 on which a neuron network is formed is mounted on a substrate 532. Connection between the substrate 532 and the wafer 500 is realized by wire bonding as indicated by 530, while electrical connection between the substrate 532 and the computer 550 is established by using a connector 533 and a cable 534. Since the learning circuit 999 is implemented through cooperation of the computer 550 and a program running thereon according to the instant embodiment, the learning circuit system can positively finished faultless. In the case of the instant embodiment, not only the signal for learning but also the input/output signals are transmitted from the computer 550 through the media 531, 532, 533 and 534.

Figure 35:
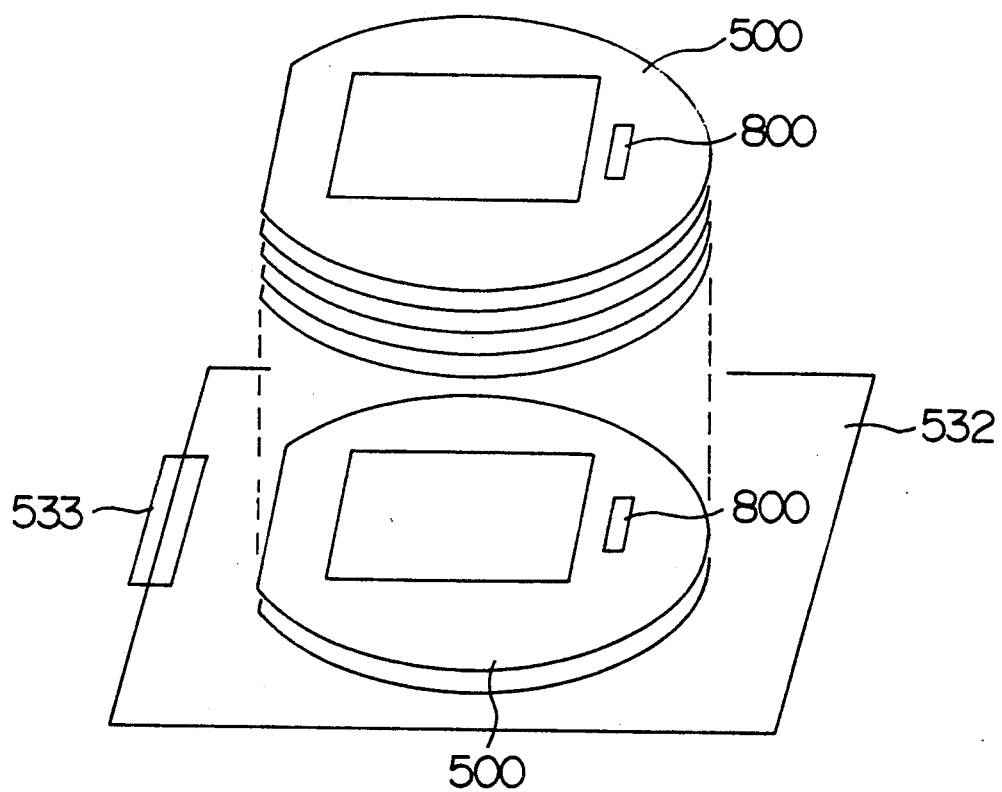
FIG. 35 is a schematic diagram showing yet another embodiment of the invention in which a plurality of wafers are stacked.

The foregoing description has been made on the assumption that the chip or wafer is single. FIG. 35 is a schematic diagram showing yet another embodiment of the invention in which a plurality of the abovementioned wafers are stacked in the vertical direction. In this figure, numeral 500 denotes wafers each of which is packaged with an inventive learning circuit system 800 provided separately from and in common to the neurons. It should be noted that ten or more sheets of wafers 500 are stacked vertically. According to the instant embodiment, the wafers can be packaged very closely to one another, whereby a large scale neuron network circuits can be packaged at an extremely high density. Although the learning circuit 800 is formed in each of the wafer, the former can be provided in common to plural wafers groupwise. Besides, the learning circuit 800 can also be realized by packaging the learning circuit chip 800' shown in FIG. 32 by the hybrid method. Additionally, the learning circuit system may be connected to the computer 550 shown in FIG. 34 by the connector 533 mounted on the substrate 532 for thereby effectuating the learning control with the aid of the computer 550. As a means for electrically interconnecting the wafers stacked in the vertical direction, there can be mentioned, for example, a method disclosed in JP-A-56-2662.

In the case of the embodiments described so far, the information processing systems are wholly implemented by using the digital circuits. It is however noted that when only the multiplication and addition calculation or multiplication is performed by using an analogue circuit, the number of the elements which constitute one neuron can be decreased, whereby a large scale neural network can be realized. In case a large scale neural network is to be manufactured in which the weight values and the output values of the neurons can be expressed by a multiplicity of bits, an enormous number of neuron circuits naturally involve an increased area for the packaging, even when the number of the elements constituting the single neuron circuit is decreased. Consequently, when the neural network is to be implemented, for example, in the WSI (wafer scale integration), the inter-neuron distance is increased. However, by performing digitally the inter-neuron data transfer, the data transfer over a great distance can be realized when compared with the case in which analogue signals are used for the communication.

The following description is directed to the neurons according to other embodiments of the invention.

A neuron constituted by a cellular model and a synapse model receives as inputs thereto the outputs of the others and assigns the weights to the latter, whereon the first mentioned neuron performs calculation mentioned below to produce an output value $x_i$. Representing the outputs of N neurons of the identification numbers "0" to "N−1" by $x_0, x_1, \ldots, x_j, \ldots, x_{N-1}$, each neuron performs the calculation given by $$x_i = f\left(\sum_{\substack{i=0 \\ j \neq i}}^{N-1} w_{ij} \cdot x_j\right) \tag{8}$$

where a function f represents the sigmoid function given by $$f(S) = 1/(1 + \exp(\tilde{S} - S)/T)) \tag{9}$$

where $\tilde{S}$ represents a threshold value and T represents a constant which is in general equal to 1 (one).

In the case of the exemplary embodiments of the invention described hereinafter, the inter-neuron data transmission is performed by using digital signal, wherein the multiplication and addition calculation within each neuron is performed by resorting to analogue technique, the result of the analogue calculation being then converted to a digital signal. When the output of the analogue neuron circuit of digital interface is many-valued, the input/output is performed in terms of the digital signal more insusceptibly to noise as compared with the case of the analogue signal. Further, since the multiplication and addition calculation is performed by using the analogue technique, the calculation can be realized with a smaller number of neuron constituting elements when compared with the case in which the digital signals are processed.

Figure 36A:
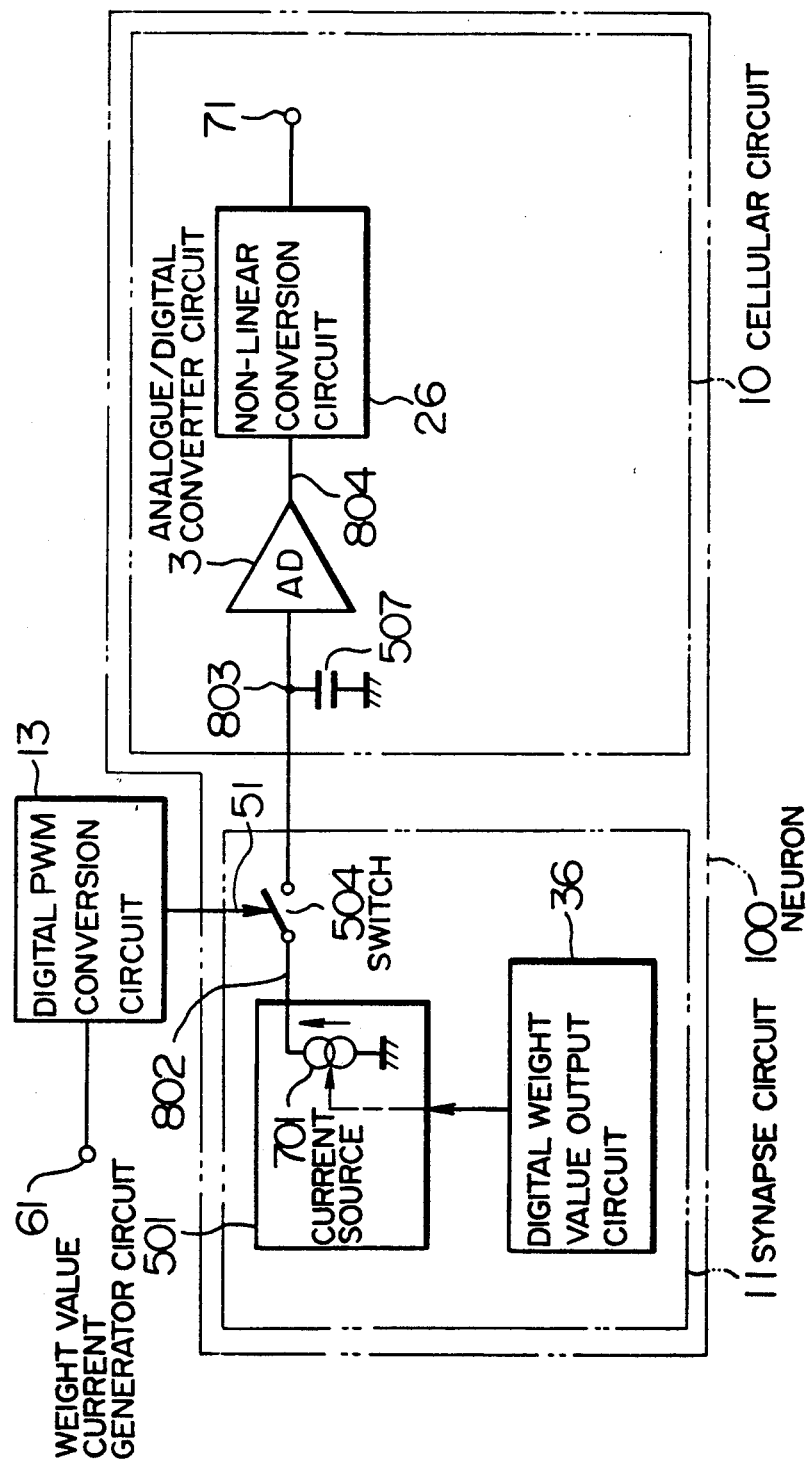
FIG. 36A is a schematic diagram showing an exemplary embodiment of the neural network in which inter-neuron data transmission is performed by making use of the digital signal while intra-neuron product summing calculation is performed by the using analogue signals.

FIG. 36A is a schematic diagram showing an exemplary embodiment of the neuron in which the inter-neuron data transmission is performed by making use of the digital signal while the intra-neuron multiplication and addition calculation is performed by the using analogue signals. In the case of the embodiment shown in FIG. 36A, the single neuron 100 is constituted by one cell-body or cellular circuit (functional circuit) 10 and one synapse circuit (scalar circuit) 11. It should however be appreciated that the synapse circuit may be provided in any given number not smaller than one, inclusive. In this case, all the outputs of the synapse circuit 11 are connected to an input node 803 of the cell-body or cellular circuit (functional circuit) 10. The output terminal 71 of the cellular circuit (functional circuit) 10 also constitutes the output of the neuron 100.

The output of each of the other individual neurons 100 is coupled to an input terminal 61 of a digital PWM (pulse width modulation) conversion circuit 13 to be thereby converted to a pulse signal having a pulse width or duration proportional to the input value and outputted to an input node of the synapse circuit 11. The synapse circuit 11 weights the outputs from the individual neurons 100. To this end, there is provided a weighting current generator circuit 501 which is supplied at the input the weight values $w_{ij}$ for the neuron outputs from a digital weight value output circuit 36, which may be constituted by a memory or register or the like, wherein the weight values $w_{ij}$ may previously be written in the memory or register. The weighting current generating circuit 501 includes a current source 701 connected to an internal node 802 of the synapse circuit 11, which current source 701 generates a current of magnitude proportional to the weight value. A switch 504 serves for changing over the internal node 802 and the input node of the cellular circuit (functional circuit) 10 between the conducting state and the non-conducting state. This switch 504 is controlled by the pulse control signal applied to the input node 51 from the digital PWM conversion circuit 13. More specifically, the switch 504 sets the internal node 802 and the cell input node 803 to the conducting state only for a time corresponding to the pulse width of the pulse signal inputted to the input node 51. The current flowing into the cell input node 803 at that time is determined by the weighting current generating circuit 501. Consequently, the amount of electric change flowing to the cell input node 803 is in proportion to the product $w_{ij}$, $x_j$ of the neuron output value $x_j$ and the weight value $w_{ij}$ therefore. A capacity 507 is connected to the cell input node 803, whereby the potential at the cell input node 803 undergoes a change in proportion to the project $w_{ij}$, $x_j$. By performing the operation described above for the output values of the other neurons 100, the potential at the cell input node 803 undergoes a change which is given by $$\sum_{\substack{i=0 \\ j \neq i}}^{N-1} w_{ij} x_j$$

Such potential change may be brought about simultaneously by a plurality of the synapse circuits 2 connected to the cell input node 803. As described in detail hereinbefore in conjunction with the exemplary embodiments shown in FIG. 1 and FIGS. 7 to 20, the multiplication and addition operation may be performed by utilizing the single synapse circuit 11 on a time-division basis. It should be mentioned that the capacity 507 is not the parasitic capacity but designed as mentioned below. Namely, representing by $Q_{MAX}$ the maximum quantity of electric charge stored at the cell input node 803 by all the synapse circuits 11 connected to the single cell input node 803, the capacity 507 is so selected as to satisfy the following condition.

$$C = Q_{max}/\Delta\text{MAX} \tag{10}$$

Alternatively, the capacity 507 can be realized by corresponding wiring in the case of LSI or by making use of the gate capacity of an existing MOS FET or by providing additionally a MOS FET for setting the capacity 507.

Subsequently, within the cell-body or cellular circuit (functional circuit) 10, an analogue-to-digital conversion (A/D conversion) and a non-linear transformation or conversion (in accordance with the sigmoid function) are carried out, the result of which is outputted to the output terminal in the form of the digital value. More specifically, the potential at the cell input node 803 is converted to a digital signal by an analogue-to-digital converter 3, the digital signal being then outputted onto an internal data line 804 and subsequently inputted to a non-linear conversion circuit 26 to undergo the transformation in accordance with the sigmoid function, the result being finally outputted to the output terminal 71.

According to the teaching of the invention incarnated in the embodiment described above, the multiplication and addition operation is realized by storage or withdrawal of electric change in or from the capacity 507, which operation can thus be realized with a low power consumption. Further, since the electric change is stored in the static capacity, the addition operation can be performed either in parallel or on a time-division basis. In this conjunction, let's suppose, by way of example, that the weighting is realized by resistors connected between the outputs of neuron circuits and the inputs of the succeeding neuron circuits, wherein the initial multiplication and addition operation by summing the currents flowing through the resistors. In that case, when the current flowing through the signal synapse circuit is assumed to be 100 µA on an average with the source voltage being 4 V, the power consumption all the synapse circuit will amount to as high as 100 W in case the number of the neuron circuits is 500 with each neuron circuit including 500 synapse circuits. In contrast, in the case of the instant embodiment where the number of the neuron circuits is 500 each including 500 synapse circuits, the power consumption in all the synapse circuits is as low as 5 W, when the current set by one weighting current generating circuit is 50 µA on an average, the time taken for coupling the current to the capacity by way of the switch 504 is 20 ns on an average, the time taken for the calculation for one neuron circuit in accordance with the expression (8) is 200 ns, and the source voltage is 4 V. In other words, the power consumption can remarkably be reduced according to the teaching of the invention.

As will now be appreciated from the above description, there can be realized the neuron circuit in which the input/output operation is performed with the digital signal while the multiplication/addition operation is performed with the analogue quantities.

It should be added that in place of using the pulse signal having the pulse width proportional to the input value as the input signal to the synapse circuit 11, a pulse signal having a pulse density proportional to the input value may be utilized to the substantially same effect.

FIG. 36B is a circuit diagram showing a modification of the embodiment shown in FIG. 36A which is designed to be realized in CMOS LSI.

In the description of operation which follows, the operation for raising the potential at a cell input node 803 is referred to as "exciting" operation or "excitation" while the operation for lowering the potential at the cell input node 803 is referred to as "suppressing" operation or "suppression". The excitation and suppression are controlled independence on a sign bit $\omega_s$ of the weight value outputted from a digital weight value output circuit 36. In FIG. 36B, it is assumed that the exciting operation is effective when the coded weight value bit $\omega_s$ is at a potential VVS (low level or "0") and the suppressing operation becomes effective when the coded weight value bit is a potential VDD (high level or "1").

Description is first directed to exemplary circuit configuration of the weight value correct generating circuit 501 and the switch 504. Source electrodes of a plurality of (e.g. four) PMOS FETs denoted by $P_1$ to $P_4$, respectively, are connected to a power source VDD, drain electrodes thereof are connected to an internal node 810, and gates electrodes thereof are connected to sign bits $\omega_1$ to $\omega_4$, respectively. Further provided are MOS FETs denoted by $N_1$ to $N_4$, respectively, which have respective source electrodes connected to a power source VSS, drain electrodes connected to an internal node 811 and gate electrodes connected to the sign bits $\omega_1$ to $\omega_4$ weight value output circuit 36. Additionally provided is a PMOS FET denoted by $P_0$ which has a drain electrode connected to the cell input node 803, a source electrode connected to an internal node 810 and a gate electrode connected to an internal node 812. Also provided is a NMOS FET designated by $N_0$ which has a drain electrode connected to the cell input node 803, a source electrode connected to the internal node 811 and a gate electrode connected to an internal node 813. The switch circuit 504 is so designed that when the coded weight value bit $\omega_s$ is at low level, the pulse signal inputted to the synapse input node 51 is converted to a pulse signal which turn on the PMOS FET $P_0$ the pulse signal being outputted to the internal node 812, while when the sign bit $\omega_s$ at high level, the abovementioned pulse signal is converted to the pulse signal which turns on the NMOS FET $N_0$, the pulse signal being then outputted to the internal node 813. To this end, there are provided an inverter circuit 22 having the input applied with the sign bit $\omega_s$ of the weight value and outputs the logical inversion thereof, a two-input NAND circuit 24 for performing NAND operation on the outputs of the synapse circuit input node 51 and the output of the inverter circuit 22, the result of the NAND operation being outputted to the internal node 812 and a Two-input AND circuit 24 for performing AND operation on the outputs of the synapse circuit input node and the sign bit $\omega_s$ of the weight value, the result of which is outputted to the internal node 813.

By setting the gate widths of the PMOS FETs $P_1$ to $P_2$ and NMOS FETs $N_1$ to $N_4$ in the order of the powers of "2", there can be realized sixteen levels of the weights. When representing conductances of the PMOS FETs $P_0$ to $P_4$ in the on-state are represented by $G_{p0}$ to $G_{p4}$, then $G_{p2}$ to $G_{p4}$ are set as follows;

$$\begin{bmatrix} G_{p2} = 2^1 \cdot G_{p1} \\ G_{p3} = 2^2 \cdot G_{p1} \\ G_{p4} = 2^3 \cdot G_{p1} \end{bmatrix} \quad (11)$$

Now, representing the output bits of the digital weight value output circuit 36 connected to the gate of the PMOS FET $P_1$ to $P_2$ by $\omega_1$ to $\omega_4$, conductances between the VDD and the cell input node 803 is given by the following expression (12) when the sign bit $\omega_s$ of the weight value is "0". Namely, $$1/(1/G_{p0} + 1(C_{p1} \cdot (\overline{\omega}_1 \cdot 2^0 + \overline{\omega}_2 \cdot 2^2 + \overline{\omega}_3 \cdot 2^2 + \omega_4 \cdot 2^3)) \quad (12)$$

when $$G_{p0} >> G_{p1} \cdot (2^0 + 2^1 + 2^2 + 2^3) \quad (13)$$

conductance between the VDD and the cell input node 803 can be approximated by the following expression:

$$\omega_s \cdot G_{p1}(\overline{\omega}_1 \cdot 2^0 + \overline{\omega}_2 \cdot 2^1 + \overline{\omega}_3 \cdot 2^2 + \overline{\omega}_4 \cdot 2^3)) \quad (14)$$

Thus, the gate width of the PMOS FET $P_0$ is set larger than those of the PMOS FETs $P_1$ to $P_4$ so that the condition given by the expression (13) can be satisfied. Similarly, conductances of the NMOS FETs $N_0$ to $N_4$ are represented by $G_{n0}$ to $G_{n4}$, $$\begin{bmatrix} G_{n2} = 2^1 \cdot G_{n1} \\ G_{n3} = 2^2 \cdot G_{n1} \\ G_{n4} = 2^3 \cdot G_{n1} \end{bmatrix} \quad (15)$$

By setting such that $$G_{n0} >> G_{n1} \cdot (2^0 + 2^1 + 2^2 + 2^3) \quad (16)$$

the conductance between the cell circuit input node 803 and the VSS can be approximated by the following expression;

$$\omega_s G_{n1}(\omega_1 \cdot 2^0 + \omega_2 \cdot 2^{1+} + \omega_3 \cdot 2^2 + \omega_4 \cdot 2^3) \quad (17)$$

By operating the PMOS FETs $P_1$ to $P_4$ and the NMOS FETs $N_1$ and $N_2$ in the range of saturation, the weight value current generating circuit 501 serves as a current source capable of supplying the current of magnitude substantially in proportion to the weight value. Although the weight value is expressed in five bits inclusive of the sign bit in the case of the embodiment shown in FIG. 36B, it is of course possible to use other number of bits to this end.

After having set the weight value current generating circuit 501, the synapse circuit 11 applies the pulse signal to the input node 51 of the synapse circuit. When the sign bit $\omega_s$ of the weight value is at a low level, the PMOS FET $P_0$ is set to the on or conducting state for a period corresponding to the pulse width of the pulse signal representing the sign bit, while the NMOS FET $N_0$ is set to the on or conducting state for a period corresponding to the abovementioned pulse width when the weight value sign bit $\omega_s$ is at high level, whereby the electric charge is injected into the cell input node 803.

Next, description will be turned to the AD conversion circuit 3. At first, the up-down counter 81 is reset before operation of the synapse circuit 11. Further, the cell input node and the internal node 805 of the cell circuit 1 are precharged to the potential (VDD+VSS)/2 volts, respectively. Subsequently, the multiplication and addition operation described hereinbefore is performed, as the result of which the potential at the cell input node 803 undergoes a charge corresponding to the value resulting from the multiplication and addition operation. Upon completion of the arithmetic operation of the synapse circuit 11, the cell circuit 1 compares the potential $V_N$ at the cell input node 803 with the potential $V_R$ at the internal node 805 by using the comparator 20. The pulse control circuit 18 applies the clock signal to the clock signal input terminal 201 and responds to the control signal outputted from the comparator 20 by applying the clock signal pulse to the internal node 2002 so that the PMOS FET $P_{10}$ is turned on when $V_N > V_R$ while when $V_N < V_R$, the clock signal pulse is so converted that the FET $N_{10}$ is turned on to be subsequently applied to the internal node 2003. These are provided a PMOS FET $P_{10}$ having a drain electrode connected to the internal node 805, a source electrode connected to the VDD and a gate electrode connected to the internal node 2002 and a NMOS FET $N_{10}$ having a drain electrode connected to the internal node, 805, a source electrode connected to the VSS and a gate electrode connected to the internal node 2003, respectively. As a result, when a pulse of a constant pulse width is applied to the internal node 2002 or the internal node 2003 once or a plurality of times, the potential $V_R$ at the internal node undergoes a change proportional to the number of pulses as transmitted. Consequently, the potentials $V_N$ and $V_R$ become substantially equal to each other, resulting ultimately in inversion of the output of the comparator 20. At the time point, the pulse control circuit 18 stops transmission of the pulses. The pulses outputted from the pulse control circuit 18 is sent to the up-down counter 81 as well. The up-down counter 81 has the inputs connected to the internal node 2002 and the internal node 2003, respectively. Wherein upon application of the pulse to the internal node 2002 which causes the PMOS FET $P_{10}$ to be turned on, the up-down counter counts up by +1, while the latter counts down by −1 upon application of the pulse to the internal node 2003 which causes the NMOS FET $N_{10}$ to be turned on. After having performed the operation described above for the data incoming from all the neuron circuits, the content of the up-down counter 81 then represents the result of the multiplication/addition operation. This result is then outputted onto an internal data line 804.

It is also possible to arrange such that every time the synapse circuit 11 receives the output from each of the individual neuron circuits 100, the cell input node 803 is precharged by a half as described hereinbefore to thereby perform the multiplication operation. In this case, resting of the up-down counter 81 is not effectuated and caused to operate as an accumulator.

Figure 37A:
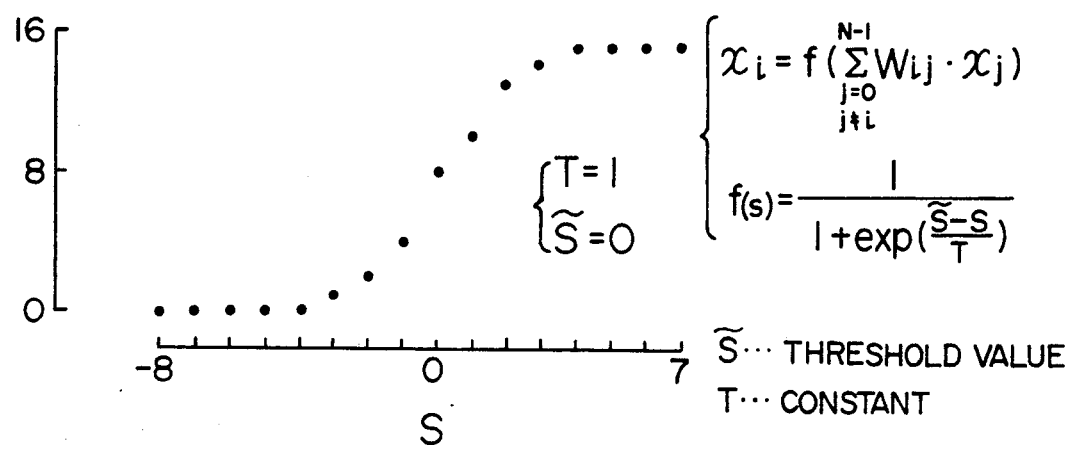
FIG. 37A is a view for illustrating the concept of a non-linear translation or conversion circuit.
Figure 37B:
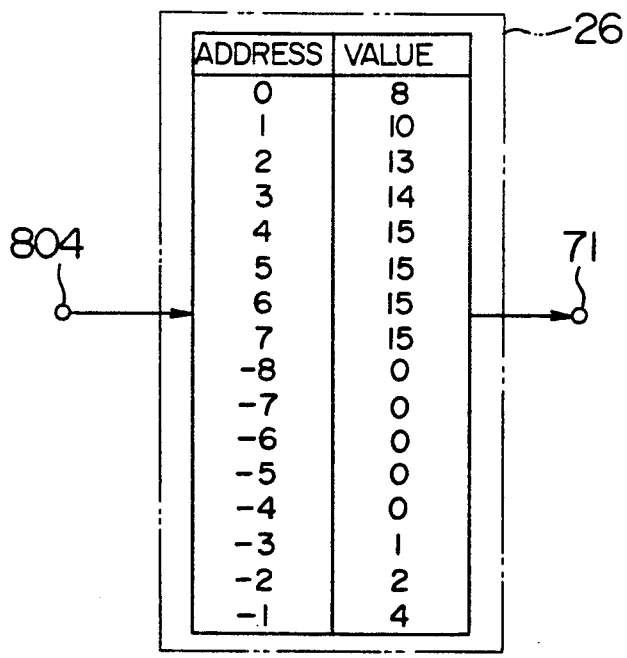
FIG. 37B shows a memory map exemplifying a structure of the same.

Next, a concrete circuit configuration of the non-linear transformation or conversion circuit will be described in detail by reference to FIGS. 37A and FIG. 37B in which FIG. 37A illustrates graphically values taken by the sigmoid function taken along the ordinate with the input values being taken along the abscissa, and FIG. 37B shows a memory map.

Referring first to FIG. 37A, values of the sigmoid function to be outputted for the addresses as inputted are written in the memory at the addresses corresponding to the values resulting from the multiplication and addition operation. The non-linear conversion circuit 26 internally contains the memory and receives at the input thereof the result of the multiplication and addition operation to thereby output the value written at the corresponding address to the output terminal 71. The output is a digital value.

A plurality of the neuron circuit 100 described above is mutually connected to constitute a neural network, whereon the operation described in the foregoing is repeated. The arithmetic operation is executed until all the outputs of the neuron circuits 100 become stabilized (converge sufficiently). However, there arises sometimes such a case in which the outputs do not converge to the optimum solution (a so-called local minimum problem). In such case, convergence to the optimum solution may be attained by performing a simulated annealing, which can be realized by changing the constant T (temperature) in the sigmoid function given by the expression (9). Since the non-linear translation or conversion circuit 26 is of such structure that the functions are written in the memory, wherein the memory content at the address corresponding to the input value is outputted, the simulated annealing can be performed in a facilitated manner by rewriting the content of the memory which is constituted by a RAM (random access memory).

According to the embodiment of the invention now under consideration, the weight value is handled in terms of the digital signal. In this conjunction, it may be conceived that the analogue signal is applied to the gate terminal of the MOS FET to control the conductance of the drain-source path of the MOS FET for thereby expressing the weight value and the input value in the form of the many-value. However, when the result of the arithmetic operation is to be outputted in the form of many-value, it is difficult to control the abovementioned conductance of the MOS FET by the gate voltage because of the non-linear characteristics of the MOS FET.

In the case of the neural network according to the instant embodiment of the invention, the multiplication-/addition operation within the neuron circuit is performed by making use of the analogue process, while the input/output operation of the neuron circuit is performed digitally. By virtue of such arrangement, the neuron circuit can be realized by a remarkably small number of constituent elements when compared with the neuron circuit implemented only by the digital circuitries. Further, since the input/output operation is performed by using the digital signal, there can be evaded such problems as noise margin and signal attenuation due to the wiring resistance to the analogue signal which may arise when the data transmission between the neuron circuits is performed by using the analogue signal, whereby design can be much simplified.

Figure 38:
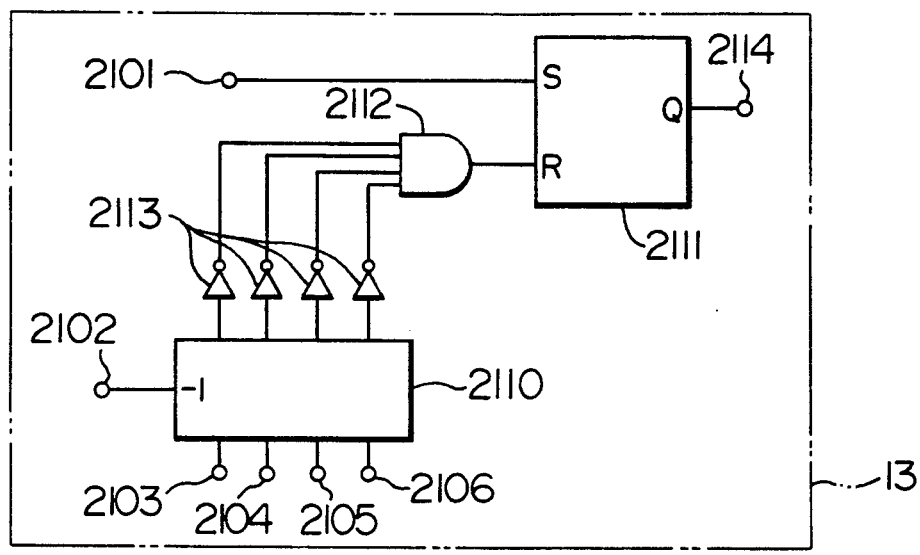
FIG. 38 is a schematic circuit diagram showing, by way of example, a circuit configuration of a digital PWM converter.

FIG. 38 is a schematic circuit diagram showing a circuit configuration of the digital PWM converter 13. In this figure, a reference numeral 2101 denotes an input terminal for a conversion start signal, a numeral 2102 denotes a clock signal input terminal, numerals 2103 to 2106 denote data input terminals, respectively, a numeral 2110 denotes a 4-bit counter, a numeral 2111 denotes a RS flip-flop, a numeral 2112 denotes an AND circuit having four inputs, and a reference numeral 2110 denotes an inverter circuit. The counter 2110 is decremented one by one every time the pulse of the clock signal is inputted from the node. By setting the data first to the input terminals 2103 to 2106 and then applying a pulse to the conversion start signal input terminal 2101, the output of the flip-flop 2111 becomes high. At the same time, transmission of the clock signal to the node 2102 is started. The data already placed in the counter 2110 is decremented one by one every time the clock signal pulse is inputted. When the counter ultimately outputs "0", the output of the 4-input AND circuit 2112 becomes high, where the output of the RS flip-flop 2111 is reset to low level. The output of the RS flip-flop 2111 is maintained at high level for a period from the inputting of the conversion start signal to the inputting of a number of clock signal pulses having input values inputted to the input terminals 2103 to 2106. By executing the operation described above, the digital signal can be converted to the PWM signal.

Figure 39:
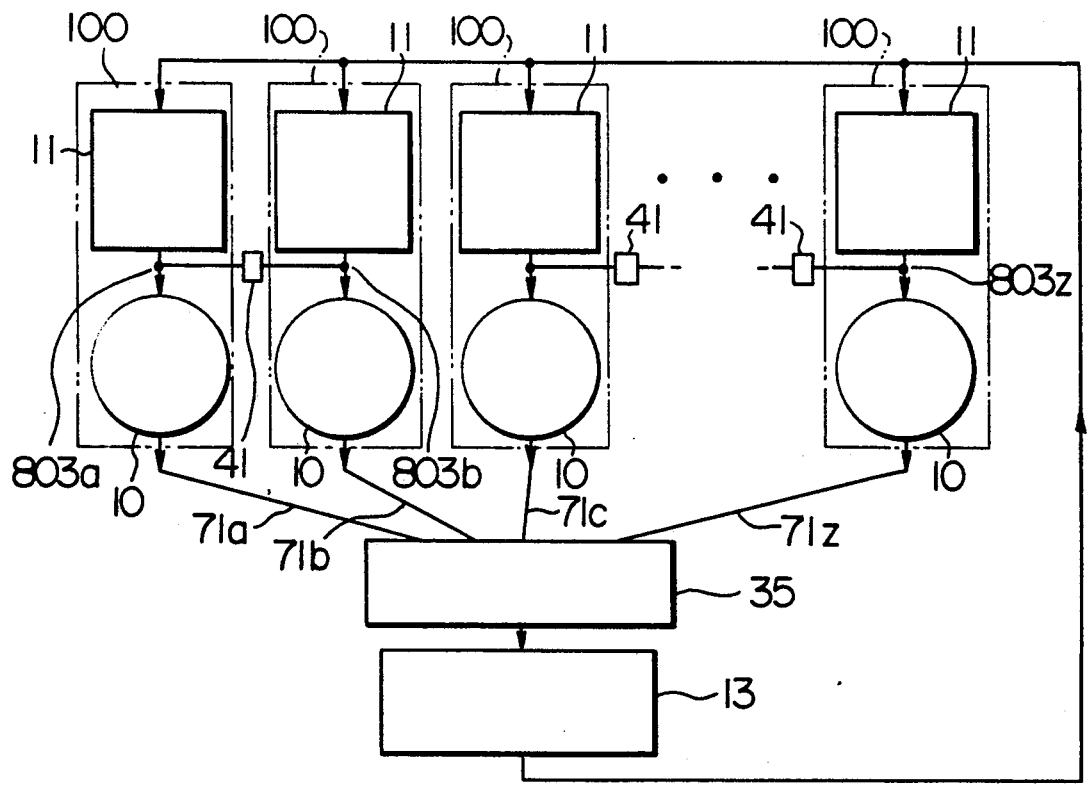
FIG. 39 is a schematic circuit diagram showing a neural network according to another exemplary embodiment of the invention.

FIG. 39 is a schematic circuit diagram showing a hop-field type neural network implemented by using N neuron circuits 100 according to another exemplary embodiment of the invention. Referring to FIG. 39, each of the neuron circuit 100 is constituted by one synapse circuit 11 and one cell body circuit 10. Every two of the neuron circuits 100 are combined in a pair, wherein the cell input notes 803a and 803b of the paired neuron circuits 100 are connected to a half precharge circuit 41 which serves to precharge the cell input nodes 803a and 803b to a voltage level of (VDD+VSS)/2 volts. All of the the output terminals of N neuron circuits 100 are connected to a time-division broadcast network 35. Representing the output values outputted from the output terminals 71 of the individual neuron circuit 4 by $x_0, x_1, x_2, \ldots, x_{N-1}$, the time-division broadcast network 35 selects one of these output values to thereby output the values $x_0$ to $x_{N-1}$ sequentially in this order to the digital PWM converter 13. The digital PWM converter 13 the output value of the each neuron circuit 100 to a pulse signal having a pulse width or pulse density proportional to the input value (i.e. output of the neuron circuit) to thereby send the pulse signal to the input terminals 51 of all the neuron circuits 100. By performing N times the operation described above, all the data as required by the neuron circuit 100 arrive at the individual neuron circuits 100. Since the multiplication and addition operation is performed on a time division basis in the case of the embodiment shown in FIG. 39, one neuron circuit 100 requires no more than one synapse circuit 11, whereby the amount of hardware can be reduced very significantly.

Figure 40A:
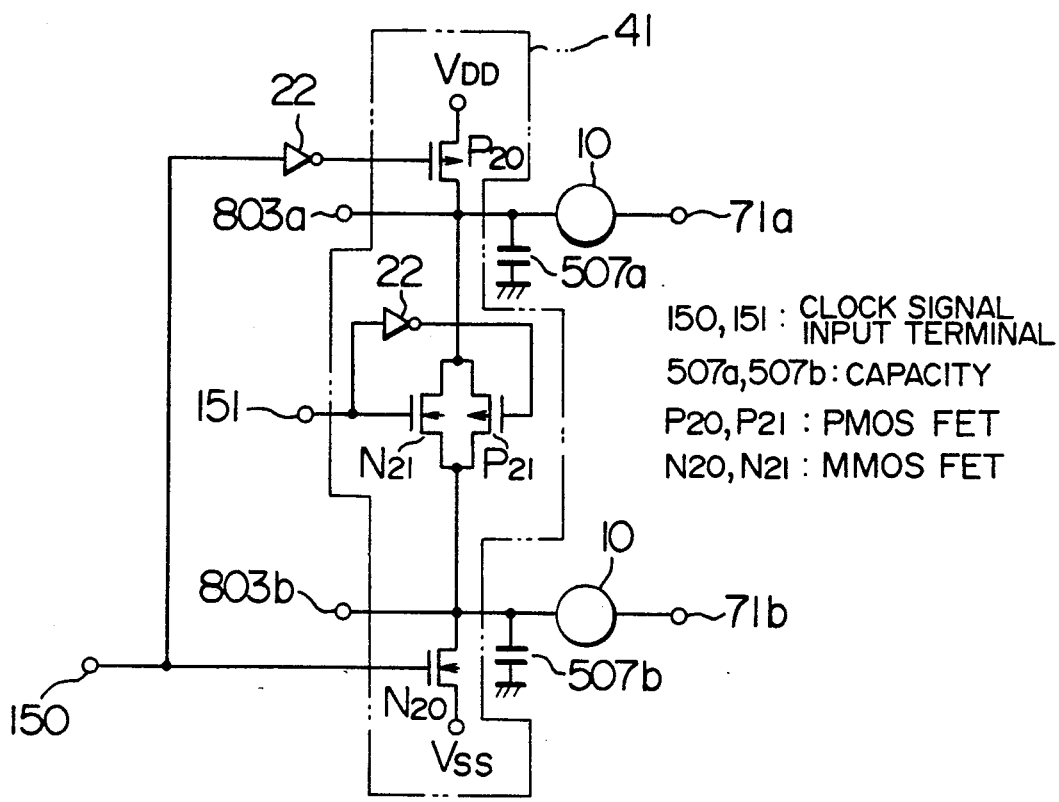
FIG. 40A is a circuit diagram showing a configuration of a half precharge circuit.
Figure 40B:
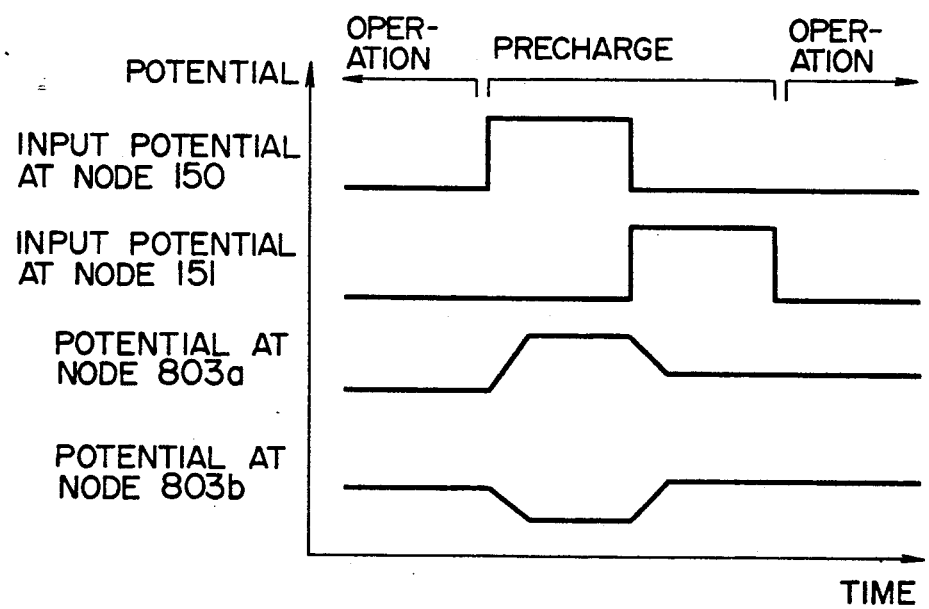
FIG. 40B is a timing chart for illustrating operation of the half precharge circuit.

FIG. 40A is a circuit diagram showing a configuration of the half precharge circuit 41, and FIG. 40B is a timing chart for illustrating operation of the half precharge circuit. In FIG. 40A, reference numerals 150 and 151 denote clock signal input terminals, and 803a and 803b denote input terminals which are connected to the cell body input modes 803 two neuron circuits 100, respectively. Numerals 507a and 507b denote capacities connected to the cell body input nodes 803a and 803b, respectively. Reference numerals 71a and 71b denote the output terminals of the cell body circuit 10. In connection with the two cell body input nodes 803a and 803b, the precharge operation is performed in such a manner in which the clock signal input terminal 150 is set to a high level with the clock signal input terminal 151 being applied with a low level, whereby the one cell body input node 803a is charged to a high level with the other cell body input node 803b being at the low level. Subsequently, when the low level is applied to the clock signal input terminal 150 with the high level being applied to the clock signal input terminal 151, the PMOS FET $P_{21}$ and NMOS FET $N_{21}$ are turned to the on or conducting state, whereby a short-circuit is formed between the two cell body input nodes 803a and 803b. Thus, by realizing the capacities 507a and 507b substantially equal to each other, the two cell body input nodes 803a and 803b can be respectively half-precharged to (VDD+VSS)/2 volts.

Figure 41:
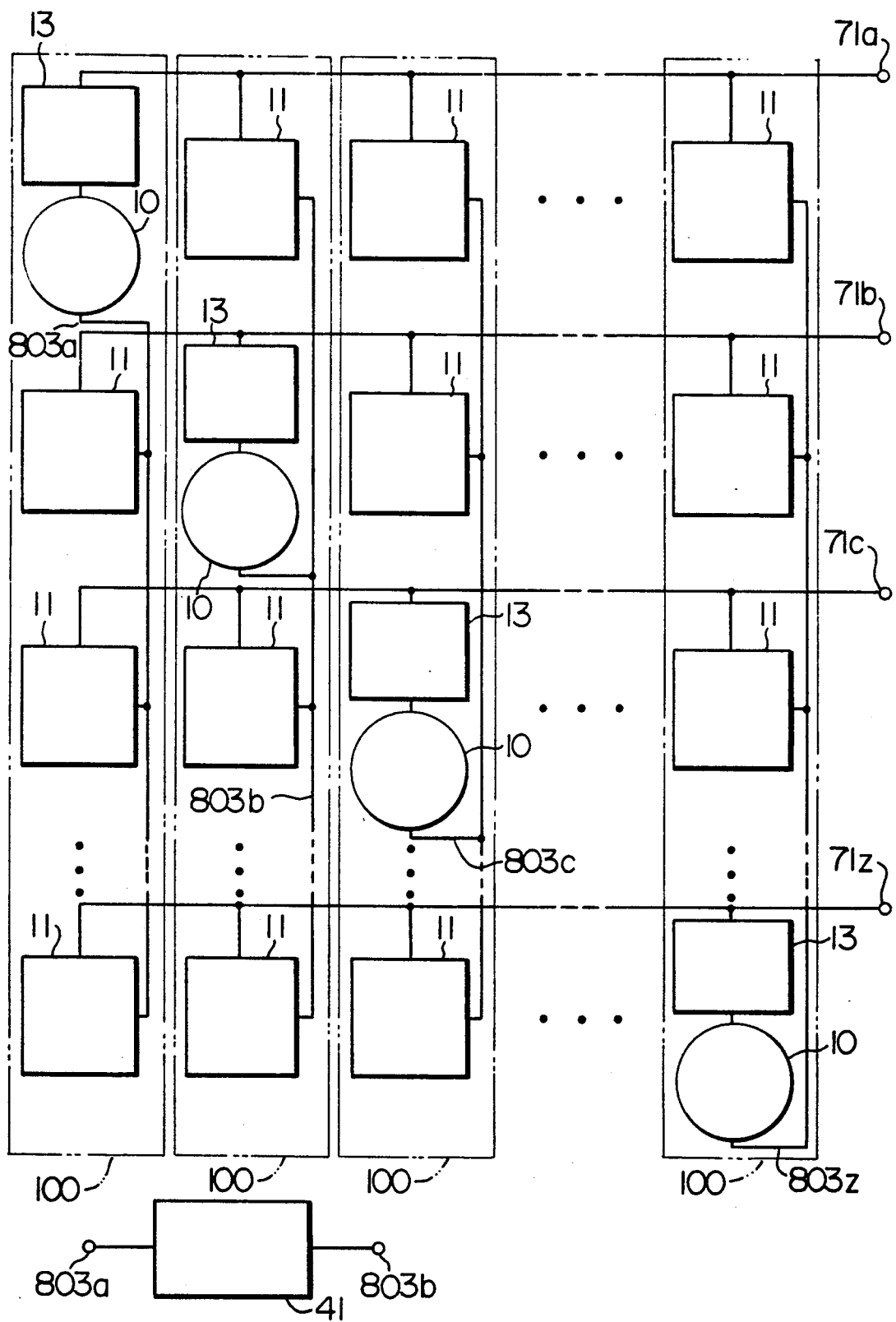

FIG. 41 is a schematic circuit diagram showing a hop-field type neural network which is realized by using N neuron circuits 100 each constituted by one cell body (cellular) circuit 10 and (N−1) synapse circuit 11. In one neuron circuit 100, the outputs of the all the synapse circuit 11 are coupled to one node of the cell body input nodes 803 (by wired-OR connection). Inputted to each synapse circuit 11 is the output from each neuron circuit 100, whereon the inputs is correspondingly weighted, and the amount of charge approximately proportional to the product is injected to each cell body input node 803 (803a–803c, . . . , 803z). Thus, the multiplication and addition operations are performed in parallel by the individual neuron circuits 100. In the cell body circuit 10 of each neuron circuit 100, there are performed the AD conversion and the non-linear transformation, being followed by conversion to the pulse signal through the digital PWM conversion circuit 13, which pulse signal is then outputted to the input terminal 51 of the synapse circuit 11 of each neuron circuit 100. The cell body input node 803 (803a to 803c, . . . , 803z) of each neuron circuit 100 is connected to the half-precharge circuit 41 such as the one shown in FIG. 39.

The operation described above is repeated until all the output values become stable.

In the case of the embodiment shown in FIG. 41, the multiplication and addition operation as well as the non-linear transformation are performed in parallel with each other. Accordingly, although the amount of hardware is increased because of necessity of the synapse circuits about N times as many as those required by the network shown in FIG. 39, operation speed can be increased about N times as high.

Figure 42:
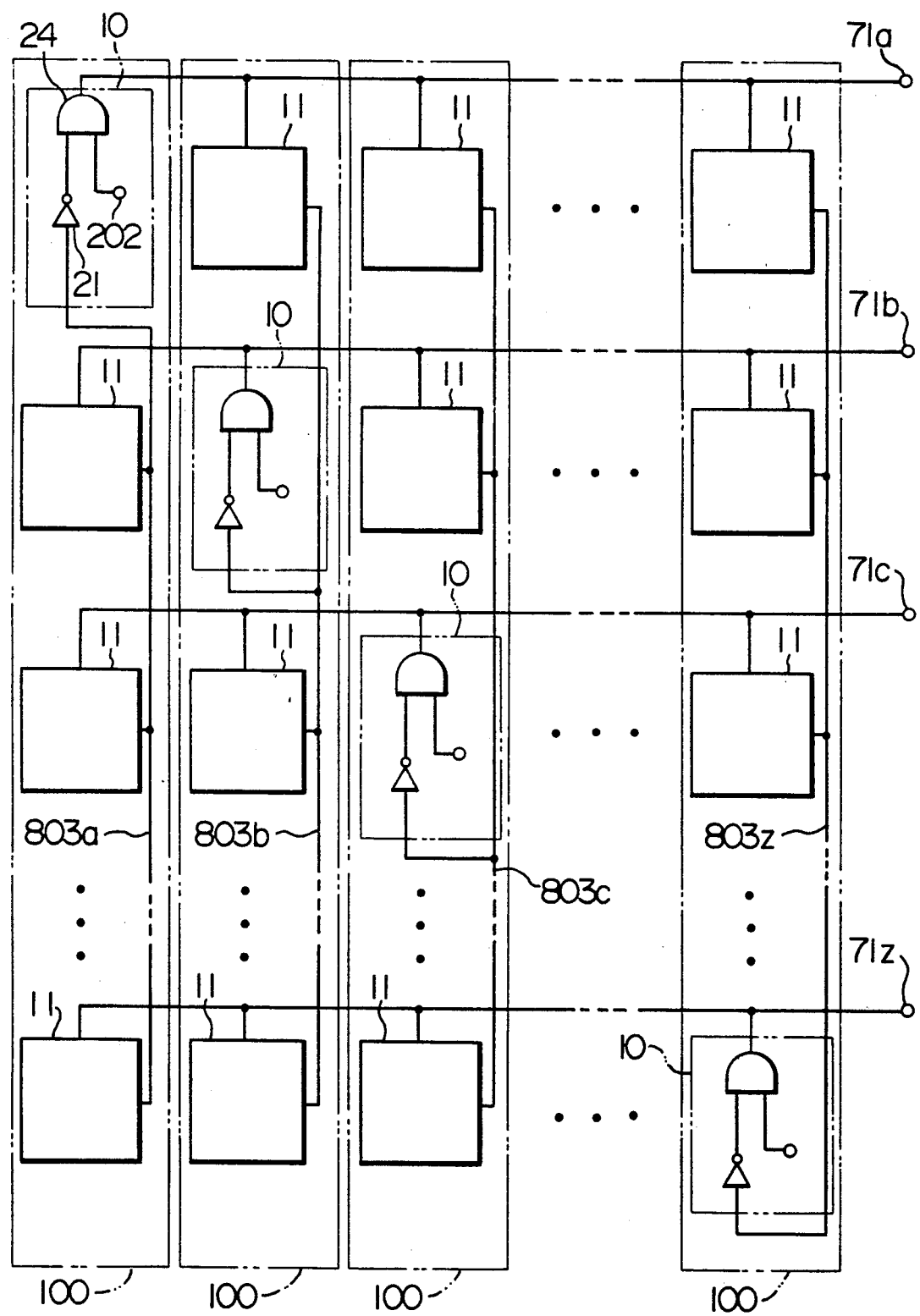

FIG. 42 is a schematic circuit diagram showing a hop-field type neural network similar to that shown in FIG. 41 but differs from the latter in that the output of each neuron circuit 100 is expressed by a single bit of "0" or "1". Because the output value of the neuron is expressed by the single bit, the cell body circuit 10 can be simplified as compared with that described above. More specifically, an inverter circuit 21 is connected to the cell body input node 803 (803a–803c, . . . , 803z), wherein two inputs of a 2-input AND circuit 24 are connected to the output terminal of the inverter circuit 21 and the clock signal input terminal 202, the output terminal of the AND circuit 24 being connected to the synapse input node 51 of each synapse circuit 11.

When the logical threshold value of the inverter 21 of the cell body circuit 10 is represented by $V_{THL}$, the output produced by each neuron circuit 100 can be given by $$x_i = 1 \left( \sum_{\substack{j=0 \\ j \neq i}}^{N-1} W_{ij} \cdot x_j \leq V_{THL} \right)$$

$$x_i = 0 \left( \sum_{\substack{j=0 \\ j \neq i}}^{N-1} W_{ij} \cdot x_j > V_{THL} \right)$$

Each neuron circuit 100 produces the output only when the clock signal input terminal 202 is high.

Figure 43:
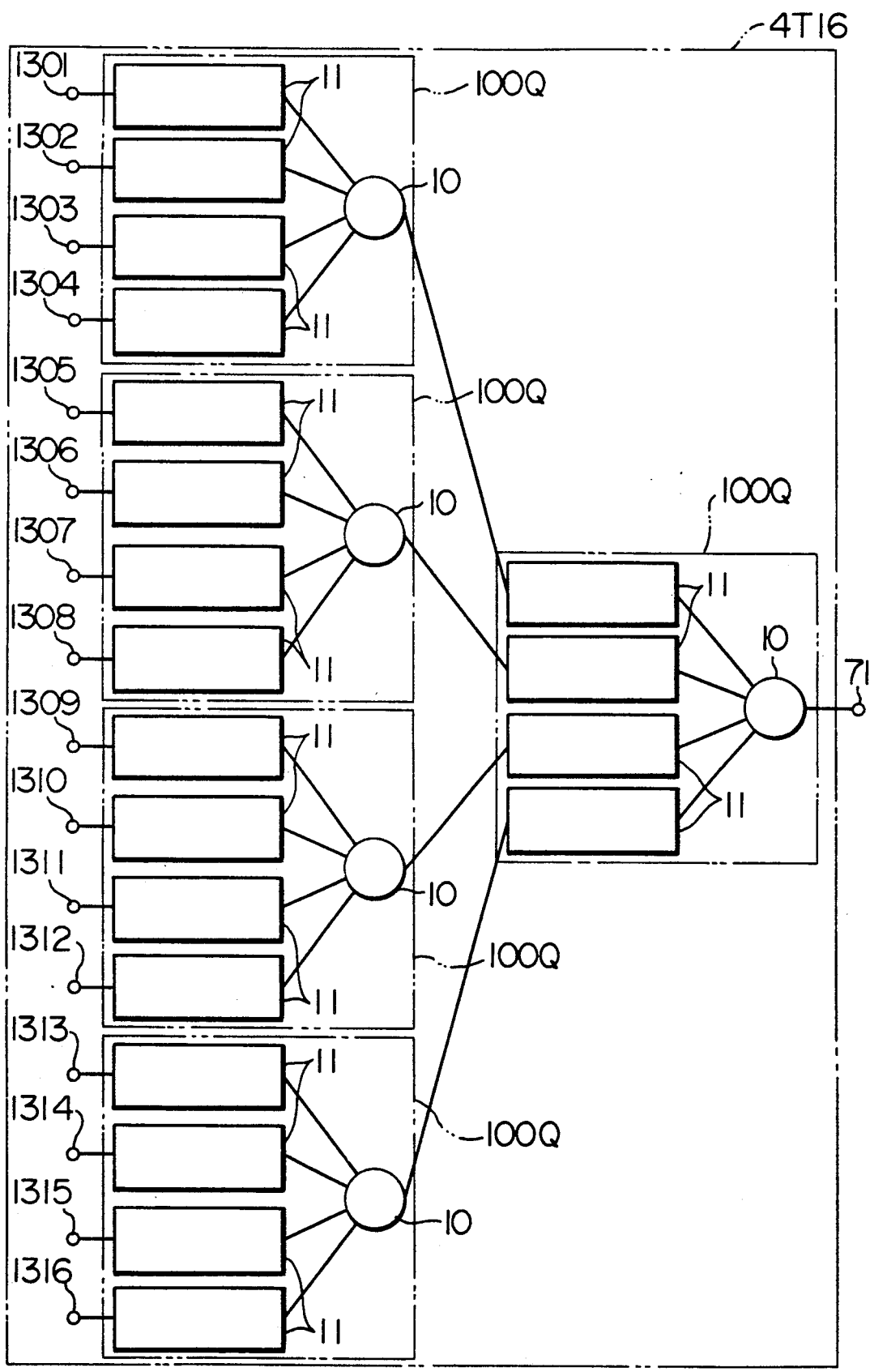

In the case of the embodiments shown in FIGS. 41 and 42, the outputs of all the synapse circuits 11 within the single neuron circuit 100 are connected through the wired OR at the cell body input node 803. In this conjunction, it is noted that when an extremely great number of the synapse circuits, e.g. several hundred synapse circuits 11 are connected to one cell body input node 803, there are required wiring conductors each of a correspondingly increased length, as the result of which the signal may be attenuated due to the wire resistance and the leakage. Thus, there may take place such situation in which the signal can not arrive at the cell body input node or may undergo the influence of noise or be distinguished by noise. For coping with the problems mentioned above, it is further taught by the present invention to connect in a two-stage tree structure the four-input neuron circuits 100Q as the basic neuron circuits to thereby realize a 16-input neuron circuit 4T16 or a greater scale neuron circuit having a greater number of inputs by connecting the 16-input neuron circuits 4T16 in multiple stages, as shown in FIG. 43. Referring to the figure, reference numerals 1301 to 1316 denote input terminals of the synapse circuits. The structure shown in FIG. 43 may be implemented by using the basic neuron circuits each constituted by an eight-input neuron circuit or a two-input neuron circuit, as occasion requires. In this case, in each of the repeater cell body circuits 10 except for the cell body circuit 10 of the final output stage, a linear transformation (conversion) is performed rather than the non-linear transformation.

FIG. 44 shows another embodiment of the present invention. The circuit is similar to the embodiment shown in FIG. 36B with regard to the synapse circuit 11 and differs slightly from the latter in respect to the structure of the cell body circuit.

Referring to FIG. 44, reference symbol P5 designates a PMOS FET and N5 designates a NMOS FET.

In the cell body circuit 1b, the cell body input node 803 is precharged to (VDD+VSS)/2 (V) by the half-precharge circuit (not shown), whereby an up-down counter 81 is reset. Further, there is provided a cell body input node for applying the potential of (VDD+VSS)/2 (V) is applied to the reference voltage input terminal 806. The PMOS FET P5 has a drain electrode connected to the cell body input node 803, a source electrode coupled to VDD and a gate electrode connected to the internal node 2004. On the other hand, the NMOS FET N5 has a drain electrode connected to the cell body input node 803, a source electrode connected to the VSS and a gate electrode connected to the internal node 2005. The clock signal is applied to the clock signal input terminal 201, and the output of the comparator 20 is used as a control signal. More specifically, when the result of the comparison performed by the comparator 20 is that $V_N < N_{R2}$, the clock signal pulse is applied to the internal node 2004 which sets the PMOS FET P5 to the on-state, while when $V_N > V_{R2}$, the pulse is outputted to the internal node 2005 for turning on the NMOS FET N5. This operation is controlled by a pulse control circuit 18. After the pulse is outputted to the internal node 2004 or 2005 once or a plurality of times, $V_n$ becomes approximately equal to $V_{R2}$, whereby the output of the comparator 20 is ultimately inverted. At that time point, the pulse control circuit 18 stops the transmission of the pulse signal. An up-down counter 81 is connected to the internal node 2004 and the internal node 2005 for coupling "−1" in response to the application of the pulse to the internal node 2004 which turns on the PMOS FET P5, while counting "+1" in response to the application of the pulse to the internal node 2005 which turns on the NMOS FET N5. At the time when the above operation has been performed for the data from all the neuron circuits 100, the value of the up-down counter 81 indicates the results of the multiplication and addition operation, which is then subjected to non-linear transformation by the non-linear transformation circuit, the result of which is outputted to the output terminal 11.

Every time the output of each neuron circuit 100 is inputted, the half-precharge of the cell body input not 803 can be effectuated to thereby realize the multiplication operation. In that case, the up-down counter 810 is not reset so that it operates as an accumulator.

Figure 45A:
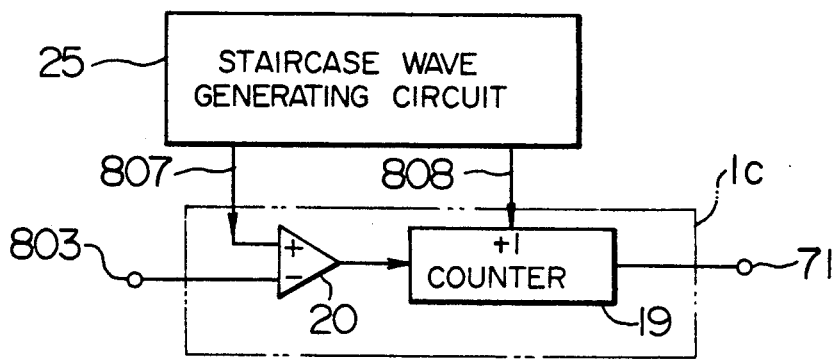
Figure 45B:
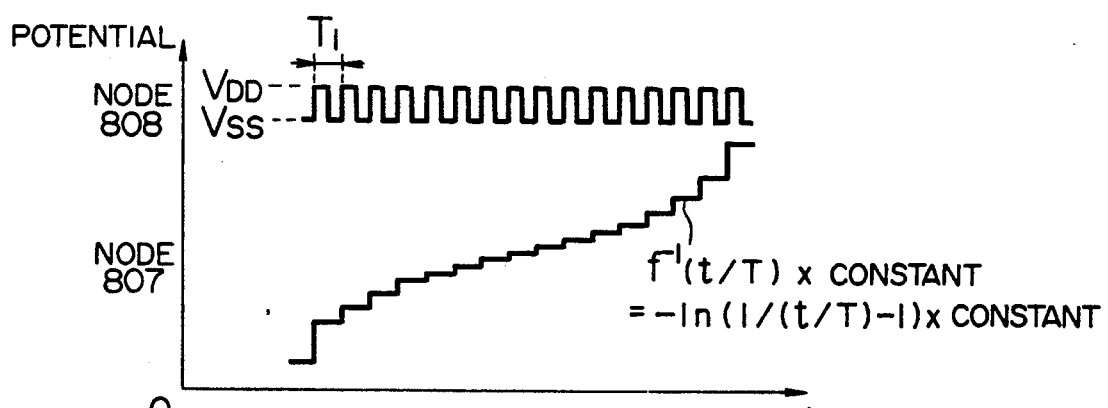

FIG. 45A shows an another cell body circuit 1c for realizing the AD conversion circuit and the non-linear transformation circuit 26 according to a still further embodiment of the invention. Referring to FIG. 45, description will be made of operation which takes place in succession to the change in the potential at the cell body input node 803 as the result of multiplication/addition operation performed by the synapse circuit 11.

A comparator 20 is provided for comparing the potential $V_N$ at the cell body input node 803 with a potential $V_{R3}$ at a staircase wave output node 807 of a staircase wave generating circuit 25. Further provided is a counter 19 for counting the number of pulse outputted to a pulse output node 808 of the stircase wave generating circuit 25 under the control of the output signal of the comparator 20. The counter 19 is reset before performing the AD conversion and non-linear transformation. Subsequently, the potential $V_N$ is compared with $V_{R3}$ by the comparator 20. The counter 19 continues to count the number of pulses outputted to the pulse output node 808 until the output of the comparator 20 is reversed. The value indicated by the counter 19 upon reversion of the output of the comparator 20 represents the result of the non-linear transformation or conversion. For the non-linear transformation of the sigmoid function f, the staircase wave $V_{R2}$ is outputted in the form of a inverse function $f^{-1}(k)$ of the sigmoid function f for the number k of the pulses outputted to the pulse output node 808.

In the foregoing, the neural networks of the hop-field type have been described. It should be understood that a hierarchical type neural network can also be realized. FIG. 46 shows an example of the neural network of a hierarchical structure. Referring to the figure, the neuron circuit 100 is constituted by the synapse circuits 11 and the cell body circuit 10. Referring to FIG. 46, an input pattern inputted as indicated by 2001 undergoes arithmetic operation through the neurons of an input layer 2100, an intermediate layer 2200 and an output layer 2300, the result of the operation being outputted through the neurons of the output layer 2300, as indicated by 2002.

What is claimed is:

1. An information processing system, comprising:
a plurality of neurons each having a memory for storing a weight value which is related to the other neurons;
means for generating an address signal for specifying sequentially one by one said plurality of neurons;
an address bus, connected to said means for generating and each neuron, for transmitting said address signal; and
a data bus, connected to each neuron, for transmitting an output signal value from each neuron to the other neurons;
wherein each neuron determines its output signal value in accordance with a total sum of products of its associated weight value and the output signal values of the other neurons, and one of said neurons which is specified by said address signal sends out an output signal value to said data bus.

2. An information processing system according to claim 1, wherein when said generating means generates a predetermined address signal which specifies none of said neurons, means for moving said system to various states moves said system to a predetermined state.

3. An information processing system according to claim 2, wherein each neuron includes means for temporarily storing the output signal value of said each neuron.

4. An information processing system according to claim 1, wherein said plurality of neurons are each identified as belonging to a plurality of groups, and wherein said address bus and said data bus are constituted, respectively, by first buses each connecting neurons within each of said groups and second buses for connecting said first buses.

5. An information processing system according to claim 4, wherein each of said second buses is wired by using a conductor having a greater bit width than that for each of said first buses.

6. An information processing system according to claim 4, further including a clock bus for supplying a clock signal to each of said neurons, wherein transmission between each of said first buses and each of said second buses is synchronized to occur when said clock signal is in a predetermined state.

7. An information processing system according to claim 1, wherein some of said neurons reside on a semiconductor wafer.

8. An information processing system according to claim 1, wherein each neuron includes address translation means for performing a predetermined translation for an address signal being input to said each neuron for thereby outputting onto said address bus an address signal differing from said inputted address signal.

9. An information processing system according to claim 8, wherein said address translation means is constituted by means for adding or deleting at least one bit to or from said inputted address signal.

10. An information processing system according to claim 8, wherein each of said neurons includes an address decoder for decoding said address signal when said address signal corresponds to a predetermined address signal.

11. An information processing system according to claim 1, wherein said memory stores a predetermined number of weight values in an order starting from a maximum absolute value of said weight values.

12. An information processing system, comprising:

a plurality of neurons each having a memory for storing a weight value which is related to the other neurons;
means for generating an address signal for specifying sequentially one by one said plurality of neurons;
an address bus, connected to said means for generating and each neuron, for transmitting said address signal; and
a data bus, connected to each neuron, for transmitting an output signal value from each neuron to at least one of the other neurons;
wherein each neuron determines its output signal value in accordance with a total sum of products of its associated weight value and the output signal values of the other neurons, and one of said neurons which is specified by said address signal sends out an output signal value to said data bus.

13. An information processing method in an information processing system including a plurality of neurons each having a memory, said neurons being connected to each other by a data bus and an address bus, said method comprising the steps of:
storing a weight value in each memory related to the other neurons;
generating an address signal for specifying sequentially one by one some of said plurality of neurons;
transmitting on said address bus said address signal; and
transmitting one said data bus an output signal value from each neuron to at least one of the other neurons;
wherein each neuron determines its output signal value in accordance with a total sum of products of its associated weight value and the output signal values of the other neurons, and one of said neurons which is specified by said address signal sends out an output signal value to said data bus.

14. An information processing system including a plurality of neurons each having a memory, said system comprising:
means for generating an address signal for specifying sequentially one by one said plurality of neurons;
an address bus, connected to said means for generating and each neuron, for transmitting said address signal; and
a data bus, connected to each neuron, for transmitting an output signal value from each neuron to the other neurons;
wherein each memory has prestored therein a weight value which is related to the other neurons; and
wherein each neuron determines its output signal value in accordance with a total sum of products of its associated weight value and the output signal values of the other neurons, and one of said neurons which is specified by said address signal sends out an output signal value to said data bus.

15. An information processing method in an information processing system including a plurality of neurons each having a memory, said neurons being connected to each other by a data bus and an address bus, said method comprising the steps of:
storing in each memory a weight value related to the other neurons;
generating an address signal for specifying sequentially one by one some of said plurality of neurons;
transmitting on said address bus said address signal; and transmitting one said data bus an output signal value from each neuron to at least one of the other neurons;

wherein each neuron determines its output signal value in accordance with a total sum of products of its associated weight value and the output signal values of the other neurons, and one of said neurons which is specified by said address signal sends out an output signal value to said data bus.

16. An information processing method according to claim 15, wherein when said generating step generates a predetermined address signal which does not specify any of said neurons said method further comprises the steps of:

transmitting on said address bus said predetermined address signal; and moving said information processing system to a predetermined state.

17. An information processing method according to claim 16, further comprising the step of:

temporarily storing in each neuron the output signal value from said each neuron corresponding to said transmitted predetermined address signal.

18. An information processing method according to claim 15, further comprising the step of:

storing in each neuron a predetermined number of weight values in an order starting from a maximum absolute value of said weight values.

* * * * *